US009047994B2

(12) United States Patent

Takeda et al.

(10) Patent No.: US 9,047,994 B2

(45) Date of Patent: Jun. 2, 2015

(54) CORE OF LIGHT WATER REACTOR AND FUEL ASSEMBLY

(75) Inventors: Renzo Takeda, Kawasaki (JP); Junichi Miwa, Mito (JP); Kumiaki Moriya, Hitachi (JP)

(73) Assignee: HITACHI-GE NUCLEAR ENERGY, LTD., Ibaraki (JP)

( * ) Notice: Subject to any disclaimer, the term of this patent is extended or adjusted under 35 U.S.C. 154(b) by 998 days.

(21) Appl. No.: 12/978,198

(22) Filed: Dec. 23, 2010

(65) Prior Publication Data

US 2011/0164720 A1 Jul. 7, 2011

(30) Foreign Application Priority Data

Dec. 28, 2009 (JP) ................................ 2009-298093

(51) Int. Cl.

| | |
|---|---|
| ***G21C 1/04*** | (2006.01) |
| ***G21C 19/44*** | (2006.01) |
| ***G21C 3/328*** | (2006.01) |
| ***G21C 5/00*** | (2006.01) |

(52) U.S. Cl.

CPC ................ *G21C 19/44* (2013.01); *G21C 3/328* (2013.01); *G21C 5/00* (2013.01); *Y02E 30/38* (2013.01)

(58) Field of Classification Search

CPC .......... G21C 19/44; G21C 2/328; G21C 5/00; Y02E 30/38

USPC ........................................................ 376/347

See application file for complete search history.

(56) References Cited

U.S. PATENT DOCUMENTS

| | | | | | |
|---|---|---|---|---|---|
| 3,773,617 | A | * | 11/1973 | Marmonier et al. | 376/243 |
| 3,802,962 | A | * | 4/1974 | Culambourg et al. | 376/254 |
| 3,963,566 | A | * | 6/1976 | MacMillan et al. | 376/412 |
| 4,656,000 | A | * | 4/1987 | Sakurai et al. | 376/352 |
| 5,276,718 | A | * | 1/1994 | Ueda | 376/220 |
| 5,367,547 | A | * | 11/1994 | Hida et al. | 376/435 |
| 5,812,621 | A | * | 9/1998 | Takeda et al. | 376/171 |
| 5,949,839 | A | | 9/1999 | Nylund | |

(Continued)

FOREIGN PATENT DOCUMENTS

| | | |
|---|---|---|
| JP | 62-90593 | 4/1987 |
| JP | 01-197693 | 8/1989 |

(Continued)

OTHER PUBLICATIONS

Japanese Office Action for JP2009-298093, mailing date of Apr. 24, 2012 and English language translation thereof.

(Continued)

*Primary Examiner* — Frank J McGue

(74) *Attorney, Agent, or Firm* — Baker Botts L.L.P.

(57) ABSTRACT

A core of a light water reactor has a plurality of fuel assemblies. The fuel assemblies include a plurality of fuel rods in which a lower end is supported by a lower tie-plate and an upper end is supported by an upper tie-plate. The fuel rods form plenums above a nuclear fuel material zone and have a neutron absorbing material filling zone under the nuclear fuel material zone. Neutron absorbing members attached to the upper tie-plate are disposed between mutual plenums of the neighboring fuel rods above the nuclear fuel material zone. The neutron absorbing members have a length of 500 mm and are positioned at a distance of 300 mm from the nuclear fuel material zone. Even if the overall core is assumed to become a state of 100% void, no positive reactivity is inserted to the core.

33 Claims, 50 Drawing Sheets

(56) References Cited

U.S. PATENT DOCUMENTS

| | | | | |
|---|---|---|---|---|
| 6,101,231 | A * | 8/2000 | Gaylord et al. | 376/245 |
| 6,512,805 | B1 * | 1/2003 | Takeda et al. | 376/171 |
| 6,606,367 | B2 * | 8/2003 | Halluin et al. | 376/245 |
| 8,422,617 | B2 * | 4/2013 | Takeda et al. | 376/347 |

FOREIGN PATENT DOCUMENTS

| | | | | |
|---|---|---|---|---|
| JP | 02-184792 | | 7/1990 | |
| JP | 06-066978 | | 3/1994 | |
| JP | 06324179 A | * | 11/1994 | G21C 9/33 |
| JP | 06-331768 | | 12/1994 | |
| JP | 08-021890 | | 1/1996 | |
| JP | 08-220271 | | 8/1996 | |
| JP | 09-166674 | | 6/1997 | |
| JP | 11-509317 | | 8/1999 | |
| JP | 3428150 | | 5/2003 | |
| JP | 2003222694 | * | 8/2003 | |
| JP | 2004-212372 | | 7/2004 | |
| JP | 2008-215818 | * | 9/2008 | G21C 3/328 |

OTHER PUBLICATIONS

Japanese Office Action for JP2009-298093, mailing date of Feb. 5, 2013 and English language translation thereof.

Renzo Takeda et al., General Features of Resource-Renewable BWR (RBWR) and Scenario of Long-term Energy Supply, International Conference on Evaluation of Emerging Nuclear Fuel Cycle Systems, Global "95 Versailles, France, Sep. 1995, p. 938-943.

G. A. Ducat et al., evaluation of the Parfait Blanket Concept for Fast Breeder Reactor, MITNE-157, Jan. 1974.

Renzo Takeda et al., BWRS for Long-Term Energy Supply and for Fissioning Almost all transuraniums, Global 2007, Boise, Idaho, Sep. 9-13, 2007, pp. 1725-1732.

W. S. Yang et al., A Metal Fuel Core Concept for 1000 MWt Advanced Burner Reactor, Global 2007, Boise, Idaho, Sep. 9-13, 2007, pp. 52-.

Office Action in corresponding Japanese Patent Application No. 2012-141548, dated Nov. 19, 2013, with English language translation of same.

Office Action in Corresponding Application 1155532, dated Jan. 13, 2014.

Search Report in corresponding Application No. 1155533, dated Apr. 11, 2014.

Office Action in connection with corresponding foreign Japanese Application No. 2013-080591, mailed Jul. 1, 2014 with English translation thereof.

Communication in connection with INPI Application No. 1155533 dated Oct. 6, 2014.

* cited by examiner

| F4 | H4 | H5 |    |    |    |    |    |    |    |    |    |    |    |    |    |    |
|----|----|----|----|----|----|----|----|----|----|----|----|----|----|----|----|----|
| D2 | E2 | F2 | D4 | E4 | E5 |    |    |    |    |    |    |    |    |    |    |    |
| C1 | C2 | D1 | C2 | F1 | H1 | D5 |    |    |    |    |    |    |    |    |    |    |
| A2 | C1 | B2 | E3 | B2 | C1 | D2 | C4 | D4 | F5 |    |    |    |    |    |    |    |
| C4 | A2 | C3 | B1 | C3 | B2 | F3 | F2 | F1 | H2 | E5 |    |    |    |    |    |    |
| B4 | B3 | B1 | C4 | B1 | C3 | C1 | E3 | C2 | E1 | H3 | E4 |    |    |    |    |    |
| A1 | A2 | B3 | A1 | B3 | A2 | B3 | A2 | D3 | B2 | D1 | G3 | D5 |    |    |    |    |
| A2 | A4 | A1 | B4 | A1 | B4 | B1 | B3 | B1 | D3 | B2 | D1 | G2 | F5 |    |    |    |
| A4 | A2 | A3 | A4 | A4 | A2 | A3 | B4 | C4 | B1 | D3 | B2 | E1 | D4 |    |    |    |
| A4 | A3 | A1 | A4 | A4 | A3 | A1 | B4 | B4 | B3 | A2 | D3 | E2 | C4 |    |    |    |
| A1 | A2 | A3 | A2 | A3 | A2 | A3 | A1 | A3 | A1 | B3 | B1 | F3 | C2 | D5 |    |    |
| A2 | A4 | A1 | A3 | A1 | A3 | A1 | A3 | A2 | B4 | A2 | C3 | B2 | C1 | G1 | E5 |    |
| A3 | A2 | A3 | A4 | A4 | A1 | A3 | A4 | A4 | A1 | B3 | B1 | C3 | B2 | E1 | E4 |    |
| A1 | A4 | A1 | A4 | A4 | A3 | A2 | A4 | A4 | B4 | A1 | B4 | B1 | E3 | C2 | D4 |    |
| A3 | A1 | A3 | A1 | A3 | A1 | A3 | A1 | A3 | A1 | A3 | B1 | B3 | B2 | D1 | E2 | G5 |
| A2 | A4 | A2 | A4 | A2 | A4 | A2 | A3 | A2 | A4 | A2 | B3 | A2 | C1 | C2 | D2 | G4 |
| A4 | A3 | A1 | A2 | A4 | A1 | A3 | A4 | A4 | A1 | A3 | B4 | C4 | C3 | B2 | D2 | F4 |

20C

41J

CORE OF LIGHT WATER REACTOR AND FUEL ASSEMBLY

CLAIM OF PRIORITY

The present application claims priority from Japanese Patent application serial no. 2009-298093, filed on Dec. 28, 2009, the content of which is hereby incorporated by reference into this application.

BACKGROUND OF THE INVENTION

1. Technical Field

The present invention relates to a core of a light water reactor and a fuel assembly and more particularly to a core of a light water reactor and a fuel assembly preferably applied to a boiling water reactor.

2. Background Art

When actinide nuclide having many isotopes burns in a core in a state that it is enriched in a nuclear fuel material in fuel assemblies loaded in a core of a light water reactor, the actinide nuclide transfers successively among the isotopes by nuclear reaction such as neutron capture and nuclear fission. In the actinide nuclide, since odd-numbered nucleus that has a large nuclear fission cross section with respect to a resonance and thermal neutrons, and even-numbered nucleus that undergoes fission only for fast neutrons are present, in general, isotopic composition in the actinide nuclides included in the fuel assembly largely change as the actinide nuclides burn. It is known that this isotopic composition change depends on the neutron energy spectrum at the position at which the fuel assembly is loaded in the core.

Current light water reactor uses slightly enriched uranium as nuclear fuel. However, since the natural uranium resource is finite, it is necessary to successively replace fuel assemblies used in the light water reactor with recycle fuel assemblies including a nuclear fuel material which is formed by enriching depleted uranium, which is a residual after uranium enrichment, natural uranium, thorium, or degraded uranium with the transuranic nuclide (hereinafter referred to as TRU) extracted from the spent fuel assemblies of the light water reactor. Further, depleted uranium, natural uranium, thorium, degraded uranium, and TRU are referred to as a nuclear fuel material. The fuel assembly having the nuclear fuel material is loaded in the core of the light water reactor. It is desirable that U-233 newly generated by absorbing neutrons by the TRU and thorium are recycled as a useful resource over a very long period during which a commercial reactor is predicted to be necessary and during the period, the quantities of TRU and U-233 always increase or be maintained almost constant.

In the light water reactor occupying most of the current commercial reactors, the technology of realizing a breeder reactor for increasing or maintaining almost constant the quantity of fissionable Pu while the nuclear fuel material burns, is described in Japanese Patent 3428150 (U.S. Pat. No. 5,812,621) and R. TAKEDA et al., Proc. of International Conference on Evaluation of Emerging Nuclear Fuel Cycle Systems. GLOBAL '95 Versailles, France, September, 1995, P. 938. In the light water reactor realizing the breeder reactor described in Japanese Patent 3428150 and R. TAKEDA et al., Proc. of International Conference on Evaluation of Emerging Nuclear Fuel Cycle Systems. GLOBAL '95 Versailles, France, September, 1995, P. 938, a plurality of fuel assemblies, each of which has a hexagonal transverse cross section, are disposed in the core, each fuel assembly being formed by closely arranging a plurality of fuel rods in a triangular grid. In the core of this light water reactor, the amount of water around the fuel rods is lessened due to the close arrangement of the fuel rods, and thereby the proportion of resonant energy neutrons and fast energy neutrons are increased. In addition, the height of a mixed oxide fuel section of the TRU is reduced and blanket zones loaded with depleted uranium are disposed above and below the mixed oxide burning part so as to maintain a negative void coefficient, which is a safety criterion. The core is formed in two stacked stages by applying the concept of a parfait-type core described in G. A. Ducat et al., "Evaluation of the Parfait Blanket Concept for Fast Breeder Reactors", MITNE-157, January, 1974, thereby a breeding ratio of 1 or more is ensure, keeping the economy.

To recycle TRU, the reprocessing of spent fuel is indispensable. Due to a fear that consumer TRU is diverted to weapons of mass destruction, there has been an increasing demand for nuclear non-proliferation and thereby restrictions on TRU recycling have been severe.

Further, it is certain that an electric power generating system superior to a fission reactor is put into practical use on some day in the future. At that time, the value of TRU is lowered from a very useful fuel equivalent to enriched uranium to a cumbersome long-life waste material. Therefore, in order to spread a light water reactor using uranium as nuclear fuel widely in the world, to prepare the disposal method of TRU remaining in the spent nuclear fuel, that is, a TRU burner reactor for fissioning the TRU to a fission product is a most important object in the nuclear power development.

Japanese Patent Laid-Open No. 2008-215818 and R. TAKEDA et al., Proc. of International Conference on Advanced Nuclear Fuel Cycles and Systems. GLOBAL '07 Boise, USA, September, 2007, P. 1725, propose a light water breeder reactor for keeping the isotopic composition of the TRU almost constant and recycling the TRU and the TRU burner reactor for permitting the TRU to fission in order to realize multiple-recycling for repeatedly executing the recycling for reusing the TRU obtained by reprocessing the spent nuclear fuel as new nuclear fuel.

The light water breeder reactor has a core for recycling nuclear fuel in a state that the TRU quantity is kept constant or is increased and loading the fuel assemblies increasing the burn-up and nuclear proliferation resistance. The TRU burner reactor is a nuclear reactor for successively gathering the TRU while decreasing the TRU recovered by reprocessing the nuclear fuel by nuclear fission and permitting all the TRU to fission excluding the last one core in order to prevent the TRU from becoming a long-life radioactive waste material, when the light water reactor reaches an ending time of the mission.

The light water reactor described in R. TAKEDA et al., Proc. of International Conference on Evaluation of Emerging Nuclear Fuel Cycle Systems. GLOBAL '95 Versailles, France, September, 1995, P. 938 and R. TAKEDA et al., Proc. of International Conference on Advanced Nuclear Fuel Cycles and Systems. GLOBAL '07 Boise, USA, September, 2007, P. 1725 for recycling the TRUs recovered from the spent nuclear fuel, to meet the design criteria for abnormal transient and accidents, keeps the TRU quantity constant with a sufficient safety margin, effectively uses the TRUs as seeded fuel, and burns all depleted uranium, thereby realizes long-term stable energy supply. Furthermore, such a recycle reactor can be realized as permits all the TRUs to fission and preventing the TRUs from becoming a long-life waste material when the nuclear fission reactor ends the mission and thus the TRUs become unnecessary.

CITATION LIST

Patent Literature

Patent Literature 1: Japanese Patent 3428150
Patent Literature 2: Japanese Patent Laid-open No. 2008-215818

Non Patent Literature

Non Patent Literature 1: R. TAKEDA et al., Proc. of International Conference on Evaluation of Emerging Nuclear Fuel Cycle Systems. GLOBAL '95 Versailles, France, September, 1995, P. 938
Non patent Literature 2: G. A. Ducat et al., "EVALUATION OF THE PARFAIT BLANKET CONCEPT FOR FAST BREEDER REACTORS", MITNE-157, January, 1974
Non patent Literature 3: R. TAKEDA et al., Proc. of International Conference on Advanced Nuclear Fuel Cycles and Systems. GLOBAL '07 Boise, USA, September, 2007, P. 1725
Non patent Literature 4: W. S. Yang et al., A Metal Fuel Core Concept for 1000 MWt Advanced Burner Reactor GLOBAL '07 Boise, USA, September, 2007, P. 52

SUMMARY OF THE INVENTION

Technical Problem

Further, in the spread of the light water reactor, an apprehension of a TRU newly produced by the light water reactor to become a long-life radioactive waste material and a fear of the TRU to be diverted to weapons of mass destruction are large faults. The movement is becoming stronger of intending to remove the faults for the spread of the light water reactor finally, by establishing a technology of reducing the number of spent fuel assemblies to a small number as far as possible by permitting the TRU from the light water reactor to fission anyway and repeating the recycling in a state of the isotopic composition of a high nuclear non-proliferation resistance, before the TRU covers a role as seeded fuel for permitting the depleted uranium for long-term stably energy supply to fission. And, if the technology can be executed only by changing the fuel assemblies in the light water reactor in operation at present, it is more desirable.

In recent years, there is a movement of making the concept for the safety of the nuclear reactor severe. For example, a core of a higher safety potential having a safety margin capable of sufficiently responding to an accident (anticipated transient without scram (ATWS)) beyond the limits of the design criteria of a composite event such that all the control rods cannot be inserted when core flow rate is suddenly reduced from some cause is required.

Therefore, the inventors supposed a state that the overall core is filled with steam (a state that the overall core becomes 100% void) which is an event considered to be severest and examined a further improvement of the margin for intrinsic safety of the light water reactor. Even though the overall core becomes 100% void, positive reactivity is applied to the core. The application of the positive reactivity must be avoided and the margin for the intrinsic safety of the light water reactor must be improved more.

An object of the present invention is to provide a core of a light water reactor and a fuel assembly capable of more improving the safety margin without impairing the economical efficiency of fuel of the light water reactor.

Solution of Problem

A feature of the present invention for attaining the above object is a core in which a nuclear fuel material zone having nuclear fuel material including transuranic nuclides is formed in the core and a neutron absorbing member is disposed above the nuclear fuel material zone having a height within the range from 20 cm to 250 cm.

In the core in which the nuclear fuel material zone having a height within the range from 20 cm to 250 cm is formed, even though the overall core becomes a state of 100% void from some cause during the operation of the light water reactor, the neutron absorbing member disposed above the nuclear fuel material zone absorbs the neutrons leaking from the nuclear fuel material zone because quantity of neutrons leaking out from the nuclear fuel material zone is large. Therefore, even though the overall core becomes the state of 100% void, positive reactivity is not applied to the nuclear fuel material zone because the leaked neutrons which are returned to the nuclear fuel material zone by reflecting on a component member existing outside the nuclear fuel material zone is extremely reduced in quantity. Consequently, the margin for the intrinsic safety of the light water reactor can be improved, thus the safety margin can be improved more without impairing the economical efficiency of fuel of the light water reactor.

The zone where the nuclear fuel material is arranged in the core is a nuclear fuel material zone. The height of the nuclear fuel material zone is the same as an active fuel length of a fuel assembly.

It can also attain the above object that in each fuel rod included in the fuel assembly loaded in the core, an outside diameter of a plenum formed above the nuclear fuel material zone including the transuranic nuclide of the fuel rod is 3 mm or more and is smaller than an outside diameter of the fuel rod in the nuclear fuel material zone. Length of the plenum is within a range from 400 mm to 2500 mm.

The outside diameter of the portion of the plenum of the fuel rod at the length within the range from 400 mm to 2500 mm is 3 mm or more and is smaller than the outside diameter of the fuel rod in the nuclear fuel material zone, so that even when a composite event beyond limits of the design criteria (a first accident beyond the design basis accident which will be described later) such that core flow rate is suddenly reduced from some cause during the operation of the BWR and all control rods cannot be inserted into the core occurs, the leaked neutrons which are returned to the nuclear fuel material zone by reflecting on a component member for demarcating the plenum is reduced in quantity. Therefore, even when the first accident beyond the design basis accident occurs, the void coefficient becomes negative due to the intrinsic safety of the BWR, so that by the operation of a high pressure core injection system, reactor power is spontaneously reduced to the power that the fuel rods are coolable, and the safety margin of the core is increased. Furthermore, the volume of the plenum is increased, so that the soundness of the fuel rod is increased. Therefore, the safety margin can be improved more without impairing the economical efficiency of fuel of the light water reactor.

It can also attain the above object that in the nuclear fuel material zone in the core, an upper blanket zone, an upper fissile zone where nuclear fuel material including transuranic nuclides exists, an internal blanket zone, a lower fissile zone where the nuclear fuel material including the transuranic nuclides exists, and a lower blanket zone are formed in this order from above in the axial direction of the core and a rate of fissionable plutonium occupying in all the transuranic nuclides in the lower fissile zone is made larger than a rate of the fissionable plutonium occupying in all the transuranic nuclides in the upper fissile zone.

The thermal margin in the lower fissile zone is decreased and the thermal margin in the upper fissile zone is increased because a rate of fissionable plutonium occupying in all the nuclear fuel materials in the lower fissile zone is larger than a rate of fissionable plutonium occupying in all the nuclear fuel materials in the upper fissile zone. Since void fraction in the upper fissile zone is higher than void fraction in the lower fissile zone, the increase degree of the thermal margin in the upper fissile zone becomes larger than the decrease degree of the thermal margin in the lower fissile zone, thus in the overall core, the thermal margin is increased. Thus, the safety margin of the light water reactor can be improved more without impairing the economical efficiency of fuel of the light water reactor by that the rate of fissionable plutonium occupying in all the nuclear fuel materials in the lower fissile zone is larger than the rate of fissionable plutonium occupying in all the nuclear fuel materials in the upper fissile zone, because the thermal margin is increased and the safety margin is increased as mentioned above.

It is another characteristic that a plurality of fuel assemblies including transuranic nuclides which are different in the recycle frequency are loaded in the core, and among the fuel assemblies, a plurality of fuel assemblies including the transuranic nuclides having the smallest recycle frequency are disposed in a central region of the core, and between the central region and an outermost layer region of the core, the fuel assemblies including the transuranic nuclides having larger recycle frequencies are disposed on the side of the outermost layer region of the core.

By forming the core disposing the fuel assemblies as mentioned above based on the recycle frequency of the transuranic nuclides included in the fuel assemblies, the number of spent fuel assemblies can be decreased. Namely, by disposing the fuel assemblies including the transuranic nuclides having larger recycle frequencies among the plurality of fuel assemblies loaded in the core on the side of the outermost layer zone of the core, even though the overall core becomes the state of 100% void, the shift of the power distribution in the radial direction toward the central region of the core can be moderated and the number of spent fuel assemblies can be decreased.

The nuclear fuel reprocessing is performed for the spent nuclear fuel included in the spent fuel assemblies taken out from the nuclear reactor. The transuranic nuclides included in the spent nuclear fuel are retrieved by the nuclear fuel reprocessing for the spent nuclear fuel and using the retrieved transuranic nuclides, a fresh fuel assembly is manufactured. The fresh fuel assembly is loaded in the core of the nuclear reactor, during a predetermined operation cycle number, is used in the nuclear reactor, and then is taken out from the nuclear reactor as a spent fuel assembly. The nuclear fuel reprocessing is executed for the spent nuclear fuel included in this spent fuel assembly taken out and the transuranic nuclides are retrieved. As mentioned above, the transuranic nuclides are recycled and used. The recycle frequency of the transuranic nuclide is frequency that the transuranic nuclide is retrieved from the spent nuclear fuel by the nuclear fuel reprocessing, is included in a fresh fuel assembly, and is used in the nuclear reactor.

(A1) In the core of the light water reactor loading a plurality of fuel assemblies having the nuclear fuel material including a plurality of isotopes of the transuranic nuclide, having the nuclear fuel material zone, the height of which is within the range from 20 cm to 250 cm, including a nuclear fuel material, and the height of the nuclear fuel material zone is within the range from 20 cm to 250 cm, and disposing the neutron absorbing member above the nuclear fuel material zone, more preferable constitutions will be explained below.

(A2) Preferably, in A1 aforementioned, it is desirable that the fuel assembly has a lower fuel support member for supporting each lower end portion of a plurality of fuel rods internally forming the nuclear fuel material zone and an upper fuel support member for supporting each upper end portion of the plurality of fuel rods, wherein the plenum is formed above the nuclear fuel material zone in each of the fuel rods, and the neutron absorbing members are disposed below the upper fuel support member.

(A3) Preferably, in A2 aforementioned, it is desirable that the neutron absorbing members are disposed between the mutual plenums of the neighboring fuel rods.

(A4) Preferably, in any one of A1 to A3 aforementioned, it is desirable that a length of the neutron absorbing members in an axial direction of the core is within a range from 20 mm to 700 mm and the distance between an upper end of the nuclear fuel material zone and a lower end of the neutron absorbing members is within a range from 230 mm to 500 mm.

(A5) Preferably, in any one of A1 to A4 aforementioned, it is desirable that a total of cross sectional areas of all the neutron absorbing members is within a range from 10 to 50% of the cross sectional area of a fuel assembly lattice.

(A6) Preferably, in A1 aforementioned, it is desirable that another neutron absorbing member is disposed below the nuclear fuel material zone.

(A7) Preferably, in A2 or A3 aforementioned, it is desirable that a neutron absorbing material filling zone is formed under the nuclear fuel material zone in the fuel rods.

(A8) Preferably, in A7 aforementioned, it is desirable that a length of the neutron absorbing material filling zone in the axial direction of the core (or the fuel assembly) is within a range from 10 mm to 150 mm.

(A9) Preferably, in A7 or A8 aforementioned, it is desirable that an outside diameter of a portion facing to the neutron absorbing material filling zone of the fuel rod is larger than an outside diameter of a portion of the nuclear fuel material zone of the fuel rod and an interval between mutual outside surfaces of the portions facing to the neutron absorbing material filling zone of the neighboring fuel rods is within a range of 1.3 mm or more.

(A10) Preferably, in A2 or A3 aforementioned, it is desirable that an outside diameter of a portions of the plenum of the fuel rod is smaller than an outside diameter of the portion of the nuclear fuel material zone of the fuel rod and is within a range of 3 mm or more and a length of the plenum in the axial direction of the core (or the fuel assembly) is within a range from 400 mm to 2500 mm.

(A11) Preferably, in A2 or A3 aforementioned, it is desirable that the plenums include a first region and a second region disposed above the first region, and an outside diameter of a portion of the first region of the fuel rod is smaller than an outside diameter of a portion of the nuclear fuel material zone of the fuel rod, and an outside diameter of a portion of the second region of the fuel rod is smaller than the outside diameter of the portion of the nuclear fuel material zone of the fuel rod and is larger than the outside diameter of the portion of the first zone, and the neutron absorbing member is disposed between a lower end of the second region and the upper end of the nuclear fuel material zone.

(A12) Preferably, in A2 or A3 aforementioned, it is desirable that the plenums include the first zone and the second zone disposed above the first zone, and the outside diameter of the portions of the fuel rods in the first zone is larger than the outside diameter of the portions of the fuel rods in the second zone and is smaller than the outside diameter of the portions of the fuel rods in the nuclear fuel material zone, and the neutron absorbing members are arranged above the upper end of the first zone.

(A13) Preferably, in any one of A1 to A12 aforementioned, it is desirable that the neutron absorbing member include either of boron and hafnium.

(A14) Preferably, in any one of A7 to A9 aforementioned, it is desirable that the neutron absorbing material filling zone includes either of boron and hafnium.

(A15) Preferably, in A1 aforementioned, it is desirable that the nuclear fuel material zone includes an upper blanket zone, an upper fissile zone, an internal blanket zone, and a lower fissile zone, and the upper blanket zone, upper fissile zone, internal blanket zone, and lower fissile zone are disposed in the axial direction of the core in this order, and the upper fissile zone and lower fissile zone include a plurality of isotopes, and, in a state that fuel assemblies of a burnup of 0 are included, a rate of fissionable plutonium occupying in all the transuranic nuclides in the lower fissile zone is larger than a rate of fissionable plutonium occupying in all the transuranic nuclides in the upper fissile zone.

(A16) Preferably, in A15 aforementioned, it is desirable that in the state that fuel assemblies of a burnup of 0 are included, a total of a height of the lower fissile zone and a height of the upper fissile zone is within a range from 350 mm to 600 mm and the height of the upper fissile zone is within a range from 1.1 times to 2.1 times of the height of the lower fissile zone.

(A17) Preferably, in A15 or A16 aforementioned, it is desirable that in the state that the fuel assemblies of a burnup of 0 are included, an average of an enrichment of fissionable plutonium of all the transuranic nuclides in the lower fissile zone and an enrichment of fissionable plutonium of all the transuranic nuclides in the upper fissile zone is within a range from 16% to 20% and the enrichment of fissionable plutonium of all the transuranic nuclides in the lower fissile zone is within a range from 1.05 times to 1.6 times of the enrichment of fissionable plutonium of all the transuranic nuclides in the upper fissile zone.

(A18) Preferably, in any one of A15 to A17 aforementioned, it is desirable that the lower blanket zone is disposed below the lower fissile zone in the nuclear fuel material zone.

(A19) Preferably, in any one of A1 to A18 aforementioned, it is desirable that a rate of plutonium-239 occupying in all the transuranic nuclides included in the nuclear fuel material zone is either within a range from 40% to 60% or within a range from 5% or more to less than 40%.

(A20) Preferably, in any one of A1 to A19 aforementioned, it is desirable that a rate of a cross sectional area of fuel pellet occupying in a cross sectional area of a unit fuel rod lattice is within a range from 30% to 55%.

Preferably, it is desirable that the fuel assemblies are provided with a plurality of fuel rods, a lower fuel support member for supporting a lower end portion of each of the fuel rods, an upper fuel support member for supporting an upper end portion of each of the fuel rods, and a plurality of neutron absorbing members, wherein the plurality of fuel rods internally have a nuclear fuel material zone, in which a nuclear fuel material including a plurality of isotopes of transuranic nuclides exists, at a height within the range from 20 cm to 250 cm and a plenum formed above the nuclear fuel material zone, and the neutron absorbing members are disposed above the nuclear fuel material zone, and each of the aforementioned elements of (A2) to (A20) for the core of the light water reactor of (A1) are added to the fuel assembly. In the fuel assemblies, the "state that the fuel assemblies of a burnup of 0 are included" of (A15) to (A17) is changed to the "state of a burnup of 0".

(B1) In the core of the light water reactor in which a plurality of fuel assemblies having a nuclear fuel material are loaded, and in a nuclear fuel material zone including the nuclear fuel material, an upper blanket zone, an upper fissile zone, an internal blanket zone, and a lower fissile zone are arranged in the axial direction of the core in this order, and a plurality of isotopes of transuranic nuclides are included in the upper fissile zone and lower fissile zone, and, in a state that fuel assemblies of a burnup of 0 are included, a rate of fissionable plutonium occupying in all the transuranic nuclides in the lower fissile zone is made larger than a rate of fissionable plutonium occupying in all the transuranic nuclides in the upper fissile zone, more preferable constitutions will be explained below.

(B2) Preferably, in B1 aforementioned, it is desirable that, in the state that the fuel assemblies of a burnup of 0 are included, a total of a height of the lower fissile zone and a height of the upper fissile zone is within a range from 350 mm to 600 mm and the height of the upper fissile zone is within a range from 1.1 times to 2.1 times of the height of the lower fissile zone.

(B3) Preferably, in B1 or B2 aforementioned, it is desirable that, in a state that fuel assemblies of a burnup of 0 are included, an average of an enrichment of fissionable plutonium of all the transuranic nuclides in the lower fissile zone and an enrichment of fissionable plutonium of all the transuranic nuclides in the upper fissile zone is within a range from 16% to 20% and the enrichment of fissionable plutonium of all the transuranic nuclides in the lower fissile zone is within a range from 1.05 times to 1.6 times of enrichment of fissionable plutonium of all the transuranic nuclides in the upper fissile zone.

(B4) Preferably, in any one of B1 to B3 aforementioned, it is desirable that the lower blanket zone is disposed under the lower fissile zone in the nuclear fuel material zone.

(B5) Preferably, in any one of B1 to B4 aforementioned, it is desirable that a rate of plutonium-239 occupying in all the transuranic nuclides included in the nuclear fuel material zone is within either of a range from 40% to 60% and a range from 5% or more to less than 40%.

(B6) Preferably, in any one of B1 to B5 aforementioned, it is desirable that a rate of a cross sectional area of fuel pellet occupying in a cross sectional area of an unit fuel rod lattice is within a range from 30% to 55%.

Preferably, it is desirable that the fuel assembly is provided with a plurality of fuel rods, a lower fuel support member for supporting each lower end portion of the plurality of fuel rods, an upper fuel support member for supporting each upper end portion of the plurality of fuel rods, and neutron absorbing members, wherein the plurality of fuel rods internally form a nuclear fuel material zone in which a nuclear fuel material including a plurality of isotopes of a transuranic nuclide exists, and the nuclear fuel material zone includes the upper blanket zone, upper fissile zone, internal blanket zone and lower fissile zone, and the upper blanket zone, upper fissile zone, internal blanket zone, and lower fissile zone are arranged in the axial direction of the core in this order, and the upper fissile zone and lower fissile zone include the plurality of isotopes, and in the state of a burnup of 0, a rate of fissionable plutonium occupying in all the transuranic nuclides in the lower fissile zone or a ratio of fissionable plutonium to a total of all nuclear fuel material in the lower fissile zone is larger than a rate of fissionable plutonium occupying in all the transuranic nuclides in the upper fissile zone or larger than a ratio of fissionable plutonium to a total of all nuclear fuel material in the upper fissile zone, and each of the elements of (B2) to (B6) for the core of the light water reactor of (B1) are added to the fuel assembly. In the fuel assemblies, the "state that the fuel assemblies of a burnup of 0 are included" of (B2) and (B3) is changed to the "state of a burnup of 0".

Advantageous Effect of the Invention

According to the present invention, the safety margin can be improved more without impairing the economical efficiency of fuel of the light water reactor.

DETAILED DESCRIPTION OF THE PREFERRED EMBODIMENTS

Figure 1:
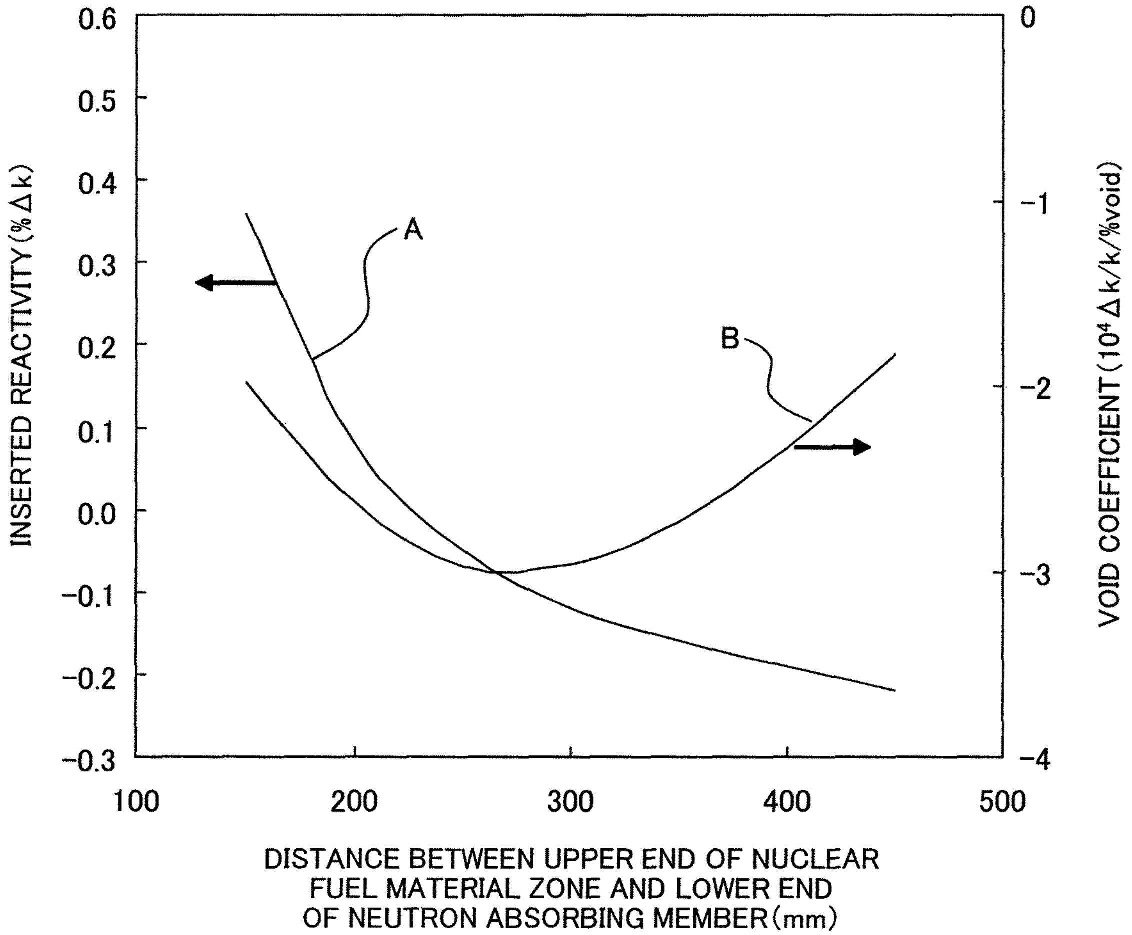
FIG. 1 is a characteristic diagram showing a relation between a distance between an upper end of a nuclear fuel material zone and a lower end of a neutron absorbing member, and a relation between the distance and void coefficient and inserted reactivity when the overall core becomes a state of 100% void.

The inventors made various studies in order to realize a light water reactor capable of further increasing safety margin without impairing the economical efficiency of fuel of the light water reactor. As a result, the inventors found that in a core having structure of any one of (1) neutron absorbing members are disposed above nuclear fuel material zone having nuclear fuel material existing in the core and including transuranic nuclides and the nuclear fuel material zone having a height within a range from 20 cm to 250 cm, (2) an outside diameter of a plenum which is formed above nuclear fuel material zone and has a length within a range from 400 mm to 2500 mm is 3 mm or more and smaller than an outside diameter of a fuel rod in the nuclear fuel material zone, and (3) a rate of fissionable plutonium (hereinafter referred to as fissionable Pu) occupying in all the nuclear fuel materials in a lower fissile zone is made larger than a rate of fissionable plutonium occupying in all the nuclear fuel materials in an upper fissile zone, the safety margin can be increased more without impairing the economical efficiency of fuel of the light water reactor.

Furthermore, the inventors also studied multiple-recycling of nuclear fuel material including transuranic nuclides. As a result, the inventors newly found that (4) the number of spent fuel assemblies can be reduced by that among a plurality of fuel assemblies different in recycle frequency of the transuranic nuclides, a plurality of fuel assemblies including the transuranic nuclides having the smallest recycle frequency are disposed at a central part of the core, and between the central part and the outermost layer zone of the core, the fuel assemblies including the transuranic nuclides having larger recycle frequencies are disposed on the side of the outermost layer zone of the core. The nuclear fuel material includes fissionable materials (U-235. Pu-239, etc.) and fertile materials (Th-232, U-238, etc.).

The safety margin is handled by classifying the safety level into the following three stages. The level 1 is a design basis accident, and the level 2 is a first accident beyond the design basis accident, and the level 3 is a second accident beyond the design basis accident.

The design basis accident is an object event of safety examination (an abnormal transient and an accident). For the design basis accident, the intrinsic safety of the nuclear reactor and ordinary safety system operate, thus with respect to “abnormal transient”, it is required to design the reactor so as to be able to control the reduction of the MCPR (minimum critical power ratio) so long as the fuel rod is not burn out. The fuel rod is reusable. With respect to “accident”, it is required to design the reactor so as to maintain a highest temperature of 1200° C. or lower of a cladding of the fuel rod, and a shape of the fuel rod, and be able to continue the cooling of the fuel rod.

The first accident beyond the design basis accident is currently not an object event of safety examination, though in the light water reactor, it is an event to be taken into account at the time of design. In the first accident beyond the design basis accident, an accident considered to be severest is a composite event that coolant supply pumps (recirculation pumps or internal pumps) for supplying coolant to the core are all stopped and at that time, an accident that all the control rods are not operated occurs simultaneously. For the composite event, it is required to design the reactor so that a high pressure core injection pump of the emergency core cooling system (the capacity is about 5% of the total capacity of the coolant supply pumps) operates, and the fuel rod is automatically lowered down to the coolable power at a negative reactivity coefficient due to the intrinsic safety of the BWR and at the flow rate of the high pressure core injection pump.

The second accident beyond the design basis accident is an event on assumption that the overall core becomes a state of 100% void regardless of the accident scenario. For this second accident beyond the design basis accident, it is required to design so as to prevent insertion of positive reactivity.

The core of (1) aforementioned is equivalent to the core of the light water reactor realizing the safety margin of the level 3 (the second accident beyond the design basis accident). The core of (2) aforementioned is equivalent to the core of the light water reactor realizing the safety margin of the level 2 (the first accident beyond the design basis accident).

The core structure of (1) to (4) aforementioned will be explained below in detail. The core structures of (1) to (4) aforementioned are respectively applied to the light water reactor for filling and recycling the transuranic nuclides recovered from the spent nuclear fuel by the nuclear fuel recycling in the fuel rods of fresh fuel assemblies.

In the light water reactor, the core of the light water reactor with the performance as a breeder reactor improved will be explained below. For example, a boiling water breeder reactor having a residual ratio of fissionable Pu of 1 or more was realized firstly by Japanese Patent 3428150. To realize a breeder reactor in the light water reactor, the neutron energy in the core must be kept high. However, the mass of hydrogen atoms forming water used as coolant in the light water reactor is generally small compared with the mass of Na used as coolant in a fast breeder reactor, so that in a light water breeder reactor, the rate of coolant per unit volume of the nuclear fuel material must be made smaller because the neutron energy lost by one collision is large. When the recycling is performed with a nuclear fuel material that a rate of Pu-239 occupying in all the TRUs is within a range of larger than 60%, faults may be caused that (a) the cooling capacity for the nuclear fuel material in the core is insufficient, (b) the burnup of the fuel assembly is reduced and the economical efficiency of fuel is impaired, and (c) the fuel rod gap composing the fuel assembly becomes too narrow and the manufacture of fuel assemblies becomes difficult. When the recycling is performed with a nuclear fuel material that the rate of Pu-239 occupying in all the TRUs is lower than 40%, faults may be caused that (d) a rate of odd-numbered nuclides having a large nuclear fission cross section becomes lower than a rate of even-numbered nuclides having a small nuclear fission cross section and it is difficult to realize a residual ratio of 1 or more of fissionable Pu and (e) the core becomes large in order to maintain the critical state, thus the void coefficient which is an index of safety gets worse. Therefore, in the light water breeder reactor, it is necessary to keep the rate of Pu-239 occupying in all the TRUs within a range from 40% to 60%.

Further, when the recycling is performed with a nuclear fuel material in which a rate of Pu-240 occupying in all the TRUs is within a range of smaller than 35%, the aforementioned faults of (a), (b), and (c) are caused. When the recycling is performed with a nuclear fuel material that the rate of Pu-240 occupying in all the TRUs is larger than 45%, the faults of (d) and (e) are caused. Therefore, in the light water breeder reactor, it is necessary to keep the rate of Pu-240 occupying in all the TRUs within a range from 35% to 45%.

Next, the core of the light water reactor (TRU burner reactor) for using TRUs examined to be disposed as a long-life radioactive waste material when they become unnecessary as a nuclear fuel material and finally realizing fission of all the TRUs except the TRUs for one core will be explained. The inventors considered, when the TRUs become unnecessary, to permit the TRUs (are permitted) to fission to reduce in quantity, gather the TRUs scattered in many cores according to the reduction quantity, and finally, maintain the TRUs only in one core. At this time, to prevent the TRUs from becoming a long-life radioactive waste material, when the nuclear fuel material is recycled in a state that the rate of Pu-239 occupying in all the TRUs is 40% or more, the speed for reducing the TRUs is slow and it takes a very long period of time to gather the TRUs in one core. Further, when the recycling is performed using a nuclear fuel material that a rate of Pu-239 occupying in all the TRUs is lower than 5%, the core becomes large and the void coefficient gets worse. Therefore, in the TRU burner reactor, the rate of Pu-239 occupying in all the TRUs must be set within the range from 5% or more to less than 40%.

Further, when the nuclear fuel material is recycled in a state that a rate of Pu-240 occupying in all the TRUs is 35% or lower in order to prevent the TRUs from becoming a long-life waste material, the speed for reducing the TRUs is slow and it takes a very long period of time to gather the TRUs in one core. Further, when the recycling is performed using a nuclear fuel material that a rate of Pu-240 occupying in all the TRUs is 45% or more, the core becomes large and the void coefficient gets worse. Therefore, in the TRU burner reactor, the rate of Pu-240 occupying in all the TRUs must be set within the range from 35% to 45%.

Here, an overview of a parfait core which is a kind of the core of the light water reactor will be explained. The parfait core has fuel assemblies, which are fresh fuel assemblies (the burnup is 0) to be loaded, including a lower blanket zone, a lower fissile zone, an internal blanket zone, an upper fissile zone and an upper blanket zone disposed in this order from an lower end to an upper end. Therefore, also in the parfait core, a lower blanket zone, a lower fissile zone, an internal blanket zone, an upper fissile zone and an upper blanket zone are formed from the lower end of the nuclear fuel material zone toward the upper end of the nuclear fuel material zone. The lower fissile zone and upper fissile zone include TRU oxide fuel (or mixed oxide fuel of a TRU oxide and an Uranium oxide) including a fissionable material. The lower blanket zone, internal blanket zone, and upper blanket zone have uranium oxide fuel including a small quantity of content of the fissionable material and a large quantity of content of the fertile material such as U-238.

Each fuel rod included in the fuel assemblies loaded in the core of the light water reactor internally forms a plenum. The plenum stores a volatile fission product (FP gas) generated by fission of a fissionable material included in the nuclear fuel material filled in the fuel rod and suppresses the increase of inner pressure of the fuel rod.

The aforementioned core structure of (1) will be explained below.

Cooling water (coolant) for cooling the fuel assemblies loaded in the core of the BWR flows in the core from underneath as subcooling water at about 5° C. to 10° C. and becomes a two-phase flow including saturated water, steam, and water while cooling the fuel assemblies. This cooling water is a two-phase flow having a void volume rate of about 60% to 90% at the core exit. Therefore, the distribution of hydrogen atoms for greatly contributing to moderation of neutrons in the axial direction of the core decreases from the lower end of the core toward the upper end of the core. Such a BWR has a characteristic that even when the power of the core is increased and the core flow rate is lowered from some cause, and the temperature of the fuel rods rises, and there is fear that the fuel soundness may be impaired, the void fraction at the core outlet is increased, and the neutron quantity leaking upward from the core is increased, and negative reactivity is inserted to the core, and the power of the nuclear reactor is automatically reduced, thus the soundness of the fuel rods is maintained.

The inventors studied a further improvement measure of the safety margin in the BWR having the aforementioned characteristic. In this study, the second accident beyond the design basis accident aforementioned is taken into account. The overview of this study will be explained below.

The inventors, when studying the improvement measure of the safety margin, used a core of a BWR having a nuclear fuel material zone including TRUs obtained by the nuclear fuel reprocessing at a height within the range from 20 cm to 250 cm as the core of the light water reactor which is a study object. In the BWR forming the nuclear fuel material zone including the TRUs at a height within the range from 20 cm to 250 cm, even during the operation of the BWR, there are a large quantity of neutrons leaking upward and downward from the nuclear fuel material zone.

If the height of the nuclear fuel material zone is lowered to less than 20 cm, even in the core with the fuel rods disposed closely, the loading quantity of the nuclear fuel material is reduced, and when continuing the rated power operation, the fuel assemblies must be exchanged frequently. Therefore, the operation rate of the nuclear power generation plant is lowered and the economical efficiency of fuel is impaired. When the height of the nuclear fuel material zone is increased higher than 250 cm, the neutrons leaking from the nuclear fuel material zone is reduced in quantity and even if the neutron absorbing member is disposed above the nuclear fuel material zone, when the overall core enters the state of 100% void, positive reactivity is inserted to the nuclear fuel material zone. Therefore, the height of the nuclear fuel material zone is set within the range from 20 cm to 250 cm.

When the overall core becomes the state of 100% void from some cause, the self control function which is an intrinsic safety function of the BWR is impaired. The self control function is a function that automatically reduces the reactor power when the core flow rate is suddenly lowered from some cause, by that the void fraction in the nuclear fuel material zone is increased suddenly, and the void fraction of the two-phase flow in the reflector zone formed above the nuclear fuel material zone is increased, and the neutron leaking rate from the nuclear fuel material zone is increased, and the effective neutron multiplication factor in the nuclear fuel material zone is decreased.

A part of the neutrons leaked upward from the nuclear fuel material zone is reflected from the component member (in the current fuel rods, a part of a cladding made of zirconium alloy) forming the plenum of each fuel rod and is returned to the nuclear fuel material zone. Even though the overall core becomes the state of 100% void, the quantity of neutrons leaking upward from the nuclear fuel material zone is increased because the rate of the two-phase flow existing between the plenums of the neighboring fuel rods to the component member is lowered. Therefore, the quantity of neutrons reflected from the component member for forming the plenums and returned to the nuclear fuel material zone is increased. However, since the increase quantity of the neutron leak quantity from the nuclear fuel material zone is small compared with the increase quantity of the infinite neutron multiplication factor when the void fraction in the nuclear fuel material zone becomes the 100% void state from the value at the time of the rated power operation, positive reactivity is inserted to the core, concretely, to the nuclear fuel material zone.

As a result of various studies, the inventors confirmed newly that even when the overall core becomes the state of 100% void, positive reactivity is not inserted to the core because the neutrons leaking upward from the nuclear fuel material zone are absorbed by the neutron absorbing member (for example, $B_4C$ or Hf) disposed above the nuclear fuel material zone. Due to the aforementioned arrangement of the neutron absorbing member, the insertion of positive reactivity can be prevented, so that the margin for the intrinsic safety of the BWR is improved, and as a result, the safety margin of the BWR is improved. Therefore, the inventors found a new knowledge that by applying the core structure of (1) to the core of the light water reactor, the safety margin can be improved for a multiple accident while breeding ratio of the TRU is kept.

The study results aforementioned will be explained below in detail.

The results of the studies executed by the inventors for an object of the core of the light water breeder reactor will be explained below. The light water breeder reactor as a study object is the core of a BWR that for example, the electric power is 1350 MW, and 720 fuel assemblies having 271 fuel rods per each fuel assembly are loaded in the core, and the breeding ratio is 1.01. Each fuel assembly has a nuclear fuel material including TRUs obtained by the nuclear fuel reprocessing and the rate of Pu-239 occupying in all the TRUs included at the time of a burnup of 0 is a value within the range from 40% to 60%.

The inventors disposed the neutron absorbing members (including $B_4C$ and Hf, for example) between the fuel rods at the position of each plenum in the fuel assemblies in the axial direction of the fuel assemblies based on the knowledge concerning the core structure of (1). In each fuel rod, the plenum is positioned above the upper end of the active fuel length (the nuclear fuel material zone). Therefore, the neutron absorbing members are disposed between the plenums downward from the lower end of the upper fuel support member (for example, the upper tie-plate) of each fuel assembly for holding the upper end portion of each fuel rod and upward from the nuclear fuel material zone. When $B_4C$ is used, for example, neutron absorbing members composed so as to fill $B_4C$ in a sealed container are disposed between the plenums. When Hf is used, Hf, which is a metal, is formed in a plate or bar shape for example, and is disposed between the plenums as a neutron absorbing member.

During the operation of the BWR, in each fuel assembly, a vapor-liquid two-phase flow flows between the fuel rods at the plenum position. Even when the BWR is stopped, cooling water exists in the core. The two-phase flow or cooling water existing between the fuel rods upward from the nuclear fuel material zone functions as a reflector of neutrons. Therefore, it may be said that the neutron absorbing members are disposed in the reflector above the nuclear fuel material zone. The zone where the two-phase flow or cooling water exists upward from the nuclear fuel material zone is referred to as a reflector zone.

Figure 18:
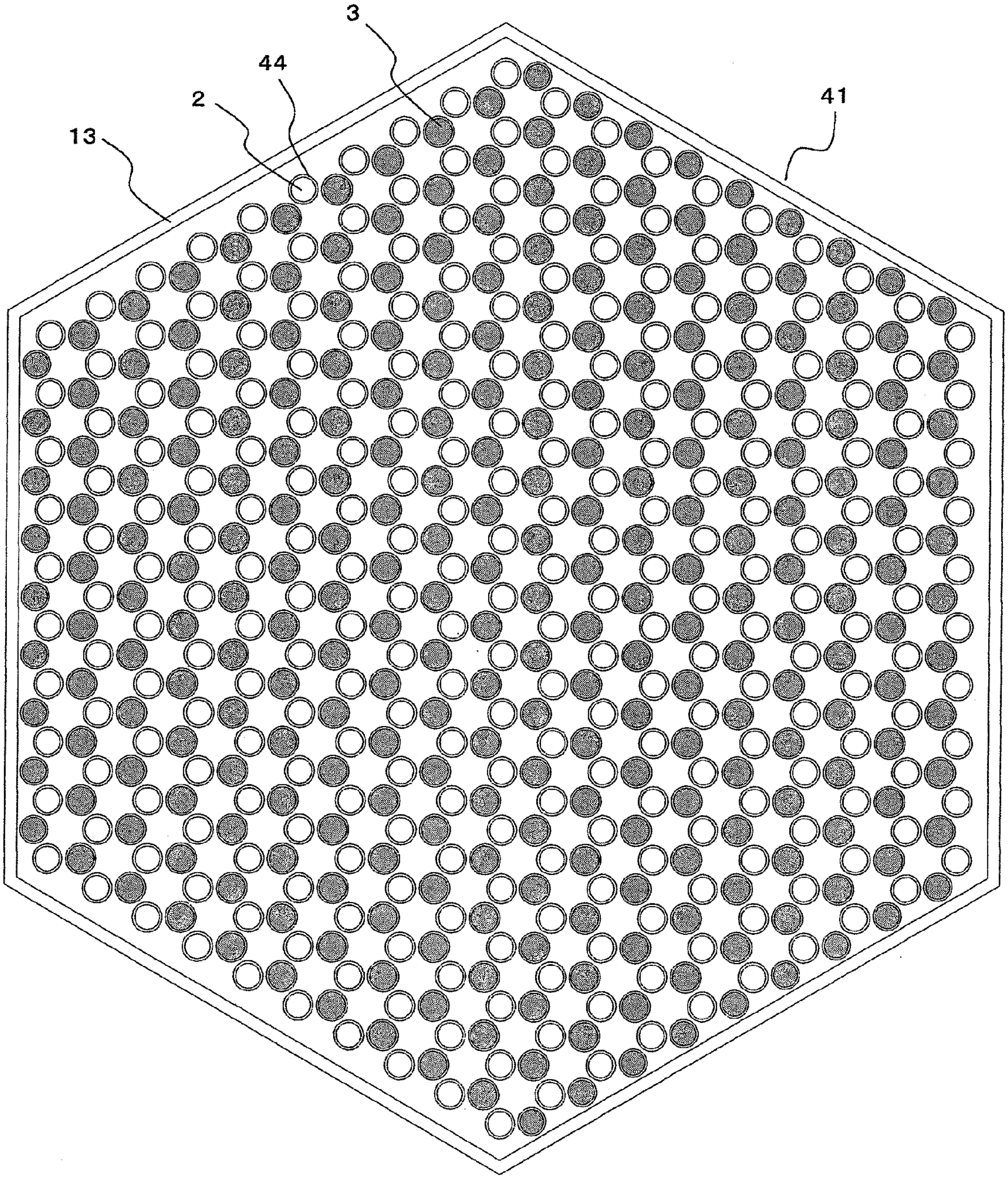
FIG. 18 is a sectional view taken along a line II-II of FIG. 17.

The inventors studied the arrangement of the neutron absorbing members between the fuel rods at the plenum position. FIG. 1 shows changes of the inserted reactivity to the core and void coefficient in the state that the overall core becomes 100% void due to the distance between the upper end of the nuclear fuel material zone and the lower end of the neutron absorbing members disposed between the plenums (the distance between the nuclear fuel material zone and the neutron absorbing members). A characteristic A indicates a relation between a distance between the nuclear fuel material zone and the neutron absorbing members and the void coefficient and a characteristic B indicates a relation between the distance and the inserted reactivity. The distance between the nuclear fuel material zone and the neutron absorbing members is a distance in the axial direction of the core. The characteristics A and B are characteristics obtained from an object of the core of the light water breeder reactor in which the fuel assemblies including the neutron absorbing members with a length of 500 mm disposed in the neighborhood of each fuel rod as shown in FIG. 18 are loaded.

If the lower end of each neutron absorbing member approaches excessively the upper end of the nuclear fuel material zone the effect that the neutrons are reflected on the nuclear fuel material zone is lowered due to the influence of the neutron absorbing member during the operation of the BWR. As a result, the effective neutron multiplication factor in the nuclear fuel material zone is lowered, and to compensate for the lowering, the height of the nuclear fuel material zone must be increased, and even though the overall core becomes the state of 100% void, the inserted reactivity to the core is increased. If the distance between the nuclear fuel material zone and the neutron absorbing members becomes shorter than 230 mm, even when the overall core becomes the state of 100% void, positive reactivity is inserted to the core. Therefore, when the overall core becomes the state of 100% void, the distance between the nuclear fuel material zone and the neutron absorbing members must be set to 230 mm or more in order to avoid the application of positive reactivity to the core.

Further, according to the characteristic B, if the distance between the nuclear fuel material zone and the neutron absorbing members becomes shorter, the volume of the two-phase flow zone (the reflector zone) between the nuclear fuel material zone and the neutron absorbing members becomes smaller, and the change of the effective neutron multiplication factor due to the change of the void coefficient of the core becomes smaller, and thus the void coefficient gets worse. If the distance between the nuclear fuel material zone and the neutron absorbing members becomes extremely longer, the influence of the reflector zone on the nuclear fuel material zone becomes smaller. Therefore, probability that the neutrons leaking in the reflector zone return again to the nuclear fuel material zone is increased and the void coefficient gets worse. When the distance between the nuclear fuel material zone and the neutron absorbing members exceeds 500 mm, the void coefficient becomes $-1\times10^{-4}\%$ Δk/k/% void or less and there are possibilities that a fault (for example, an event that restrictive conditions of the MCPR cannot be satisfied) may be caused from viewpoint of a transient characteristic of the core. From the aforementioned, it is preferable that the distance between the nuclear fuel material zone and the neutron absorbing members in the axial direction of the core is within the range from 230 mm to 500 mm.

Further, even during the rated operation of the BWR, the neutron absorbing members disposed in the reflector zone absorb neutrons leaking upward from the nuclear fuel material zone. If the neutron absorbing members approach excessively the upper end of the nuclear fuel material zone, the quantity of neutrons returned from the reflector zone to the nuclear fuel material zone is reduced by the neutron absorbing function of the neutron absorbing members during the rated operation of the nuclear reactor. Therefore, the reactor power at the upper end portion of the nuclear fuel material zone is reduced. When the distance between the nuclear fuel material zone and the neutron absorbing members is 230 mm or longer, such a problem will not arise.

Figure 2:
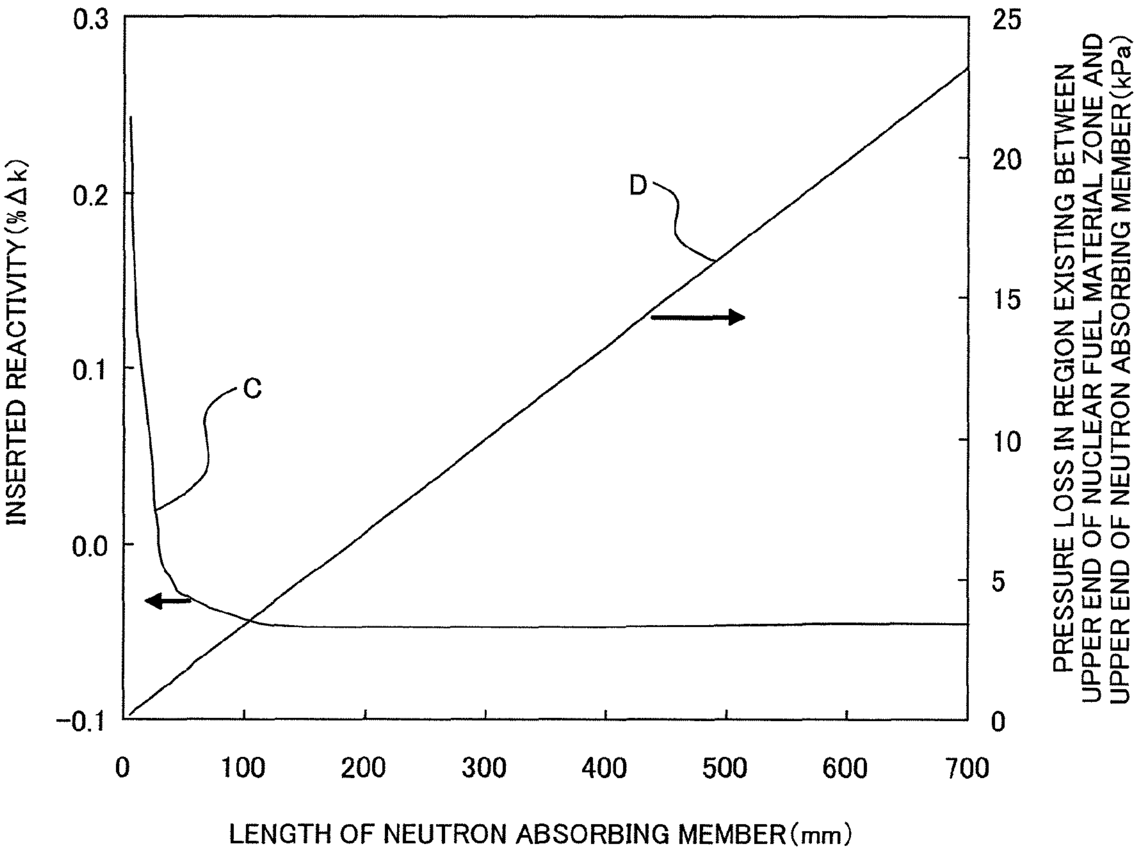
FIG. 2 is a characteristic diagram showing a relation between a length of a neutron absorbing member and inserted reactivity when overall core becomes a state of 100% void, and a relation between the length and pressure loss in a region existing between an upper end of a nuclear fuel material zone and an upper end of a neutron absorbing member.

Next, the inventors studied the length of the neutron absorbing members in the axial direction of the fuel assemblies. A relation between the length of the neutron absorbing members and the inserted reactivity and a relation between the length and pressure loss between the upper end of the nuclear fuel material zone and the upper end of the neutron absorbing members are shown in FIG. 2. A characteristic C indicates change of the inserted reactivity due to the length of the neutron absorbing members. A characteristic D indicates change of the pressure loss between the upper end of the nuclear fuel material zone and the upper end of the neutron absorbing members due to the length of the neutron absorbing members. The characteristics C and D are characteristics when the distance between the upper end of the nuclear fuel material zone and the upper end of the neutron absorbing members is 300 mm.

When the length of the neutron absorbing members becomes less than 20 mm, positive reactivity is inserted to the core (refer to the characteristic C shown in FIG. 2) in a state that even though the overall core becomes the state of 100% void. Thus, the length of the neutron absorbing members is set to 20 mm or more. When the length of the neutron absorbing members exceeds 700 mm, the increase quantity of the pressure loss between the nuclear fuel material zone and the neutron absorbing members becomes 20% or more of the pressure loss of the overall core. The influence of such an increase in the pressure loss between the nuclear fuel material zone and the neutron absorbing members on the characteristic of the core cannot be ignored. Therefore, the length of the neutron absorbing members is set to 700 mm or less.

Thus, it is preferable that the length of the neutron absorbing members is within the range from 20 mm to 700 mm.

The neutron absorbing members may be disposed under the nuclear fuel material zone. When the overall core becomes the state of 100% void in the state that the neutron absorbing members are disposed under the nuclear fuel material zone, the neutrons leaking downward from the nuclear fuel material zone can be absorbed by the neutron absorbing members. Therefore, even though the overall core becomes the state of 100% void, the quantity of neutrons which leak downward from the nuclear fuel material zone and are returned to the nuclear fuel material zone is reduced extremely by disposing the neutron absorbing members under the nuclear fuel material zone. Also in this case, even though the overall core becomes the state of 100% void, positive reactivity is not inserted to the core.

Figure 27:
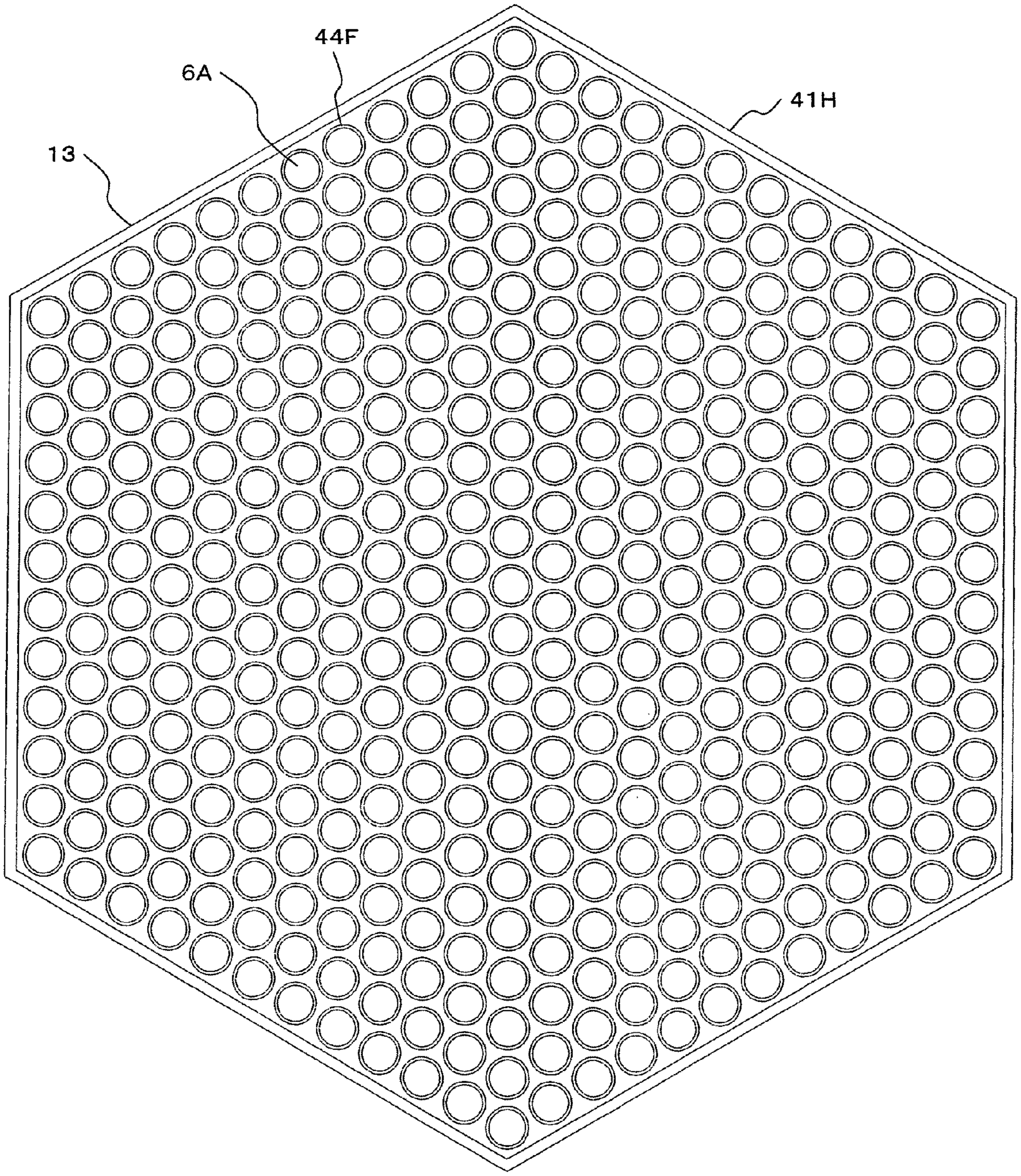
FIG. 27 is a sectional view taken along a line IV-IV of FIG. 25.

To dispose the neutron absorbing members under the nuclear fuel material zone, the neutron absorbing members may be disposed at the lower end of each fuel rod included in the fuel assemblies. Concretely, a neutron absorbing material (for example, $B_4C$ or Hf) is filled (for example, refer to FIGS. 17 and 27) at the lower end in the cladding of each fuel rod. A plurality of fuel pellets including TRUs are filled in the cladding above the neutron absorbing member filling zone. An outside diameter of the lower end portion of the fuel rod where the neutron absorbing material filling zone exists is the same as the outside diameter of the fuel rod above the neutron absorbing material filling zone. The length of the neutron absorbing material filling zone is within a range from 10 mm to 150 mm. To minimize the quantity of neutrons which leak downward from the nuclear fuel material zone and are returned to the nuclear fuel material zone smallest, it is preferable to permit the upper end of the neutron absorbing material filling zone to make contact with the lower end of the nuclear fuel material zone. However, even if the upper end of the neutron absorbing material filling zone is separated away from the lower end of the nuclear fuel material zone by 5 mm at its maximum, even when the overall core becomes the state of 100% void, the insertion of positive reactivity to the core can be avoided. The upper end of the neutron absorbing material filling zone disposed under the nuclear fuel material zone is separated downward away from the lower end of the nuclear fuel material zone, thus the bad influence on the power in the lower end portion of the nuclear fuel material zone by the absorption of neutrons in the neutron absorbing material filling zone can be reduced. The neutron absorbing material filling zone is formed separately from the control rod inserted into the core from underneath.

In the BWR, the control rods are inserted between the fuel assemblies loaded in the core from the underneath of the core. Therefore, a neutron absorbing material is disposed under the nuclear fuel material zone except the control rod. The arrangement of the neutron absorbing material under the nuclear fuel material zone can suppress remarkably the return of neutrons leaking under the nuclear fuel material zone to the nuclear fuel material zone.

Next, the study results by the inventors of an object of the core of the TRU burner reactor described in R. TAKEDA et al., Proc. of International Conference on Advanced Nuclear Fuel Cycles and Systems. GLOBAL '07 Boise, USA, September, 2007, P. 1725 will be explained. The core of the TRU burner reactor as an object of study is the core of a BWR that for example, is loaded with 720 fuel assemblies having 397 fuel rods per each fuel assembly, having an electric power of 1350 MW.

When repeating the recycling of the TRUs in order to reduce the TRUs in quantity, namely, when repeating, every operation recycle, the loading of the fuel assemblies having a nuclear fuel material including TRUs obtained by the nuclear fuel reprocessing wherein the rate of Pu-239 occupying in all the TRUs included at the point of time when the burnup is 0 is within the range from 5% to below 40% to the core, the reactivity rate by the fast neutron flux is high compared with a core of a breeding ratio of 1, so that there is a case that an diameter of the neutron absorbing member disposed above the nuclear fuel material zone must be large compared with the core in the neighborhood of the breeding ratio of 1. In this case, naturally, the outside diameter of the plenum portion of each fuel rod is narrower than the outside diameter of the lower portion of the fuel rod than the plenum. However, even in the core of the TRU burner reactor, preferably, it is desirable that the distance between the nuclear fuel material zone and the neutron absorbing members is within the range from 230 mm to 500 mm and the length of the neutron absorbing members is within the range from 20 mm to 700 mm.

Even in the core of the TRU burner reactor, similarly to the light water breeder reactor, it is possible to dispose the neutron absorbing members ($B_4C$ or Hf) under the nuclear fuel material zone. Even in the TRU burner reactor, the control rods are inserted into the core from underneath. Similarly to the light water breeder reactor, when the neutron absorbing members are disposed at the lower end of the fuel rods under the nuclear fuel material zone, to obtain an essential effect by the neutron absorbing members, there is a case that it is desirable to make the outside diameter of the lower part of the fuel rod in which the neutron absorbing material filling zone is formed lager than the outside diameter of the fuel rods above the neutron absorbing material filling zone. However, the width of the gap formed between the fuel rods is controlled not to be 1.3 mm or less at the lower end of the fuel rods in which the neutron absorbing material filling zone is formed, in consideration of the pressure loss of the fuel assemblies.

Similarly to the light water breeder reactor, it is preferable that the length of the neutron absorbing material filling zone is within the range from 10 mm to 150 mm. The upper end of the neutron absorbing material filling zone and the lower end of the nuclear fuel material zone can be separated from each other by 5 mm at its maximum.

Figure 3:
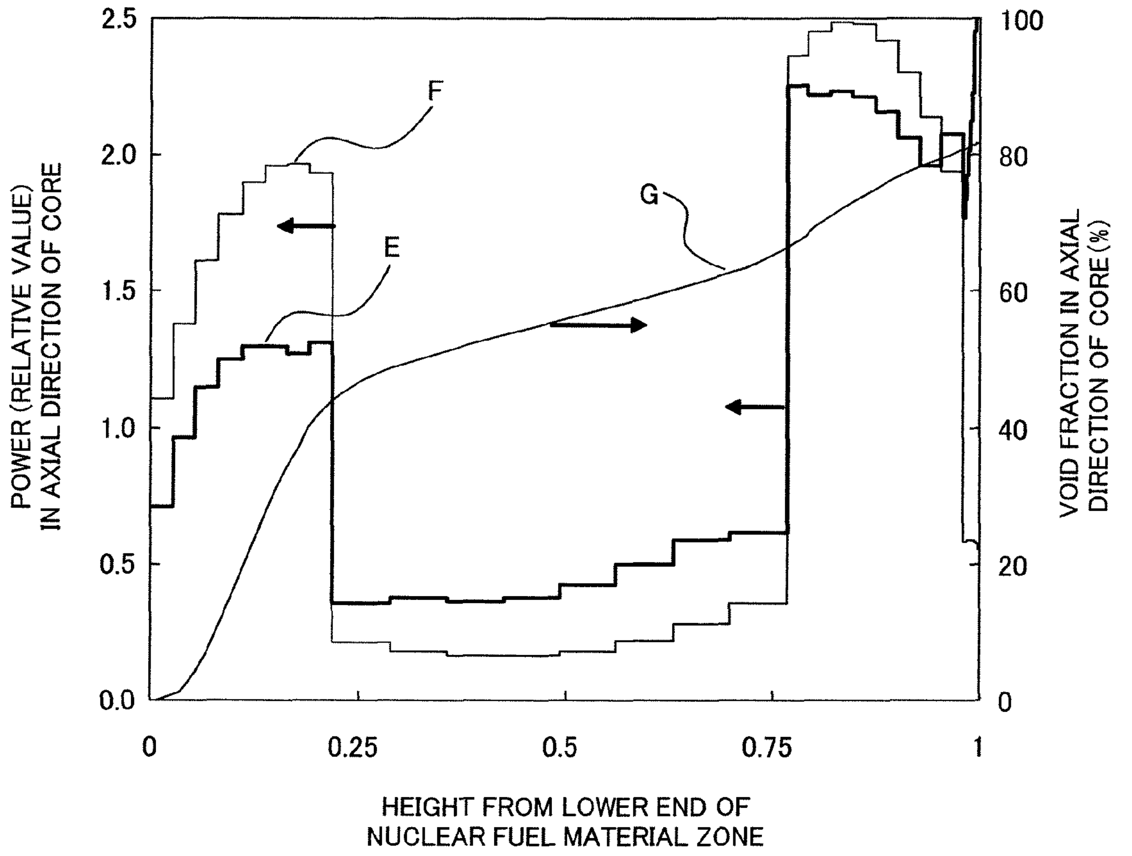
FIG. 3 is a characteristic diagram showing a relation between a height from a lower end of the nuclear fuel material zone and power distribution in an axial direction of the core, and a relation between the height and void fraction distribution in the axial direction of the core.

The inventors studies various characteristics of the core of the light water reactor when the overall core becomes the state of 100% void from some cause. Firstly, in the nuclear fuel material zone, a power distribution in the axial direction and a void fraction distribution in the axial direction will be explained by referring to FIG. 3. In FIG. 3, a characteristic E indicates an average power distribution in the axial direction of the core during the rated power operation of the nuclear reactor. A characteristic F indicates an average power distribution in the axial direction of the core when the overall core becomes the state of 100% void from some cause during the rated power operation which is one of the severest composite events as a beyond design basis accident. A characteristic G indicates an average void fraction distribution in the axial direction of the core in correspondence with the power distribution of the characteristic E. Each characteristic shown in FIG. 3 is obtained from an object of the TRU burner reactor, though even in the light water breeder reactor, characteristics showing the similar tendency to each characteristic shown in FIG. 3 can be obtained.

According to FIG. 3, it is found that when the overall core becomes the state of 100% void, the power distribution in the axial direction of the core is shifted on the lower end side of the nuclear fuel material zone and the lower reflector zone existing under the nuclear fuel material zone plays a role of a dump tank of surplus neutrons generated at the time of the accident. The lower reflector zone is a zone existing under the nuclear fuel material zone in which there exists the gap formed between the fuel rods under the lower end of the nuclear fuel material zone and cooling water under the fuel holding portion of the lower tie-plate in the lower tie-plate.

Figure 4:
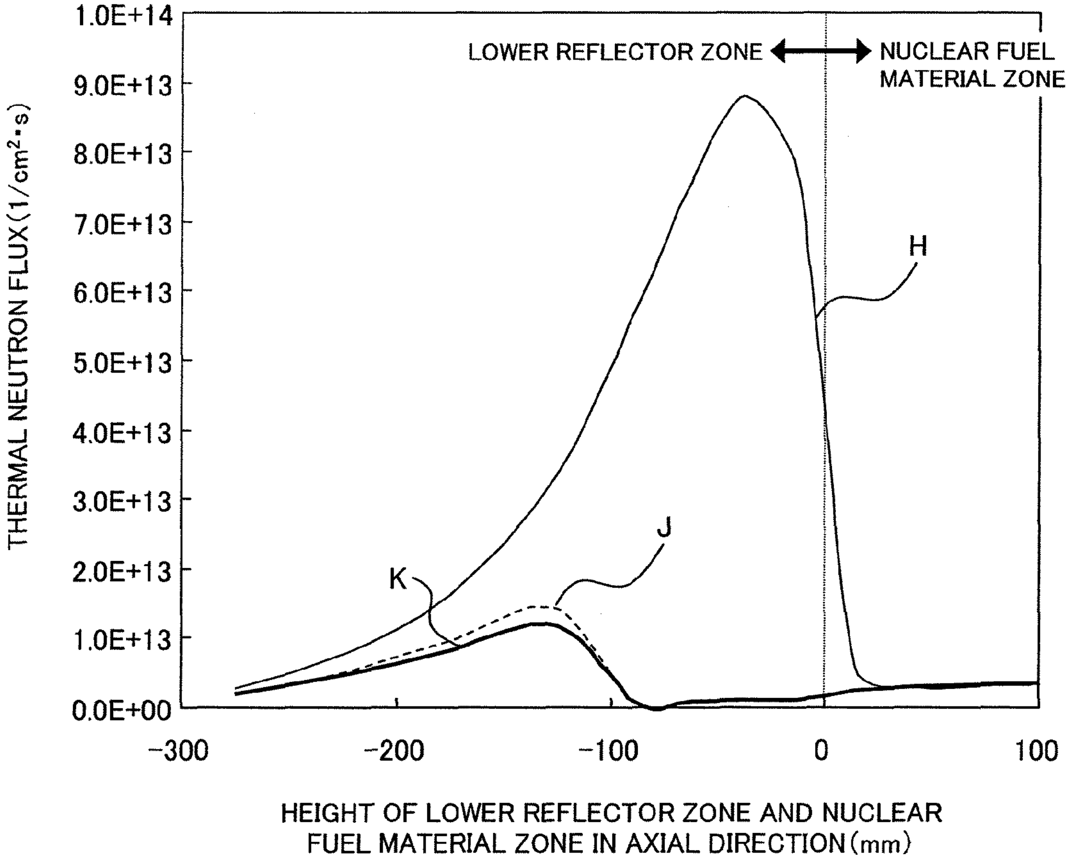
FIG. 4 is an explanatory drawing showing a thermal neutron flux distribution in an axial direction in a lower reflector zone and nuclear fuel material zone.

When all the control rods are withdrawn from the nuclear fuel material zone, that is, when the upper end of the neutron absorbing material filling zone of the control rods is disposed under the nuclear fuel material zone and in the neighborhood of the lower end of the nuclear fuel material zone, in the nuclear fuel material zone having no lower blanket zone, the thermal neutron flux distribution in the axial direction of the core when the overall core becomes the state of 100% void from some cause, is indicated by a characteristic H in FIG. 4. A characteristic J shown in FIG. 4 indicates a thermal neutron flux distribution in the axial direction of the core when in the fuel rods, the neutron absorbing material is disposed in the portion under the nuclear fuel material zone, and the outside diameter of the fuel rods in the portion with the neutron absorbing material filled is the same as the outside diameter of the fuel rods above the portion with the neutron absorbing material filled. A characteristic K shown in FIG. 4 indicates a thermal neutron flux distribution in the axial direction of the core when in the fuel rods, the neutron absorbing material is disposed in the portion under the nuclear fuel material zone, and the outside diameter of the fuel rods in the portion with the neutron absorbing material filled is larger than the outside diameter of the fuel rods above the portion with the neutron absorbing material filled. Both characteristics J and K indicate the thermal neutron flux distribution in the axial direction of the core in a state that the control rods are withdrawn when the characteristic H is obtained and in the state that the overall core becomes the state of 100% void from some cause in the nuclear fuel material zone. The thermal neutron flux distribution of the characteristics J and K is remarkably lowered from that of the characteristic H, so that the neutron absorbing material is disposed under the nuclear fuel material zone, thus even when the overall core becomes the state of 100% void from some cause, the lower reflector zone existing under the nuclear fuel material zone plays a role of the dump tank of neutrons. Therefore, an occurrence of excess reactivity can be prevented.

Figure 5:
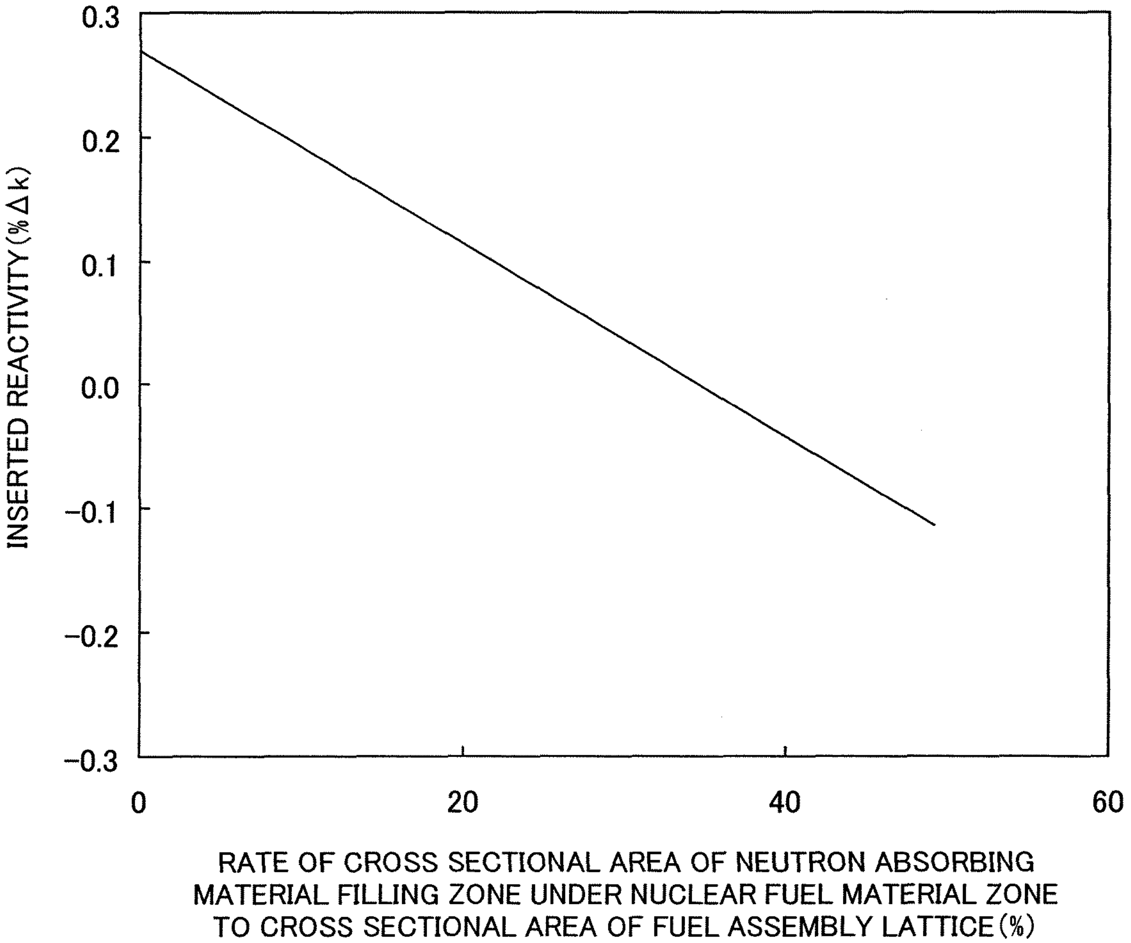
FIG. 5 is a characteristic diagram showing a relation between a rate of a cross sectional area of a neutron absorbing material filling zone under a nuclear fuel material zone to a cross sectional area of a fuel assembly lattice and the applied reactivity when overall core becomes a state of 100% void.

A relation between a rate of the cross sectional area of the neutron absorbing material filling zone under the nuclear fuel material zone to the cross sectional area of the fuel assembly lattice and the inserted reactivity when the overall core becomes the state of 100% void is shown in FIG. 5. If the rate becomes 35% or more, even when the overall core becomes the state of 100% void, positive reactivity is not inserted to the core. Therefore, in the core of the light water reactor that is loaded with fuel assemblies having a nuclear fuel material including the TRUs obtained by the nuclear fuel reprocessing, wherein the rate of Pu-239 occupying in all the TRUs included at the time of a burnup of 0 is within the range from 5% or more to less than 40%, the safety margin can be improved.

The neutron absorbing members are disposed above the nuclear fuel material zone having a nuclear fuel material existing in the core and including a transuranic nuclide and having a height within the range from 20 cm to 250 cm, thus the safety margin can be increased more without impairing the economical efficiency of fuel of the light water reactor. The multiple-recycling of the TRUs can be continued. Preferably, it is desirable that the distance between the nuclear fuel material zone and the neutron absorbing members in the axial direction of the core is within a range from 230 mm to 500 mm and the length of the neutron absorbing members is within a range from 20 mm to 700 mm.

The neutron absorbing members are disposed above the nuclear fuel material zone, and furthermore, the neutron absorbing material filling zone is disposed under the nuclear fuel material zone, thus when the overall core becomes the state of 100% void, the reactivity inserted to the core can be made more negative.

Also in the light water breeder reactor and TRU burner reactor, when the rate of the cross sectional area of the fuel pellets (filled in the fuel rods) occupying in the cross section area of the unit fuel rod lattice in the channel box exceeds 55%, the gap between the fuel rods becomes less than 1 mm, so that the assembling of the fuel assemblies is very difficult. Thus, the rate of the cross sectional area of the fuel pellets occupying in the cross section area of the unit fuel rod lattice must be set to 55% or less. When the area rate becomes less than 30%, the fuel rods become extremely narrow and the quantity of the nuclear fuel material in the cross section becomes smaller. Therefore, the length of the fuel rods must be increased, and the void coefficient becomes positive. Consequently, the area rate must be set to 30% or more.

Furthermore, the inventors studied how much the neutron absorbing members should be disposed per each fuel assembly lattice above the nuclear fuel material zone. Each of the neutron absorbing members is disposed between the nuclear fuel material zone and the upper fuel support member (for example, the upper tie-plate) in the neighborhood of the plenum portion formed in the fuel rod. When the overall core becomes the state of 100% void from some cause, a total of the cross sectional areas of all the neutron absorbing members disposed above the nuclear fuel material zone must be set to 10% or more of the cross sectional area of the fuel assembly lattice in order to prevent positive reactivity from being inserted to the core. The fuel assembly lattice is a region including a surrounding zone enclosed by the width ½ of the gap (the water gap in the BWR) formed between the neighboring fuel assemblies, and the cross section of one fuel assembly among them. The cross sectional area of the fuel assembly lattice is a total value of the cross sectional area of the surrounding zone and the cross sectional area of the fuel assemblies.

The total of the cross sectional areas of all the neutron absorbing members must be controlled to 50% or less of the cross sectional area of the fuel assembly lattice because a two-phase flow at a predetermined flow rate must flow between the respective plenum portions of the neighboring fuel rods and the neutron absorbing members arranged between the plenum portions during the operation of the light water reactor.

Based on the study results aforementioned, the total of the cross sectional areas of all the neutron absorbing members is preferably set within the range from 10 to 50% of the cross sectional area of the fuel assembly lattice.

Even under the nuclear fuel material zone, the total of the cross sectional areas of all the neutron absorbing material filling zones formed in the fuel assemblies is preferably set within the range from 10 to 50% of the cross sectional area of the fuel assembly lattice except the cross sectional area of the control rods.

The core structure of (2) can be added to the core structure of (1). Namely, the neutron absorbing members are disposed above the nuclear fuel material zone existing in the core, having a nuclear fuel material including a transuranic nuclide and having a height within the range from 20 cm to 250 cm, and the outside diameter of the plenums formed above the nuclear fuel material zone and having a height within the range from 400 mm to 2500 mm is set to 3 mm or more and is smaller than the outside diameter of the fuel rods in the nuclear fuel material zone. By doing this, even though the overall core becomes the state of 100% void, the insertion of positive reactivity to the nuclear fuel material zone can be avoided. The soundness of the fuel rods is increased. The quantity of the neutron absorbing members (for example, the thickness of the neutron absorbing members) disposed between the plenums of the neighboring fuel rods can be increased because the outside diameter of the plenums is 3 mm or more and is smaller than the outside diameter of the fuel rods in the nuclear fuel material zone. By doing this, even though the overall core becomes the state of 100% void, the reactivity inserted to the nuclear fuel material zone can be made more negative.

Even in a pressurized water nuclear reactor (PWR) that cluster control rods are inserted into a plurality of guide tubes installed in each fuel assembly loaded in the core from above the core and a fast breeder reactor (FBR) that the control rods are inserted into the core from above, it is possible to form a nuclear fuel material zone including TRUs in the core and dispose the neutron absorbing members above and below the nuclear fuel material zone.

The aforementioned core structure of (2) will be explained below.

Each of the fuel rods included in the fuel assemblies loaded in the core of the light water reactor, for example, the core of the BWR internally stores a plurality of fuel pellets including a TRU. Even when a discharge rate of a volatile fission product from the fuel pellets is larger than that of uranium oxide pellets, to continue the TRU recycling while ensuring the soundness of the fuel rods and sufficiently keeping the safety potential of the BWR, it is necessary to increase plenum volume formed in the fuel rods and keep the void coefficient within a predetermined range. Further, in a commercial reactor put into practical use, realization of high burnup of the fuel assemblies in which the generation quantity of the volatile fission product is increased is required from the viewpoint of the economical efficiency of fuel, so that the volume of the plenums in the fuel rods must be increased.

When the volume of the plenums installed on the upper part of the fuel rods is made larger, the self control function which is an intrinsic safety function of the BWR is impeded. In the state that the plenum volume is increased, when a first accident beyond the design basis accident is caused from some cause, the self control function is impeded.

Even when a first accident beyond the design basis accident is caused from some cause, that is, a composite accident that an accident that the coolant supply pumps (the recirculation pumps or internal pumps) for supplying coolant to the core are all stopped and at that time, all the control rods are not operated is simultaneously caused occurs, the safety margin of the core of the BWR must be improved.

The inventors studied an improvement measure of the safety margin capable of improving the safety margin of the core of the light water reactor without using the core structure of (1) when the first accident beyond the design basis accident is caused. The core of the light water reactor used as an object of study is the core of a BWR having a nuclear fuel material zone including TRUs obtained by the nuclear fuel reprocessing at a height within the range from 20 cm to 250 cm. When the first accident beyond the design basis accident is caused, the high pressure core injection system of the emergency core cooling system is operated.

The inventors, as a result of examination, found a new knowledge that even when the plenum volume in the fuel rods is increased, the outside diameter of the plenum portion of the fuel rods is made smaller than the outside diameter in the nuclear fuel material filling zone under the plenum portion of the fuel rods, thus the reactivity to be inserted to the core when the first accident beyond the design basis accident is caused is reduced. Based on this new knowledge, the inventors reached the conclusion that the outside diameter of the plenum at a length within the range from 400 mm to 2500 mm formed above the nuclear fuel material zone may be set to 3 mm or more and may be made smaller than the outside diameter of the fuel rods in the nuclear fuel material zone.

As mentioned above, by use of the core structure of (2), even when first accident beyond the design basis accident is caused, the quantity of leaking neutrons which are reflected on the component members for forming the plenums and are returned to the nuclear fuel material filling zone is reduced, and the soundness of the fuel rods is increased by increase of the plenum volume. Accordingly, the safety margin can be increased more without impairing the economical efficiency of fuel of the light water reactor.

The aforementioned study results will be explained in detail. The inventors studied an object of the core of the light water reactor having the nuclear fuel material zone including the TRUs obtained by nuclear fuel reprocessing. The multiplication factor of fissionable Pu of the core is 1.01.

Figure 6:
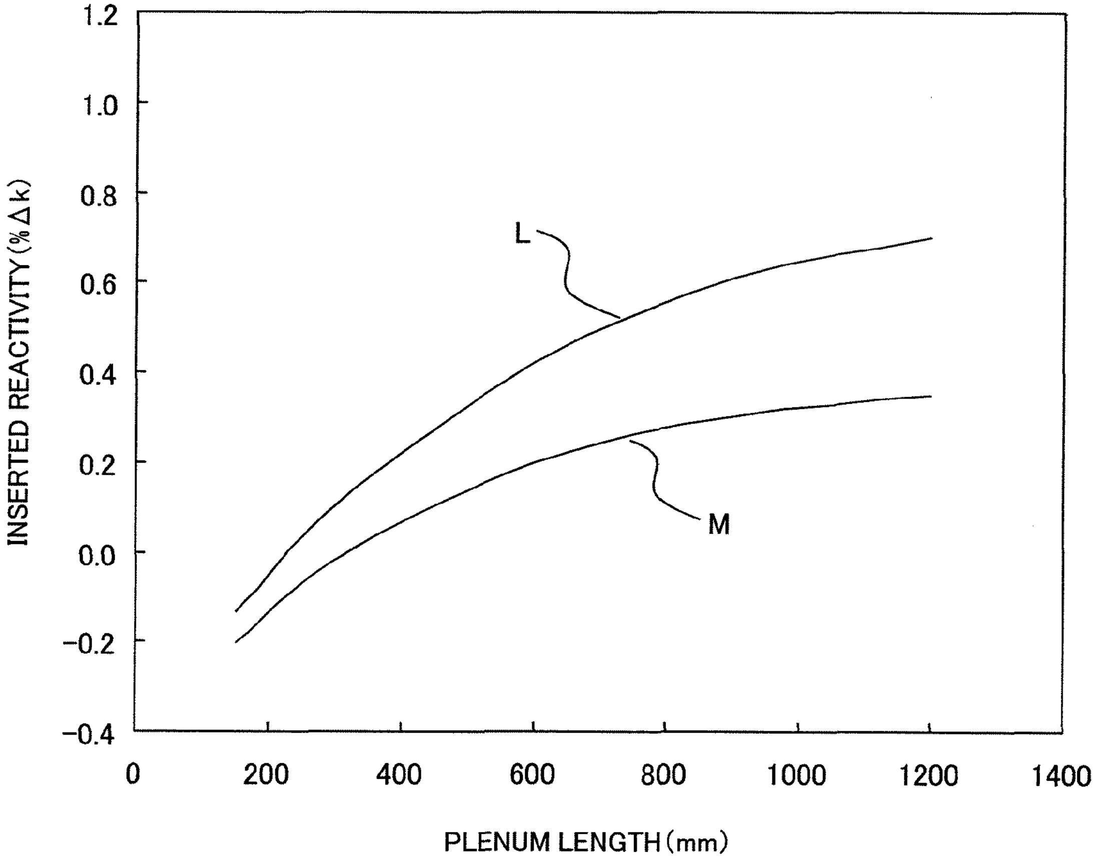
FIG. 6 is a characteristic diagram showing a relation between a plenum length and inserted reactivity when overall core becomes a state of 100% void.

FIG. 6 shows the results obtained by the study and shows the change of the inserted reactivity to the plenum length. This inserted reactivity is inserted reactivity when the overall core becomes the void state.

A scattering cross section area of hydrogen is comparatively large in the energy zone of 500 keV or less, though it is suddenly reduced as the energy zone approaches 1 MeV, so that fast neutrons of 1 MeV or more pierce from the nuclear fuel material zone into the reflector zone by deep penetration. On the other hand, the neutrons lose a large quantity of energy by one collision with hydrogen atoms because the mass of hydrogen atoms composing the two-phase flow passing through the fuel assemblies is almost the same as that of neutrons. Therefore, when the upper reflector existing above the nuclear fuel material zone is composed of only the two-phase flow including water and the steam, the probability in which fast neutrons leaking once from the nuclear fuel material zone to the upper reflector are returned again to the nuclear fuel material zone is low. However, when component member (for example, the cladding made of a zircaloy) for forming each of the plenums in the fuel rods exists in the upper reflector zone, the mass of zirconium atoms of the cladding made of the zircaloy is larger than the neutron mass and the energy of neutrons lost by one collision with zirconium atoms is very small. Therefore, neutrons returning again to the nuclear fuel material zone appear during repetitive collisions of neutrons with zirconium atoms.

In FIG. 6, a characteristic L indicates change of the inserted reactivity to the plenum length when the outside diameter of the plenum portion formed in the fuel rod is the same as the outside diameter of the portion in the nuclear fuel material filling zone under the plenum portion of the fuel rod. A characteristic M indicates change of the inserted reactivity to the plenum length when the outside diameter of the plenum portion formed in the fuel rod is smaller than the outside diameter of the portion in the nuclear fuel material filling zone under the plenum portion of the fuel rod. Concretely, the cross sectional area of the plenum portion is half the cross sectional area of the portion of the fuel rod in the nuclear fuel material filling zone.

If a composite event (a first accident beyond the design basis accident) occurs that the coolant supply pumps for supplying coolant to the core are all stopped from some cause and furthermore, all the control rods are not operated, the reactor power is increased, the temperature of the fuel pellets in the fuel rod rises, and the discharge rate of the volatile fission product from the fuel pellets is increased. In addition, the inner pressure of the cladding of the fuel rod rises, and the gap between the cladding and the fuel pellets is widened, and thus, the heat transfer rate from the fuel pellets to the cladding is lowered, and the temperature of the fuel pellets rises furthermore. The occurrence of the composite event causes such a positive feedback state. However, the plenum length is increased and the plenum capacity is increased, thus the occurrence of such a positive feedback state can be prevented and the soundness of the fuel rods can be improved.

As shown by the characteristic M in FIG. 6, if the outside diameter of the plenum portion formed in the fuel rod is smaller than the outside diameter of the portion of the fuel rod in the nuclear fuel material filling zone under the plenum portion, when the overall core becomes the state of 100% void, the reactivity inserted to the nuclear fuel material zone becomes 1 dollar or less. Therefore, when the outside diameter of the portion of the plenum in the fuel rod is smaller than the outside diameter of the portion of the fuel rod in the nuclear fuel material filling zone, even though the composite event of the first accident beyond the design basis accident occurs, the fuel rod is automatically reduced in power down to the coolable power at the flow rate of the cooling water supplied to the core by the operation of the high pressure core injection system and the safety of the BWR is ensured. Thus, when the outside diameter of the portion of the plenum is smaller than the outside diameter of the portion in the nuclear fuel material filling zone, the safety margin of the core of the BWR can be improved.

In the fuel rod, when the outside diameter of the plenum portion is the same as the outside diameter of the portion in the nuclear fuel material filling zone, the plenum length is set to about 200 mm and when the outside diameter of the plenum portion is made smaller than the outside diameter of the portion in the nuclear fuel material filling zone under the plenum portion, the plenum length is set to about 200 mm to 300 mm, thus even when the overall core becomes the state of 100% void, the insertion of positive reactivity can be avoided.

The aforementioned core structure of (3) will be explained below.

Multiple-recycling of TRUs obtained by the nuclear fuel reprocessing is proposed (refer to Japanese Patent Laid-Open No. 2008-215818 and R. TAKEDA et al., Proc. of International Conference on Advanced Nuclear Fuel Cycles and Systems. GLOBAL '07 Boise, USA, September, 2007, P. 1725). To realize the multiple-recycling of TRUs, nuclear fuel materials recovered from spent nuclear fuel generated from various light water reactors (BWR and PWR) must be used.

Even in the light water reactor, the BWR and PWR are different from each other in the neutron energy spectrum when the fissionable material included in the nuclear fuel material existing in the core is burned. Further, the generated spent fuel assemblies include various ones such as spent fuel assemblies immediately after taken out from the core and spent fuel assemblies stored in the fuel storage pool over a long period of time. In the spent nuclear fuel included in the spent fuel assemblies stored in the fuel storage pool, the nuclear decay of the isotopes is different and the composition of included TRUs is different according to a difference in the storage period of the spent fuel assemblies.

A plurality of fresh fuel assemblies manufactured using a nuclear fuel material including TRUs recovered from such various spent nuclear fuel by the nuclear fuel reprocessing must be loaded in the core of one light water reactor. The variations of the power of each fuel assembly which is manufactured depending on the difference in the TRU composition in the nuclear fuel material including recovered TRUs and is loaded in the core are increased and there is concern that the thermal margin of the core may be reduced. Therefore, it is desired to increase the thermal margin of the core of the light water reactor.

The inventors made various studies in order to realize the core of a light water reactor for increasing the thermal margin. As a result of study, the inventors found that the rate of fissionable Pu occupying in all the nuclear fuel materials in the lower fissile zone formed in the nuclear fuel material zone is made larger than the rate of fissionable Pu occupying in all the nuclear fuel materials in the upper fissile zone formed in the nuclear fuel material zone, thus the thermal margin of the core of the light water reactor can be increased without impairing the economical efficiency of fuel of the light water reactor. Using the core structure of (3), a linear heat generating rate of the fuel rod, a central temperature of the fuel rod, and the thermal margin of the MCPR and the like can be increased. Furthermore, the multiple-recycling of TRUs can be realized.

The core structure of (3) can be realized by the parfait core in which the lower blanket zone, lower fissile zone, internal blanket zone, upper fissile zone, and upper blanket zone are formed successively from the lower end of the nuclear fuel material zone toward the upper end of the nuclear fuel material zone.

To increase the thermal margin like this, it is desirable to increase the height of the nuclear fuel material zone, namely, the total length of the fuel rod in the axial length. In the core of the BWR, from the lower end of the nuclear fuel material zone toward the upper end of the nuclear fuel material zone, the density of the cooling water which is a neutron moderator is lowered. Therefore, the enrichment of fissionable Pu in all the nuclear fuel materials in the upper fissile zone is lowered, and the height of the upper fissile zone is increased, and the enrichment of fissionable Pu in all the nuclear fuel materials in the lower fissile zone where the density of coolant is higher than that in the upper fissile zone, thus the utilization factor of neutrons is improved. The breeding ratio and void coefficient of the core do not get worse.

The increase in the enrichment of fissionable Pu in all the nuclear fuel materials in the lower fissile zone causes a reduction in the height of the lower fissile zone. However, the increase range of the height of the upper fissile zone is larger than the decrease range of the height of the lower fissile zone, so that as a result, the height of the nuclear fuel material zone is increased.

In the core of the light water reactor with the thermal margin increased wherein the rate of fissionable Pu occupying in all the nuclear fuel materials in the lower fissile zone formed in the nuclear fuel material zone is made larger than the rate of fissionable Pu occupying in all the nuclear fuel materials in the upper fissile zone formed in the nuclear fuel material zone, even if a first accident beyond the design basis accident occurs, the reactor power can be lowered automatically down to the power capable of cooling the fuel assemblies in the core by the capacity of coolant which can be supplied from the high pressure core injection system of the emergency core cooling system. Furthermore, in such a light water reactor core, even when the overall core becomes the state of 100% void from some cause, no positive reactivity is inserted.

The core of the light water reactor having the constitution of (3) can improve more the safety margin without impairing the economical efficiency of fuel of the light water reactor because the thermal margin is increased.

The inventors, as a concrete structure for realizing the core structure of (3), thought out a core structure of (I) and a core structure of (II) which will be described below. In the core structure of (I), the total of the height of the lower fissile zone in the nuclear fuel material zone and the height of the upper fissile zone is within a range from 350 mm to 600 mm and the height of the upper fissile zone is within a range from 1.1 to 2.1 times the height of the lower fissile zone. In the core structure of (II), an average of the enrichment of fissionable Pu in all the nuclear fuel materials in the lower fissile zone and the enrichment of fissionable Pu in all the nuclear fuel materials in the upper fissile zone is within a range from 14% to 22% and the enrichment of fissionable Pu in all the nuclear fuel materials in the lower fissile zone is within a range from 1.05 to 1.6 times of the enrichment of fissionable Pu in all the nuclear fuel materials in the upper fissile zone. In either of the core structure of (I) and (II), the thermal margin can be increased more without impairing the economical efficiency of fuel of the light water reactor.

The study results aforementioned will be explained in detail below.

The aforementioned study was executed for the core of the light water breeder reactor, for example, an object of the core of the BWR that the electric power is 1350 MW, and 720 fuel assemblies having 271 fuel rods per each fuel assembly are loaded in the core, and the breeding ratio is 1.01.

In the light water breeder reactor, it is important that the negative void coefficient which is one of the important indexes of the breeding ratio, thermal margin and safety is satisfied in the well-balanced state under the effective neutron multiplication factor 1 which is a critical restrictive condition.

As a result of the study of the inventors executed for the core of the BWR as a study object, it is found that the enrichment of fissionable Pu in all the nuclear fuel materials in the upper fissile zone is lowered, and the enrichment of fissionable Pu in all the nuclear fuel materials in the lower fissile zone is increased, thus as mentioned above, the thermal margin of the core can be increased without deteriorating the breeding ratio and void coefficient.

Generally, when the enrichment of fissionable Pu is increased, the neutron spectrum in the fissile zone in which a fissionable material exists is shifted on the high energy side, and the number of neutrons generated when the TRUs undergo fission is increased, and fast fission of the fertile material such as U-238 is increased. Therefore, the number of neutrons leaking in the blanket zone from the fissile zone is increased and it contributes to an increase in the breeding ratio. However, since the height of the fissile zone necessary to keep the core critical is reduced, the total length of the fuel rod is shortened, and the thermal margin is reduced. On the other hand, the absolute value of the negative void coefficient of the core is increased and the safety margin is increased.

However, when the enrichment of fissionable Pu in all the nuclear fuel materials in the upper fissile zone is lowered and the enrichment of fissionable Pu in all the nuclear fuel materials in the lower fissile zone is increased, as mentioned previously, the height of the nuclear fuel material zone can be increased. Therefore, the thermal margin of the core is increased.

Figure 7:
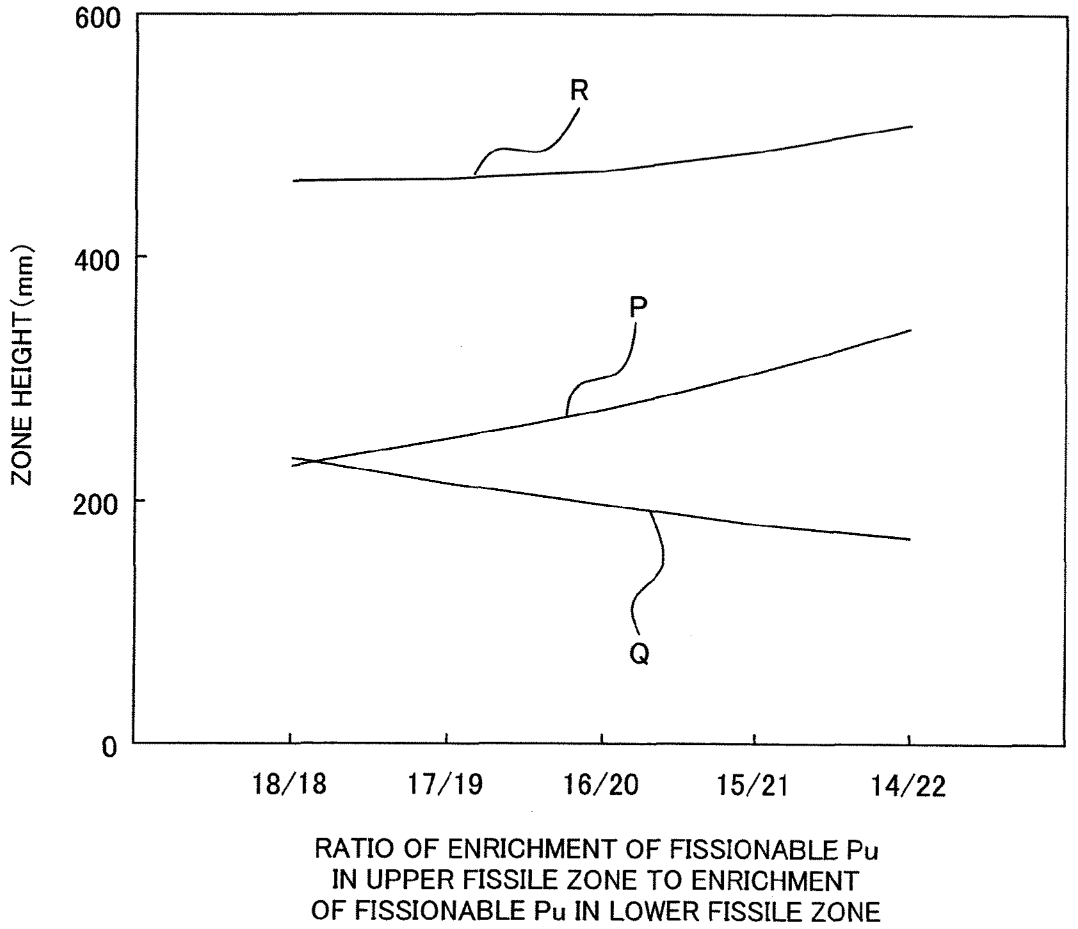
FIG. 7 is a characteristic diagram showing a relation between a ratio of enrichment of fissionable Pu in an upper fissile zone to enrichment of fissionable Pu in a lower fissile zone and a height of each zone.

The inventors studied the core that the rate of fissionable Pu occupying in all the nuclear fuel materials in the lower fissile zone is made larger than the rate of fissionable Pu occupying in all the nuclear fuel materials in the upper fissile zone formed in the nuclear fuel material zone. FIG. 7 shows one of the study results.

The inventors studied the changes of the respective heights of the upper fissile zone, lower fissile zone, and nuclear fuel material zone in a fresh fuel assembly loaded in the equilibrium core of the light water breeder reactor when the ratio of the enrichment of fissionable Pu in the upper fissile zone to the enrichment of fissionable Pu in the lower fissile zone (hereinafter simply referred to as the ratio of the enrichment of fissionable Pu) is changed. FIG. 7 shows a relation between the ratio of the enrichment of fissionable Pu and the height of each zone. A characteristic P indicates change of the height of the upper fissile zone due to the ratio of the enrichment of fissionable Pu. A characteristic Q indicates change of the height of the lower fissile zone due to the ratio of the enrichment of fissionable Pu. A characteristic R indicates the change of the height of the nuclear fuel material zone due to the ratio of the enrichment of fissionable Pu.

In consideration of the criticality of the core and the flatness of the power distribution in the axial direction of the core, when the enrichment of fissionable Pu in all or to a total of the TRUs or the nuclear fuel material in the upper fissile zone is 17% and the enrichment of fissionable Pu in all or to a total of the TRUs or the nuclear fuel material in the lower fissile zone is 19%, the height of the upper fissile zone becomes about 1.1 times of the height of the lower fissile zone. When the enrichment of fissionable Pu to a total of all the nuclear fuel material in the upper fissile zone is 14% and the enrichment of fissionable Pu to a total of all the nuclear fuel material in the lower fissile zone is 22%, the height of the upper fissile zone becomes about 2.1 times of the height of the lower fissile zone. Each characteristic shown in FIG. 7 indicates evaluation results when an average of the enrichment of fissionable Pu to a total of all the nuclear fuel material in the upper fissile zone and the enrichment of fissionable Pu to a total of all the nuclear fuel material in the lower fissile zone is 18%. Even if the average of the enrichment of the upper fissile zone and lower fissile zone is changed between 16% and 20%, the height of the upper fissile zone and the height of the lower fissile zone to the ratio of the enrichment of fissionable Pu are changed similarly to the above case when the average of enrichment is 18%.

Figure 8:
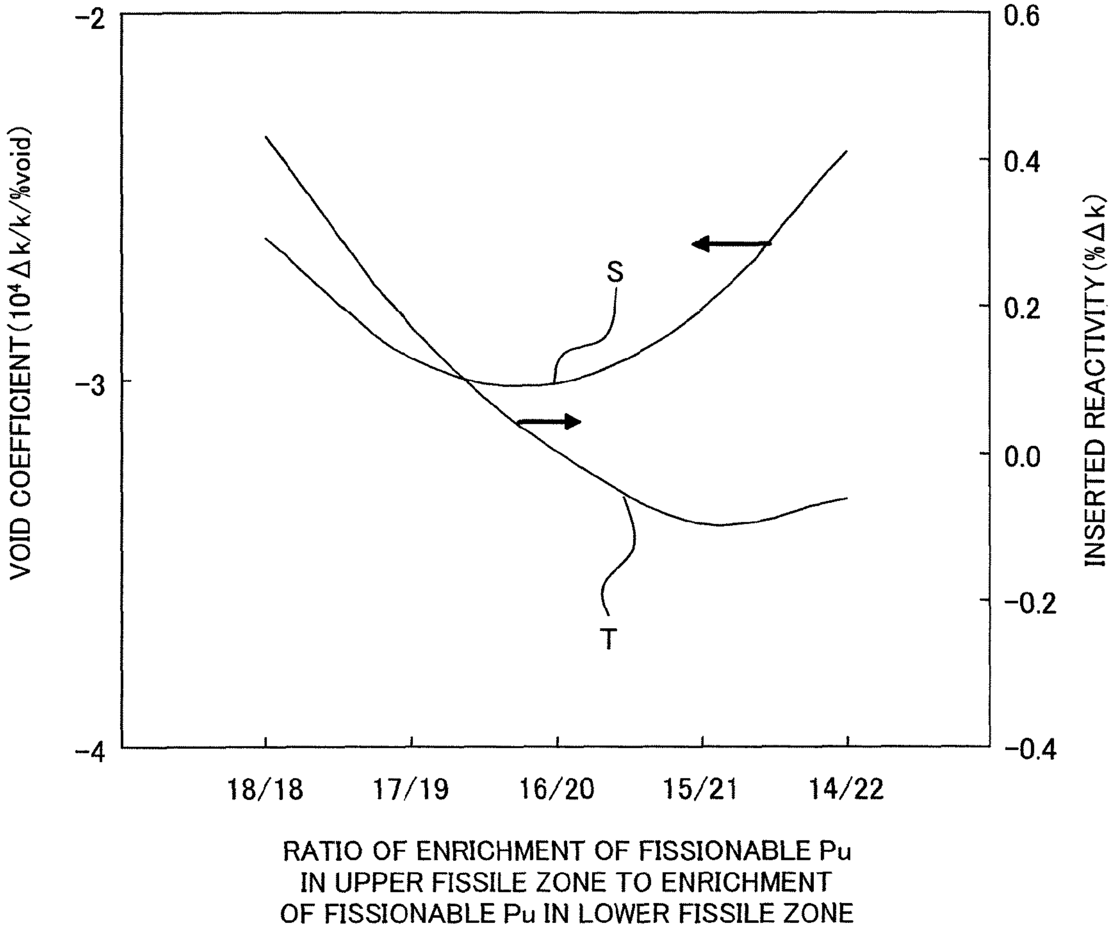
FIG. 8 is a characteristic diagram showing a relation between a ratio of enrichment of fissionable Pu in an upper fissile zone to enrichment of fissionable Pu in a lower fissile zone and void coefficient, and a relation between the ratio and applied reactivity when overall core becomes a state of 100% void.

The inventors studied, in a fresh fuel assembly loaded in the equilibrium core of the light water breeder reactor, the change of the void coefficient in each state that the ratio of the enrichment of fissional Pu is changed, and the change of the reactivity inserted to the core when the overall core becomes the state of 100% void, in each state that the ratio of the enrichment of fissional Pu is changed. FIG. 8 obtained from the study results shows a relation between the ratio of the enrichment of fissional Pu and the void coefficient, and a relation between the ratio of the enrichment of fissional Pu and the inserted reactivity when the overall core becomes the state of 100% void. A characteristic S indicates the change of the void coefficient due to the ratio of the enrichment of fissional Pu. A characteristic T indicates the change of the inserted reactivity due to the ratio of the enrichment of fissional Pu.

Since the BWR has a density distribution of hydrogen atoms for bearing the neutron moderation function in the axial direction of the core, it is desirable that the enrichment of fissional Pu in the lower fissile zone having a large hydrogen atom density is made higher than the enrichment in the upper fissile zone having a small hydrogen atom density. If the enrichment of fissional Pu is made excessively higher than 22%, the increase effect of the enrichment of fissional Pu becomes weak due to the self shielding effect of various TRUs in the resonance energy zone. Thus, the quantity of fissional Pu necessary to keep the core critical is increased unnecessarily and the economical efficiency of fuel of the BWR is impaired. Additionally, if the enrichment of fissional Pu is made excessively lower than 14%, the neutron energy spectrum is transferred to the low energy side, and the breeding ratio is lowered, and furthermore, the deterioration of the void coefficient exceeds 10%, and there are possibilities that the economical efficiency of fuel and safety of the BWR may be impaired.

However, as indicated by the characteristic T in FIG. 8, if the enrichment of fissionable Pu in all the nuclear fuel materials in the lower fissile zone becomes smaller than 1.05 (about 18.5/17.5) times of the enrichment of fissionable Pu in all the nuclear fuel materials in the upper fissile zone, the inserted reactivity when the overall core is assumed to become the state of 100% void exceeds 1 dollar (about 0.34% ΔK) and the core becomes a prompt critical region. The core must be avoided from entering the prompt critical region. Therefore, in correspondence with the case that a first accident beyond the design basis accident occurs and the high pressure core injection system is operated, the enrichment of fissionable Pu in all the nuclear fuel materials in the lower fissile zone must be set to a value not less than 1.05 times of the enrichment of fissionable Pu in all the nuclear fuel materials in the upper fissile zone. When the enrichment of fissionable Pu in all the nuclear fuel materials in the lower fissile zone exceeds 1.6 (22/14) times of the enrichment of fissionable Pu in all the nuclear fuel materials in the upper fissile zone, the absolute value of the negative void coefficient is reduced, and depending on the kind of an abnormal transient or an accident, there are possibilities that a case that it is difficult to meet the safety basis may occur. Thus, the enrichment of fissionable Pu in all the nuclear fuel materials in the lower fissile zone is set to a value not more than 1.6 times of the enrichment of fissionable Pu in all the nuclear fuel materials in the upper fissile zone.

According to the characteristic T shown in FIG. 8, the enrichment of fissionable Pu in all the nuclear fuel materials in the lower fissile zone is set to a value not less than 1.25 (20/16) times of the enrichment of fissionable Pu in all the nuclear fuel materials in the upper fissile zone, thus even if the overall core becomes the state of 100% void from some cause, the insertion of positive reactivity to the core can be avoided.

Therefore, the enrichment of fissionable Pu in all the nuclear fuel materials in the lower fissile zone is within the range from 1.05 to 1.6 of the enrichment of fissionable Pu in all the nuclear fuel materials in the upper fissile zone, thus the thermal margin of the core can be increased. As a result, the safety margin of the core can be improved without impairing the economical efficiency of fuel of the core. Preferably, it is desirable that the enrichment of fissionable Pu in all the nuclear fuel materials in the lower fissile zone is within the range from 1.25 to 1.6 of the enrichment of fissionable Pu in all the nuclear fuel materials in the upper fissile zone. The aforementioned indicates the study results for the equilibrium core, though the same may be said with an initial core and a transition core toward the equilibrium core.

The aforementioned core structure of (4) will be explained below.

It is considered that the spent nuclear fuel included in the spent fuel assemblies generated in a large quantity from the light water reactor is responded by either of a method for executing the nuclear fuel reprocessing and recycling TRUs and a method for directly executing ground disposal of the spent fuel assemblies. However, a site of the ground disposal of the spent fuel assemblies is not determined easily, and thus a way of intermediate storage of the spent fuel assemblies may be considered. On the other hand, there is concern that the apprehension for a TRU newly generated by the operation of the light water reactor to become a long-life radioactive waste material may prevent additional establishment of a light water reactor. Therefore, as a present countermeasure for the spread of the light water reactor, the inventors studied that the TRU is permitted to fission using the BWR in operation at present and the number of spend fuel assemblies is greatly reduced.

As an example that a TRU is recycled by the light water reactor in operation at present, only one recycling of only Pu among TRUs which is referred to as the so-called Pu thermal use is executed in Europe. However, when repeatedly continuing the TRU recycling, the restrictive conditions for safety cannot be met, so that it is necessary to repeat the multiple-recycling of TRUs while the restrictive conditions for safety are met and greatly reduce the number of spent fuel assemblies.

The inventors studied a countermeasure capable of reducing the number of spent fuel assemblies. As a result, the inventors found that a plurality of fuel assemblies including transuranic nuclides the recycle frequencies of which are different are loaded, and among these fuel assemblies, a plurality of fuel assemblies including the transuranic nuclide having the smallest recycle frequency are disposed at the central part of the core, and between the central part and the outermost layer zone of the core, the fuel assemblies including the transuranic nuclides having larger recycle frequencies are disposed on the side of the outermost layer zone of the core (the core structure of (4)), thus the number of spend fuel assemblies can be reduced.

The core structure of (4), for example, can be realized as described below. Namely, TRUs different in the recycle frequency are included in separate fuel assemblies and these fuel assemblies are loaded in the core of one light water reactor. Each fuel assembly that TRUs having the same recycle frequency are enriched when the burnup is 0 and an in-core fuel dwelling time is different is loaded in the core in the neighboring state. A plurality of fuel assemblies including the transuranic nuclide having the smallest recycle frequency are disposed at the central part of the core, and between the central part and the outermost layer zone of the core, the fuel assemblies including the transuranic nuclides having larger recycle frequencies are disposed on the side of the outermost layer zone of the core.

The TRUs different in the recycle frequency must be loaded separately in different fuel assemblies without being mixed. When enriching and multiple-recycling TRUs obtained by reprocessing spent nuclear fuel generated in the light water reactor using slightly enriched uranium and TRUs as nuclear fuel in uranium, the TRU loading quantity of the fresh fuel assembly may be decided for every fuel assembly including TRUs of the same recycle frequency so that an average values of the infinite effective multiplication factors of all the fuel assemblies which include the TRUs of the same recycle frequency and are different in the in-core fuel dwelling times become almost the same value.

As the recycle frequency of a TRU is increased, the rate of Pu-239 in the TRU is reduced. Therefore, the core structure of (4) is the same as that when the TRU is multiply recycled, a plurality of fuel assemblies having a nuclear fuel material including the highest rate of Pu-239 in the TRU are disposed at the central part of the core, and between the central part and the outermost layer zone of the core, the fuel assemblies having a nuclear fuel material including a lower rate of Pu-239 in the TRU is disposed on the side of the outermost layer zone of the core.

In the recycle light water reactor using a nuclear fuel material including TRUs obtained by the nuclear fuel reprocessing, the improvement of safety, increase of the thermal margin, and reduction of the number of spent fuel assemblies can be aimed at by use of the core structure of (4).

The aforementioned study will be explained in detail below. The study was executed for an object of the core of the ABWR in operation at present. The object core of the ABWR is a core, for example, using slightly enriched uranium having an average enrichment of 4.8% where the electric power is 1350 MW and 872 fuel assemblies having 74 fuel rods per each fuel assembly are loaded in the core.

The fuel assemblies using slightly enriched uranium as a nuclear fuel material, for example, are loaded in the core of the ABWR. For example, the core of the BWR where fresh fuel assemblies manufactured using the nuclear fuel material obtained by enriching only Pu recovered by reprocessing the spent nuclear fuel in the spent fuel assemblies generated in the ABWR in depleted uranium, natural uranium, or degraded uranium are loaded is generally referred to as a Pu thermal core. Among the Pu thermal cores, a core in which no fuel assemblies including slightly enriched uranium are loaded and all the fuel assemblies loaded have the nuclear fuel material including Pu recovered by the nuclear fuel reprocessing is referred to as Full MOX core.

In the core of the light water reactor loading fuel assemblies having a nuclear fuel material including not only Pu but also all the TRUs recovered by the nuclear fuel reprocessing, the core loading only fuel assemblies including TRUs of a recycle frequency of one is called a TRU first generation recycle core. The core loading fuel assemblies including TRUs of a recycle frequency of two obtained by reprocessing the spent nuclear fuel included in the spent fuel assemblies taken out from the TRU first generation recycle core is called a TRU second generation recycle core. The core loading fuel assemblies including TRUs of a recycle frequency of three obtained by reprocessing the spent nuclear fuel included in the spent fuel assemblies taken out from the TRU second generation recycle core is called a TRU third generation recycle core. As the recycle frequency of fuel assemblies including TRUs is increased like this, the generation number of the core is increased.

If the TRU recycle frequency is increased like this, the rate of the nuclides of even-numbered nucleus in the TRU is increased and the absolute value of the negative void coefficient is reduced. Therefore, the safety margin of the core is reduced and the TRU multiple-recycling cannot be continued. According to W. S. Yang et al., A Metal Fuel Core Concept for 1000 MWt Advanced Burner Reactor GLOBAL '07 Boise, USA, September, 2007, P. 52, in the FBR, a system capable of prolonging the TRU recycle generation than the aforementioned recycle system is studied. The Advanced Burner Reactor (ABR), in the TRU first generation recycle, uses the depleted uranium including the TRUs obtained by reprocessing the spent fuel of the light water reactor as a nuclear fuel material. In the TRU second generation recycle, it is tried to fill and recycle all the TRUs obtained by reprocessing the spent nuclear fuel included in the spent fuel assemblies taken out from the TRU first generation recycle core and to compensate for the insufficient TRUs reduced due to burn in the TRU first generation recycle core with the TRUs obtained by reprocessing the spent nuclear fuel of the light water reactor.

As long as the light water reactor and ABR are operated continuously in parallel like this, the TRUs from the spent nuclear fuel generated from the light water reactor are continuously stored in the core of the light water reactor and fuel recycle equipment. Therefore, for the present, the storage of TRUs in other than the nuclear reactor can be avoided. If the concept of the ABR is tried using the ABWR, the TRU multiple-recycling can be continued longer than the Full MOX multiple-recycle core. However, though the TRU multiple-recycling has its limit to the TRU fourth generation recycle core, the number of spent fuel assemblies generated is reduced to about 1/10 compared with the case of no execution of the TRU recycling. By use of the core structure of (4), when the TRU multiple-recycling is continued up to the TRU eighth generation recycle core, the number of spent fuel assemblies generated is reduced to less than 1% of the number generated when the TRU recycling is not executed.

As a result of the study of the inventors for an object of the ordinary Full MOX TRU multiple-recycle core, as a cause of transfer of the void coefficient to the positive side when the TRU recycling is continued, it is found that there are two events such that (I) the rate of even-numbered nucleus in the TRU is increased and (II) as the void coefficient in the core rises, the power distribution in the radial direction is transferred in the direction that it is high in the central portion of the core and low in the peripheral portion.

Figure 9:
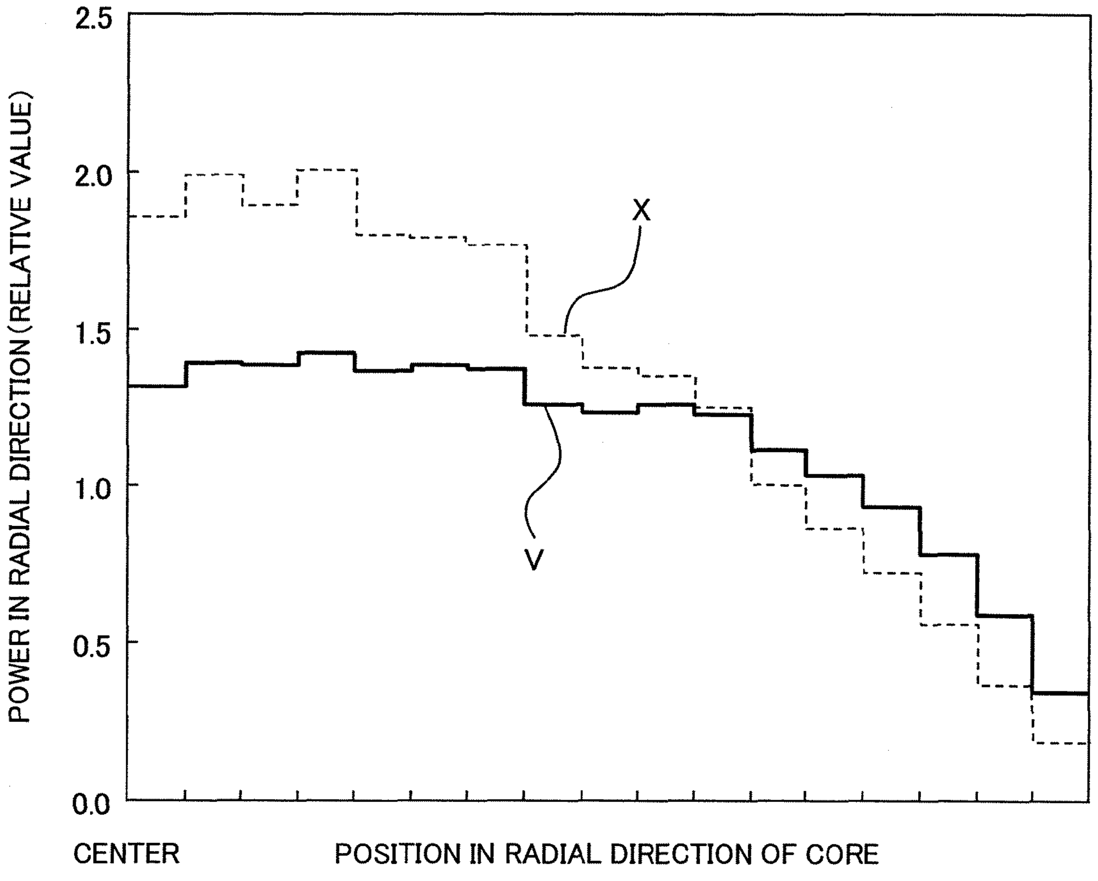
FIG. 9 is an explanatory drawing showing a power distribution of a core in a radial direction.

In FIG. 9, a characteristic V indicates power distribution in the radial direction of the core during the rated power operation of the BWR. A characteristic X indicates power distribution in the radial direction of the core when the overall core becomes the state of 100% void. As the recycle generation of the TRU recycle core advances, the rise rate of the infinite neutron multiplication factor of the fuel assemblies when the void fraction of coolant is increased is increased. Using the event, a plurality of fuel assemblies including transuranic nuclides the recycle frequencies of which are different are loaded, and among the fuel assemblies, a plurality of fuel assemblies including the transuranic nuclide having the smallest recycle frequency are disposed at the central part of the core, and between the central part and the outermost layer zone of the core, the fuel assemblies including the transuranic nuclides having larger recycle frequencies are disposed on the side of the outermost layer zone of the core, thus the shift of the power distribution to the central part of the core in the radial direction can be relaxed. By doing this, the TRU multiple-recycling becomes feasible while the safety basis is satisfied and the number of spent fuel assemblies generated can be reduced.

The relaxation of the shift of the power distribution to the central part of the core will be explained concretely below. The inventors found that one of main causes of insertion of large positive reactivity to the nuclear fuel material zone when the overall core becomes the state of 100% void is that when the overall core transfers to the state of 100% void from the state of the void distribution in the rated power of the BWR, the power distribution in the radial direction is shifted to the central part of the core of a high neutron importance. When executing the TRU multiple-recycling, the rate of Pu-239 in all the TRUs is reduced successively as the TRU recycle frequency is increased and when the void fraction is increased, the increase quantity of the infinite neutron multiplication factor of the fuel assemblies including TRUs is increased. As a consequence, the fuel assemblies including TRUs having a small recycle frequency is loaded at the central part of the core, and the fuel assemblies including TRUs having a large recycle frequency is loaded in the peripheral part of the core, thus it can be relaxed that the power distribution which is generated when the overall core transfers to the state of 100% void from the state of the void distribution during the rated power operation, shifts to the central part of the core in the radial direction. Therefore, even though the overall core becomes the state of 100% void, a core free of insertion of positive reactivity can be realized. Further, the flattening of the power distribution in the radial direction of the core, between the fuel assemblies including TRUs different in the recycle frequency, is executed by adjusting the rate of the number of fuel assemblies to be loaded.

Figure 10:
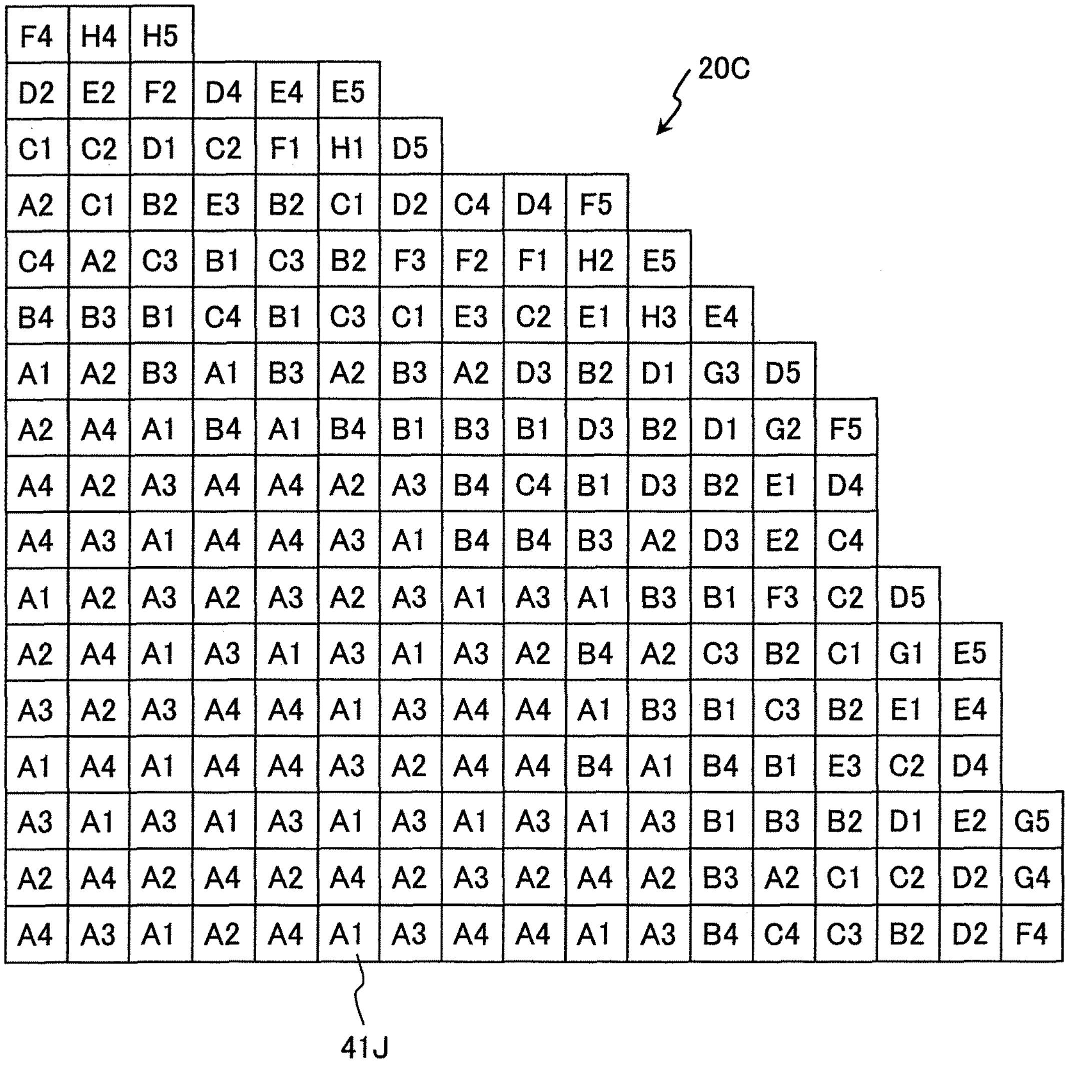
FIG. 10 is an explanatory drawing showing an arrangement of each fuel assembly including TRUs different in recycle frequency in an equilibrium core of a light water reactor.

In an example of the core of the light water reactor to which the core structure of (4) is applied, a state of the core when the operation of the reactor is started in one operation cycle is shown in FIG. 10. This core of the light water reactor has a plurality of fuel assemblies A to H, which are fuel assemblies from a plurality of fuel assemblies including TRUs of the recycle frequency of one to a plurality of fuel assemblies including TRUs of the recycle frequency of eight, separately including TRUs of each of the recycle frequencies of one to eight. In FIG. 10, the alphabets A, B, C, D, E, F, G, and H indicate the recycle frequencies of the TRUs. In FIG. 10, the numerals 1, 2, 3, 4, and 5 added after the alphabets indicate the stay period (the number of operation cycles) of each of the concerned fuel assemblies in the core. For example, the fuel assembly B3 is a fuel assembly which includes TRUs of the recycle frequency of two and is experiencing the operation in the third operation cycle after it is loaded in the core. The numeral "5" indicates a fuel assembly in experience in the fifth operation cycle.

The fuel assemblies A to C and a part of the fuel assembly D are taken out from the nuclear reactor as a spent fuel assembly after finishing of the operation in the fourth operation cycle after loaded in the core. The remainder of the fuel assembly D and the fuel assemblies F to H stay in the core until finishing of the operation in the fifth operation cycle after loaded in the core.

In the equilibrium core, the TRUs recovered after reprocessing the spent nuclear fuel included in the fuel assembly A4 taken out from the core as a spent fuel assembly are all scattered and filled in a plurality of fuel assemblies B1 freshly manufactured. The TRUs recovered after reprocessing the spent nuclear fuel included in the fuel assembly B4 taken out from the core as a spent fuel assembly are all scattered and filled in a plurality of fuel assemblies C1 freshly manufactured. Similarly, the TRUs recovered from the spent nuclear fuel included in the fuel assembly C4 taken out from the core are all scattered and filled in a plurality of fresh fuel assemblies D1 and the TRUs recovered from the spent nuclear fuel included in the fuel assembly E5 taken out from the core are all scattered and filled in a plurality of fresh fuel assemblies F1. The TRUs recovered from the spent nuclear fuel included in the fuel assembly G5 are all scattered and filled in a plurality of fresh fuel assemblies H1 and finally, only the fuel assembly H5 remains as a spent fuel assembly.

A to H is determined so as to make the infinite effective multiplication factors of the respective fuel assemblies almost equal and so as to keep the power distribution in the radial direction of the core flat. In the core shown in FIG. 10, the respective numbers of the fuel assemblies A to H at the time of a burnup of 0 are respectively 100 each, 40 each, 24 each, 16 each, 12 each, 8 each, 4 each, and 4 each. A plurality of fuel assemblies including TRUs of the same recycle frequency are disposed so that the fuel assemblies different in the in-core fuel dwelling time are disposed side by side.

The fuel assemblies including TRUs having larger recycle frequencies are disposed on the side of the outermost layer zone of the core, thus when the void fraction of the core is increased, the increase of the infinite neutron effective multiplication factor at the central part of the core is made relatively smaller than the increase of the infinite neutron effective multiplication factor in the peripheral part of the core, compared with the core in which only the fuel assemblies including TRUs of the same recycle frequency are loaded. Therefore, the shift of the power distribution in the radial direction to the central part of the core is reduced. As a result, although the nuclear fuel assemblies including separately each TRU of up to the recycle frequency of eight are loaded in the core, keeping the void coefficient at $-4\times10^{-4}$% Δk/% void, the light water reactor can be operated. In this core, it is found that the number of spent fuel assemblies can be reduced to 0.5% or less compared with the case that the TRU is not recycled.

The example that each fuel assembly from the fuel assemblies including TRUs of the recycle frequency of one to the fuel assemblies including TRUs of the recycle frequency of eight coexist in one core is explained above, though the following core structure may be used. For example, the core loading only fuel assemblies including TRUs of the recycle frequency of one, the core loading fuel assemblies including TRUs of the recycle frequency of one and fuel assemblies including TRUs of the recycle frequency of two, and the core loading fuel assemblies including TRUs of the recycle frequency of one, fuel assemblies including TRUs of the recycle frequency of two, and fuel assemblies including TRUs of the recycle frequency of three may be considered.

Further, the case that all the TRUs recovered from each spent fuel assembly taken out from the light water reactor are recycled is discussed above, though to the case that only Pu among the recovered TRUs is recycled and the case that several nuclides among the TRUs are identified and are recycled together with Pu, the concept when all the TRUs are recycled can be applied straight.

By combining several core structures among the core structure of (1), (2), and (3), the safety margin can be improved more. For example, when the core structure of (1) is combined with the core structure of (2), the safety margin is increased more than that of the individual the core structure of (1) and when the combination of the core structures of (1) and (2) is furthermore combined with the core structure of (3), the safety margin is increased more than that of the combination of the core structures of (1) and (2). The aforementioned may be said with the combination of other two core structures including the core structure of (2) and the combination of other two core structures including the core structure of (3).

The embodiments of the present invention with the aforementioned concept applied will be explained in detail below with reference to the accompanying drawings.

Embodiment 1

A core of a light water reactor according of embodiment 1 which is a preferable embodiment of the present invention will be explained in detail below by referring to FIGS. 11 to 20 and Table 1. A core 20 of the light water reactor of the present embodiment includes the aforementioned core structures of (1), (2), and (3).

TABLE 1

| Nuclide | Composition (wt %) |
|---|---|
| Np-237 | 0.5 |
| Pu-238 | 2.9 |
| Pu-239 | 44.0 |
| Pu-240 | 36.0 |
| Pu-241 | 5.2 |
| Pu-242 | 4.9 |
| Am-241 | 3.6 |
| Am-242M | 0.1 |
| Am-243 | 1.3 |
| Cm-244 | 1.1 |
| Cm-245 | 0.3 |
| Cm-246 | 0.1 |

The core 20 of the light water reactor is a core for electric power of 1350 MW, though the power scale is not limited to it. The number of fuel assemblies loaded in the core 20 is changed, thus a core of another power scale to which the present embodiment can be applied can be realized.

Figure 11:
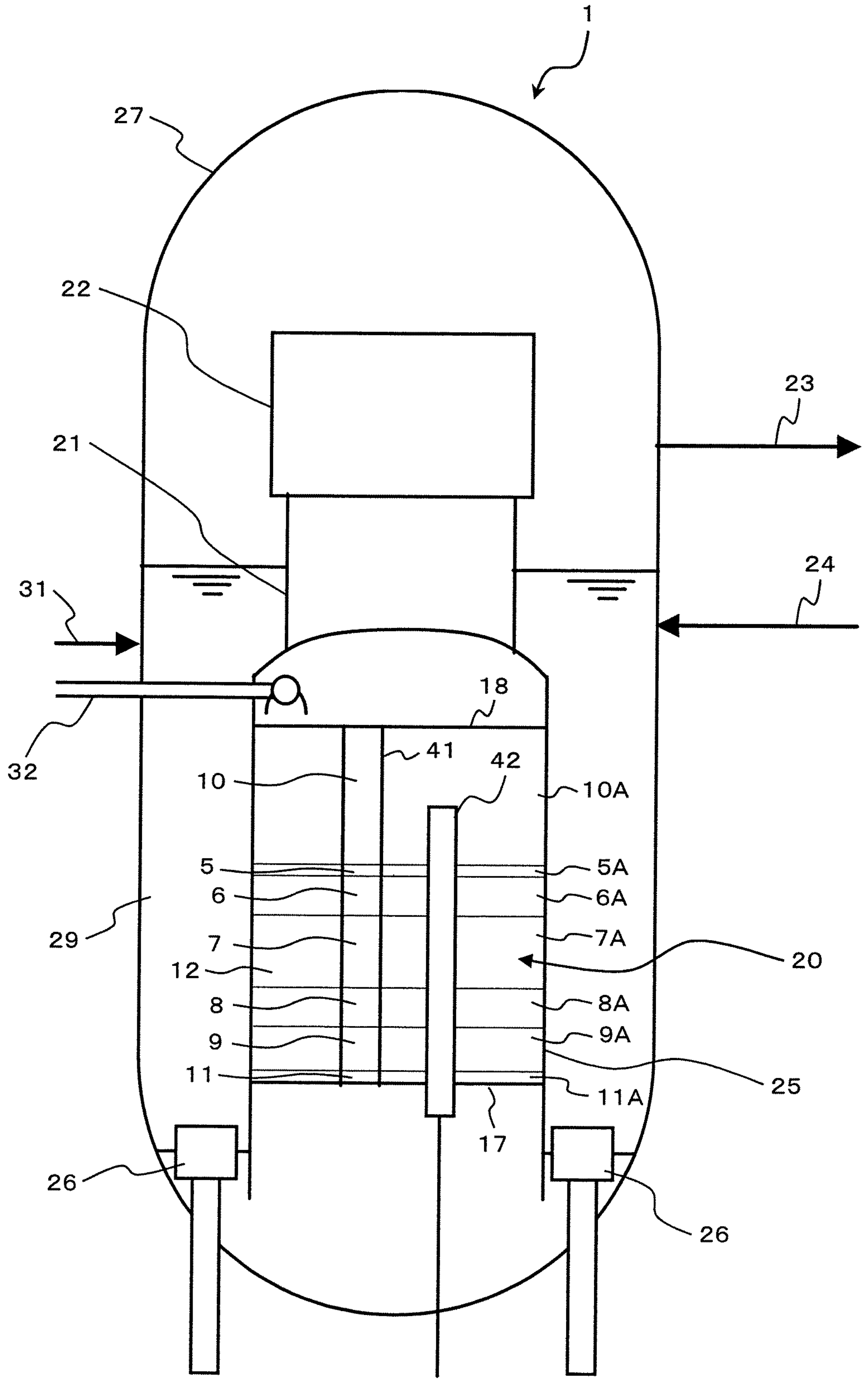
FIG. 11 is a longitudinal sectional view of a boiling water reactor to which a core of a light water reactor according to embodiment 1 which is a preferable embodiment of the present invention is applied.

The overview of the boiling water reactor (BWR) which is a light water reactor for electric power of 1350 MW to which the core 20 of the present embodiment is applied will be explained by referring to FIG. 11. A BWR 1 disposes the core 20, a steam separator 21 and a steam dryer 22 in a reactor pressure vessel 27. The core 20 is surrounded by a core shroud 25 in the reactor pressure vessel 27. A core support plate 17 disposed at a lower end portion of the core 20 is placed inside the core shroud 25 and mounted to the core shroud 25. An upper grid plate 18 disposed at an upper end portion of the core 20 is disposed in the core shroud 25 and mounted to it. A plurality of control rods 42 are arranged in an insertable position into the core 20. The control rods 42 are inserted into the core 20 from underneath. Steam separators 21 are disposed above the core 20 and the steam dryer 22 is disposed above the steam separator 21. A plurality of internal pumps 26 are installed at the bottom of the reactor pressure vessel 27 and the impellers of the internal pumps 26 are disposed in a downcomer 29 formed between the reactor pressure vessel 27 and the core shroud 25. A main steam pipe 23 and a water feed pipe 24 are connected to the reactor pressure vessel 27. The BWR 1, as an emergency core cooling system when coolant fed to the core is lost from some cause, is provided with a low pressure core injection system 31 and a high pressure core injection system 32.

Figure 12:
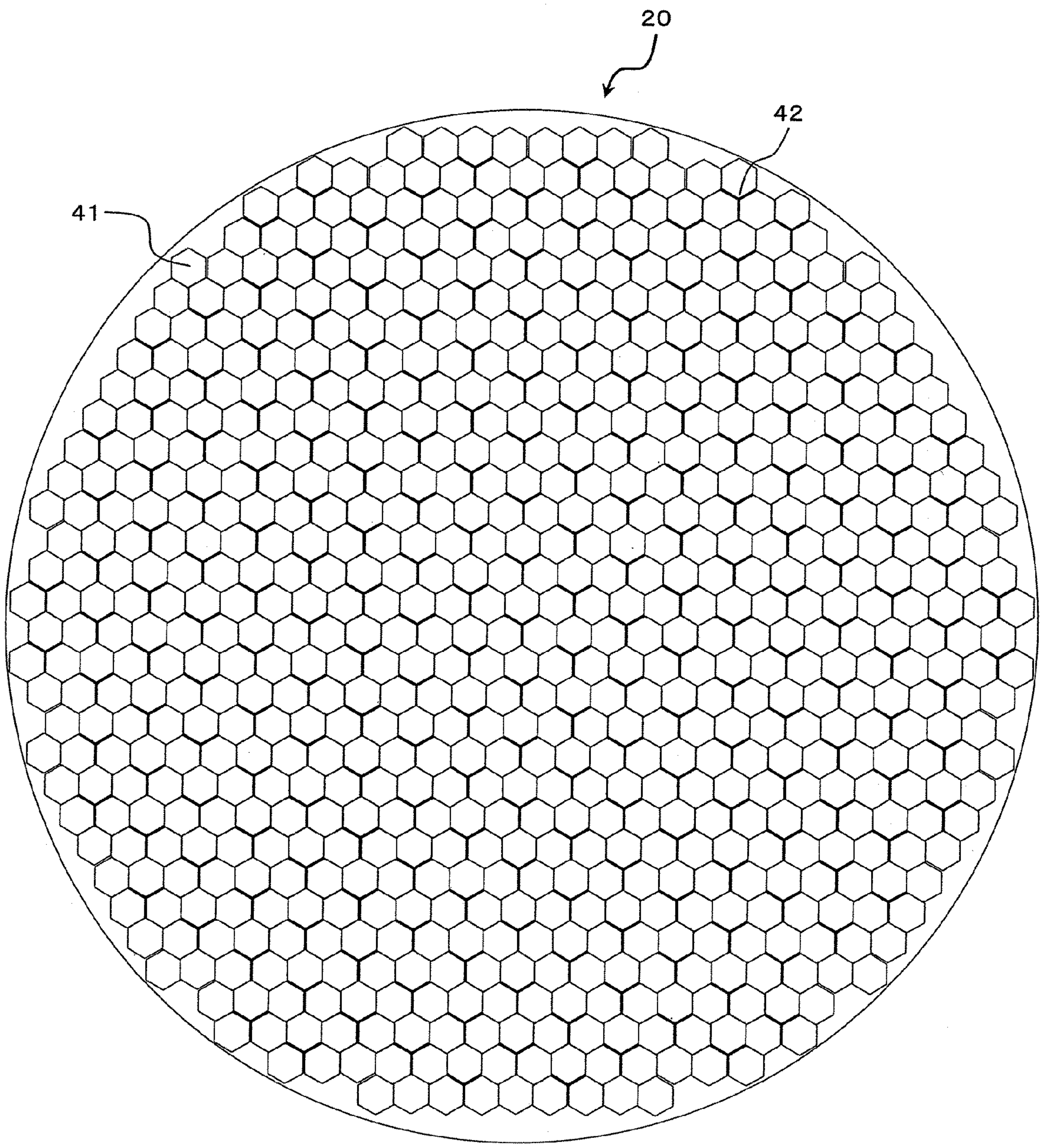
FIG. 12 is a cross sectional view of a core shown in FIG. 11.

In the core 20, as shown in FIG. 12, 720 fuel assemblies 41 are loaded. A plurality of Y-shaped control rods 42 are installed at a rate of one each per three fuel assemblies 41 and 223 control rods 42 are disposed. The respective control rods 42 are connected to the respective control rod drive mechanisms installed at the bottom of the reactor pressure vessel 27. The control rod drive mechanisms are driven by a motor and can finely adjust the movement of the control rods 42 in the axial direction. The control rod drive mechanisms execute each operation of withdrawal of the control rods 42 from the core 20 and insertion of the control rods 42 into the core 20. The control rods 42 of about ⅕ of the 223 control rods 42 are control rods for adjusting the reactor power by inserting into and withdrawing from the core 20 of the BWR 1 in operation and the residual control rods of about ⅘ are in a state withdrawn completely from the core 20 of the BWR 1 in operation, are the control rods 42 to be inserted into the core 20 when stopping the nuclear reactor.

The fuel assembly 41 has a nuclear fuel material zone 16 in which the nuclear fuel material is filled and in the nuclear fuel material zone 16, five zones of an upper blanket zone 5, an upper fissile zone 6, an internal blanket zone 7, a lower fissile zone 8, and a lower blanket zone 9 are formed successively from above. Additionally, the fuel assembly 41 has a zone for forming an upper reflector zone 10 above the upper blanket zone 5 in the state that it is loaded in the core 20 and furthermore, has another zone for forming a lower reflector zone 11 under the lower blanket zone 9 in the state that it is loaded in the core 20 (refer to FIG. 16).

The core 20 has a nuclear fuel material zone 12 including the nuclear fuel material, an upper reflector zone 10A, and a lower reflector zone 11A. The upper reflector zone 10A is formed above the nuclear fuel material zone 12 and is formed by the upper reflector zone 10 of each of the fuel assemblies 41 loaded in the core 20. The lower reflector zone 11A is formed under the nuclear fuel material zone 12 and is formed by the lower reflector zone 11 of each of the fuel assemblies 41 loaded in the core.

The nuclear fuel material zone 12 of the core 20 is formed by the nuclear fuel material zones 16 of all the fuel assemblies 41. The nuclear fuel material zone 12 has five zones of an upper blanket zone 5A formed by the upper blanket zones 5, an upper fissile zone 6A formed by the upper fissile zones 6, an internal blanket zone 7A formed by the internal blanket zones 7, a lower fissile zone 8A formed by the lower fissile zones 8, and a lower blanket zone 9A formed by the lower blanket zones 9. The upper blanket zone 5A, upper fissile zone 6A, internal blanket zone 7A, lower fissile zone 8A, and lower blanket zone 9A are disposed in this order from an upper end of the nuclear fuel material zone 12 toward a lower end of the nuclear fuel material zone 12. The core 2 is a parfait core. The zones 10A, 5A, 6A, 7A, 8A, 9A, and 11A are disposed in the same positions as those of the respective zones 10, 5, 6, 7, 8, 9, and 11 of the fuel assembly 41 in the height direction of the core 20.

Figure 13:
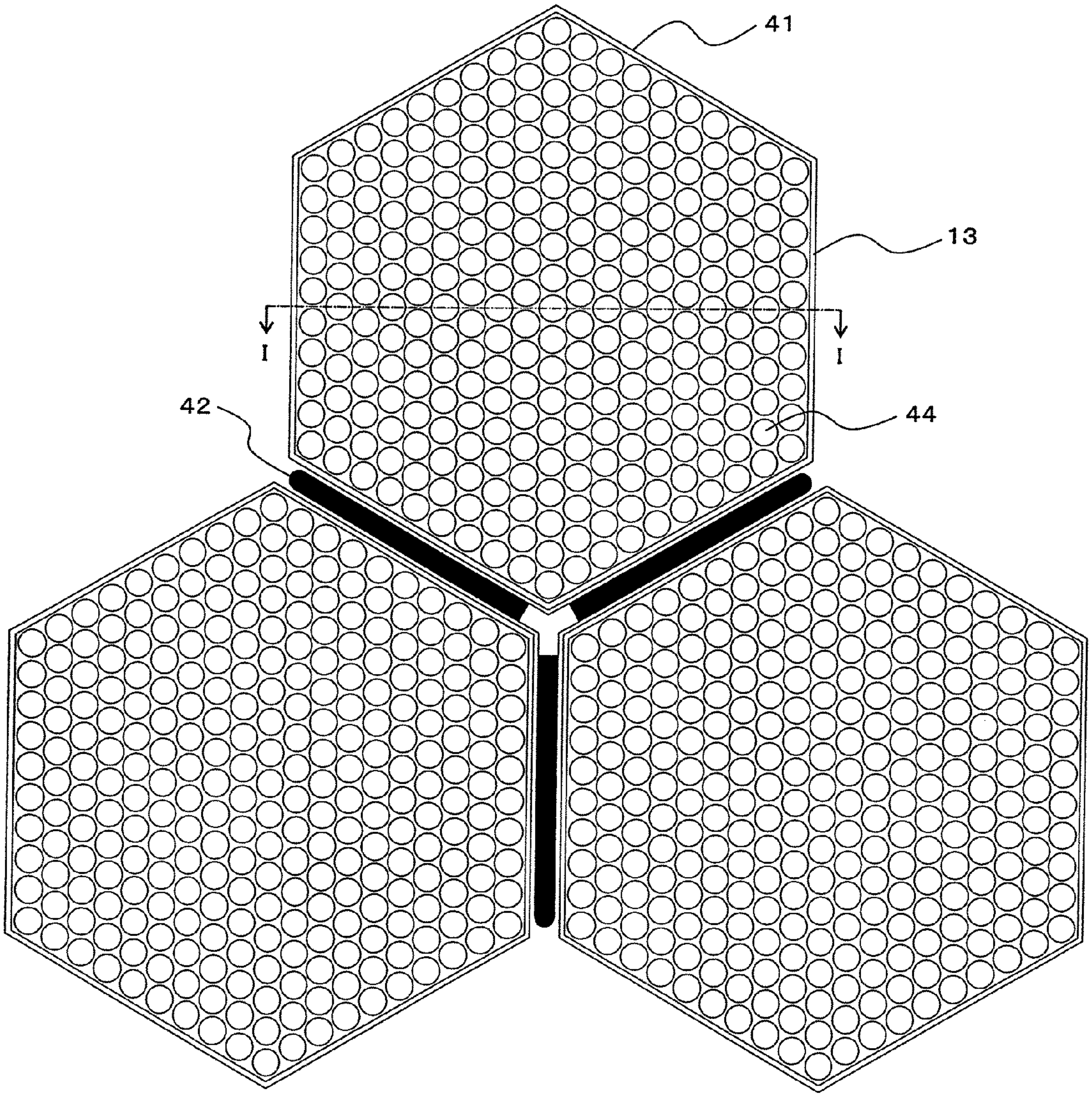
FIG. 13 is a cross sectional view of the fuel assembly lattice shown in FIG. 12.

In the cross section of the zone where the nuclear fuel material of the fuel assembly 41 is loaded, 271 fuel rods 44 with an outside diameter of 10.1 mm are arranged in an equilateral triangle lattice in a channel box 13 which is a hexagonal cylinder as shown in FIG. 13. The shape of the cross section of the fuel assembly 41 is hexagonal and the gap between a plurality of fuel rods 44 included in the fuel assembly 41 is 1.3 mm. A fuel rod row in the outermost layer includes nine fuel rods 44. The control rods 42 having a Y-shaped cross section have three blades extending toward the outside from the tie-rod positioned at the center. Each blade has a plurality of neutron absorbing members 3 filled with $B_4C$ which is neutron absorbing material and is arranged at an interval of 120° around the tie-rod. The control rod 2 has a follower made of carbon, which has a smaller slowing down power than light water, in an insertion end that is first inserted into the core 20.

The structure of the fuel assembly 41 will be explained below by referring to FIG. 17. The fuel assembly 41 is provided with an upper tie-plate (upper fuel support member) 14, a lower tie-plate (lower fuel support member) 15, a plurality of neutron absorbing members (for example, neutron absorbing rods) 3, a plurality of fuel rods 44, and a channel box 13. The lower end portion of each of the fuel rods 44 is supported by the lower tie-plate 15 and the upper end portion of each of the fuel rods 44 is supported by the upper tie-plate 14. Each of the fuel rods 44 has a sealed cladding made of a zirconium alloy and in the cladding of each of the fuel rods 44, in the axial direction, a plenum 2, the nuclear fuel material zone 16, and the neutron absorbing material filling zone 4 are arranged in this order from the upper end toward underneath. A plurality of fuel pellets including the nuclear fuel material are filled in the nuclear fuel material zone (the active fuel length) 16 positioned above the neutron absorbing material filling zone 4 filled with $B_4C$ which is a neutron absorbing material. In the neutron absorbing material filling zone 4, a hafnium rod may be disposed. The rate of the cross sectional area of the fuel pellet occupying a cross sectional area of unit fuel rod lattice in the channel box 13 is 53%.

An outside diameter of the fuel rod 44 (an outside diameter of the cladding) at the respective positions of the neutron absorbing material filling zone 4 and the nuclear fuel material zone 16 is equal to 10.1 mm. The outside diameter of the fuel rod 44 (the outside diameter of the cladding) at the position of the plenum 2 is 5.8 mm and is smaller than the outside diameter of the fuel rod 44 at the position of the nuclear fuel material zone 16. A length of the plenum 2 is 1100 mm. The plenum 2 is interconnected to the neutron absorbing material filling zone 4 and the nuclear fuel material zone 16 in the fuel rod 44

In the nuclear fuel material zone 16, each of the fuel rods 44 is held by a fuel spacer (not shown) at several locations in the axial direction. The fuel spacers hold the intervals between the mutual fuel rods 44 at a predetermined width. The portion of the plenum 2 of each of the fuel rods 44 is supported by three fuel spacers 33 at three locations.

Each of the neutron absorbing members 3 is held on the upper tie-plate 14 by a support rod (support member) 45 made of a zirconium alloy. In the neutron absorbing member 3, $B_4C$ pellets are filled in the sealed tube with an outside diameter of 6 mm. This tube is attached to the support rod 45. The neutron absorbing member 3 may be structured so as to fill the hafnium rods in the tube. Each of the neutron absorbing members 3 is disclosed between the mutual plenums 2 of the neighboring fuel rods 44 and the neutron absorbing members 3 are installed in a ratio of one per one fuel rod 44 (refer to FIG. 18). Each of the neutron absorbing members 3 is disposed between the upper end of the nuclear fuel material zone 12, that is, the upper end of the nuclear fuel material zone 16 and a lower end of the upper tie-plate 14. A length of the neutron absorbing members 3 is 500 mm and a distance between the upper end of the nuclear fuel material zone 16 and the lower end of the neutron absorbing members 3 is 300 mm. In the present embodiment, a rate of a total cross sectional area of all the neutron absorbing members 3 to a cross sectional area of the fuel assembly lattice is 16.8%. A rate of a total cross sectional area of all the neutron absorbing material filling zone 3 to the cross sectional area of the fuel assembly lattice is 49.3%. In the value of 49.3%, a cross sectional area of the control rod 42 is not included.

When the BWR 1 is in operation, the cooling water in the downcomer 29 is pressurized by the rotation of the internal pump 26 and is supplied to the core 20. The cooling water supplied into the core 20 is introduced to each of the fuel assemblies 41 and is heated by the heat generated by fission of the fissional material and a part of it becomes steam. A vapor-liquid two-phase flow including cooling water and steam moves up in the upper reflector zone 10 in the fuel assembly 41. The vapor-liquid two-phase flow is introduced to the steam separator 21 from the core and the steam is separated by the steam separator 21. Moisture is removed more from the separated steam by the steam dryer 22. The steam in which the moisture was removed is supplied to a turbine (not shown) through the main steam pipe 23 and rotates the turbine. A generator (not shown) connected to the turbine is rotated and power is generated. Steam discharged from the turbine is condensed by a condenser (not shown) to condensed water. The condensed water, as feed water, is introduced into the reactor pressure vessel 27 through the water feed pipe 24. The cooling water separated by the steam separator 21 is mixed with the aforementioned feed water in the down corner 29 and is pressurized again by the internal pump 26.

Figure 14:
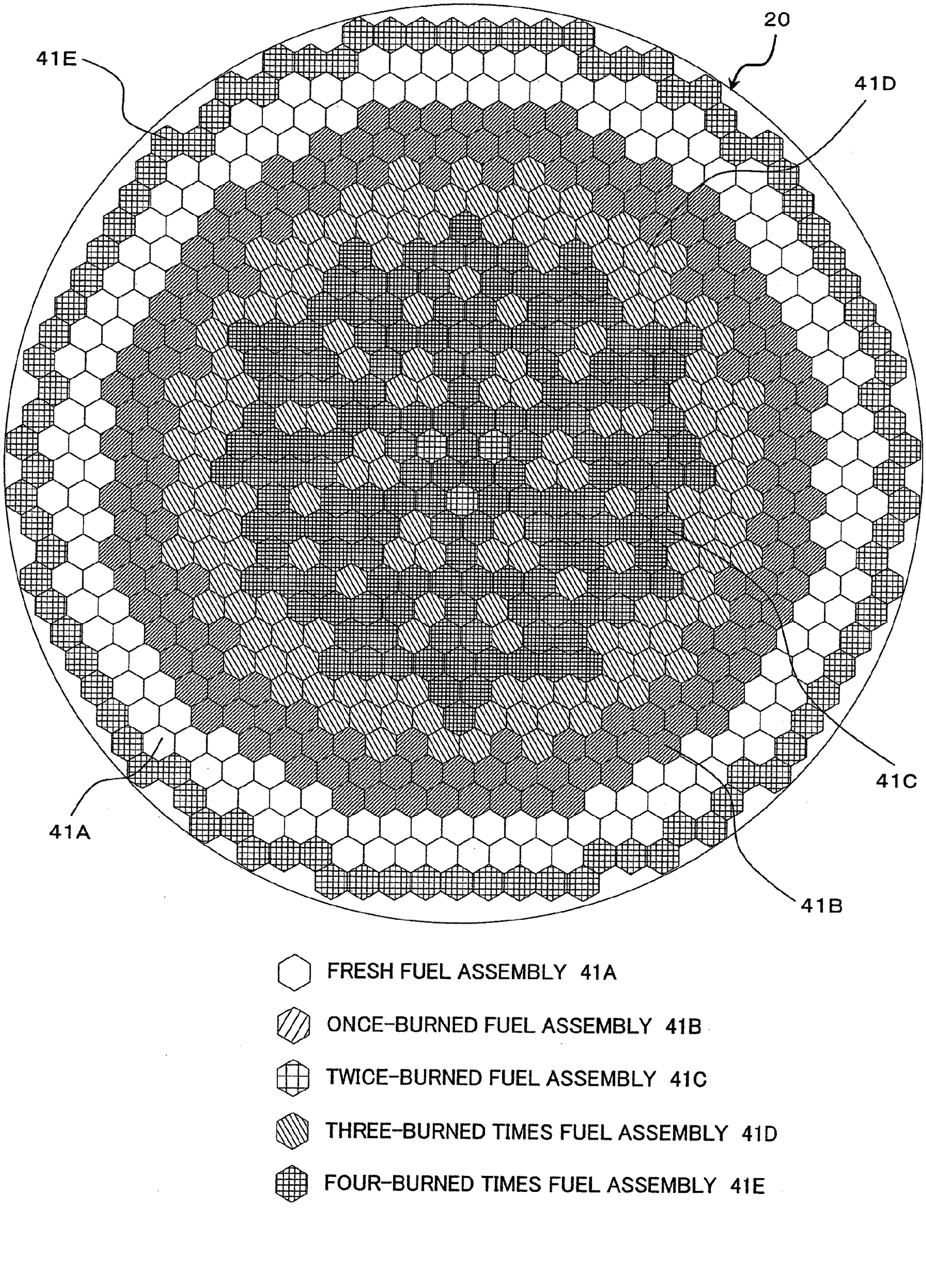
FIG. 14 is an explanatory drawing showing an arrangement of fuel assemblies in an equilibrium core state of a core shown in FIG. 12.
Figure 15:
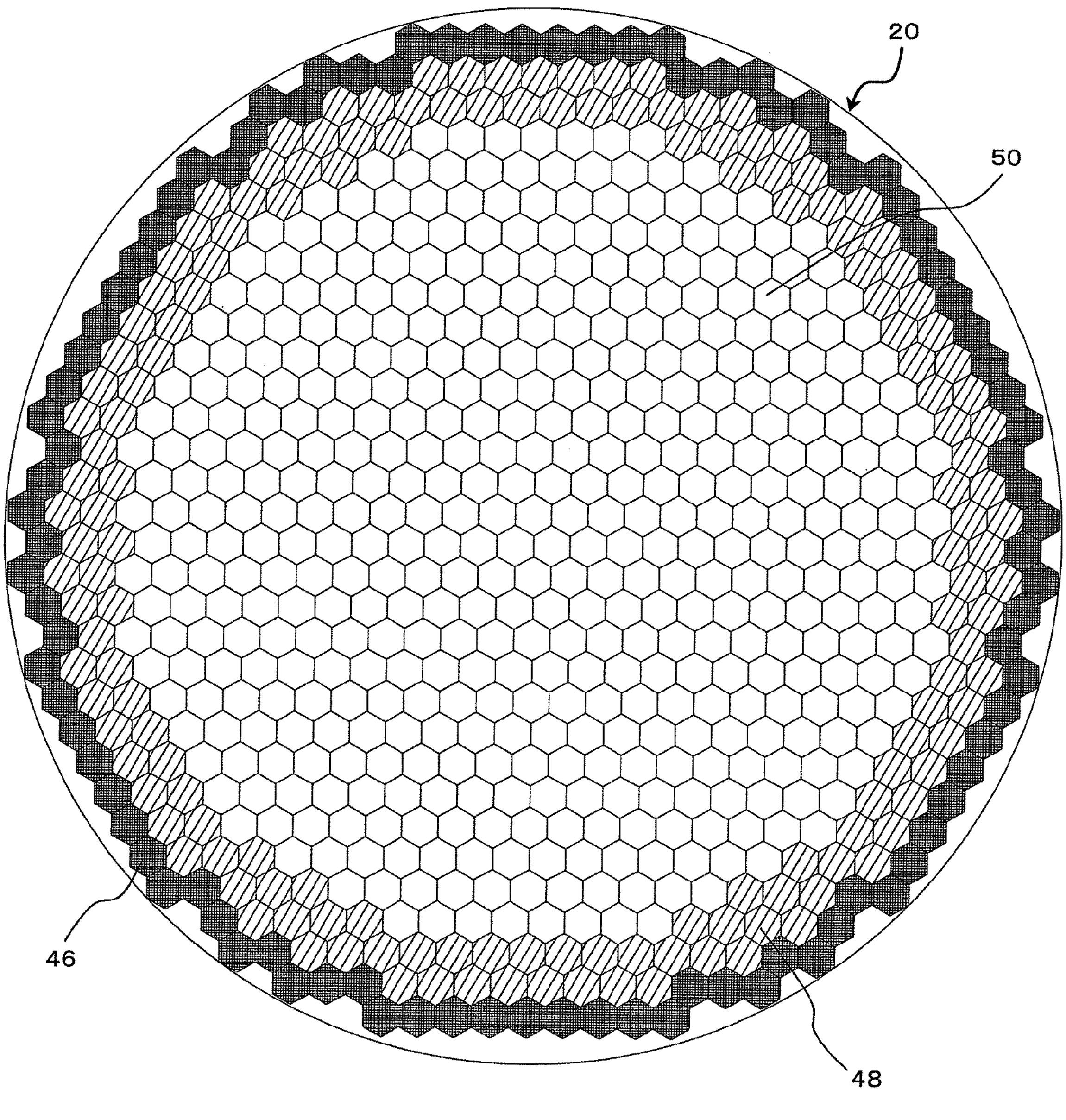
FIG. 15 is an explanatory drawing showing a bore distribution of orifice in an equilibrium core shown in FIG. 14.

The arrangement of the fuel assemblies 41 in the equilibrium core will be explained by referring to FIGS. 14 and 15. Fuel assemblies 41E in the operation cycle of which is the fifth cycle and staying in the core for the longest time in the in-core fuel dwelling time, are disposed in a core outermost layer region 46 of the core 20 having low neutron impedance. Fuel assemblies 41A, which have the highest neutron infinite multiplication factor and stay in the core 20 in a first cycle in the in-core fuel dwelling time are loaded in a core outer region 48 internally adjacent to the core outermost layer region 46, flattening the power distribution in radial directions of the core 20. Fuel assemblies 41B, 41C, and 41D in the operation cycles of which are respectively second cycle, third cycle, and fourth cycle in the in-core fuel dwelling time, are dispersed in a core inner region 50. By such an arrangement, the power distribution in the core inner region 50 is intended to flatten.

The fuel assemblies 41A, 41B, 41C, 41D, and 41E are respectively the fuel assembly 41 shown in FIG. 13 and FIGS. 19 and 20 which will be described later. The lower tie-plates 15 of these fuel assemblies are supported by a plurality of fuel supports (not shown) installed on the core support plate 17. Coolant paths through which the cooling water is fed to the fuel assemblies supported by the fuel support are formed in the fuel support and an orifice (not shown) attached in the fuel support is disposed at the inlet of each of the coolant paths. In the core 20, three regions of the core outermost layer region 46, the core outer region 48, and the core inner region 50 are formed in the radial direction (refer to FIG. 15). The orifice disposed in the core outermost layer region 46, where the power of the fuel assembly 41 is smallest, has a smallest bore and the bore is increased in the order of the orifice positioned in the core outer region 48 and the orifice positioned in the core inner region 50. The bore of the orifice positioned in the core inner region 50 is largest.

Figure 16:
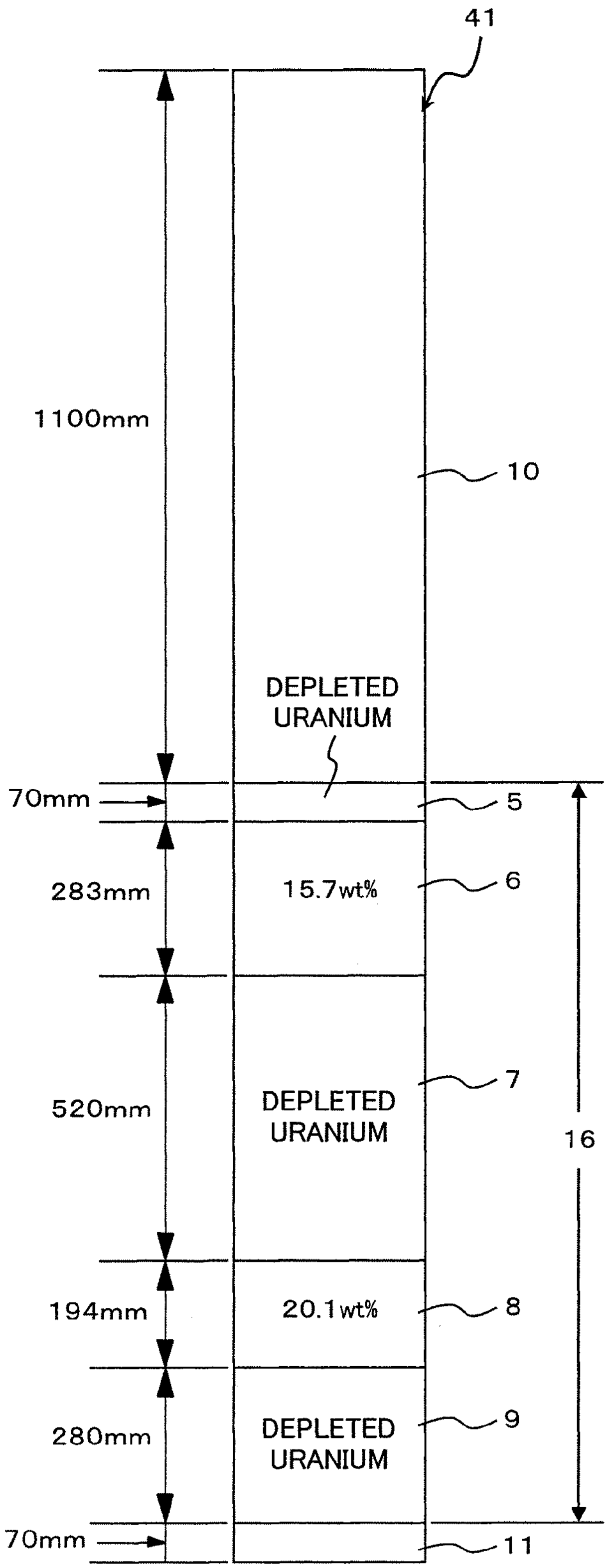
FIG. 16 is an explanatory drawing showing a height of each zone of a fresh fuel assembly loaded in an equilibrium core shown in FIG. 14 in the axial direction of the core and an enrichment distribution of fissionable Pu in a fissile zone.

The height of each of the zones in the nuclear fuel material zone 16 of the fuel assembly 41 is as shown below as shown in FIG. 16. The height of the upper blanket zone 5 (the upper blanket zone 5A) is 70 mm, and the height of the upper fissile zone 6 (the upper fissile zone 6A) is 283 mm, and the height of the internal blanket zone 7 (the internal blanket zone 7A) is 520 mm, and the height of the lower fissile zone 8 (the lower fissile zone 8A) is 194 mm, and the height of the lower blanket zone 9 (the lower blanket zone 9A) is 280 mm. Furthermore, the upper reflector zone 10 (upper reflector zone 10A) with a length of 1100 mm from the upper end of the nuclear fuel material zone 16 toward above is formed. The upper reflector zone 10 includes cooling water (when the BWR 1 is in operation, a vapor-liquid two-phase flow) existing between the mutual plenums 2 of the fuel rods 41. The lower reflector zone 11 (lower reflector zone 11A) with a length of 70 mm from the lower end of the nuclear fuel material zone 16 toward underneath is formed. The lower reflector zone 11 includes cooling water existing between the mutual neutron absorbing material filling zones 4 of the fuel rods 41. The numerical values of the length of the upper reflector zone 10 and the length of the lower reflector zone 11 indicate the length among the length of the fuel rods arranged in the fuel assemblies in the axial direction. The same may be said with the length of the upper reflector zone 10 and the length of the lower reflector zone 11 in each embodiment described later.

The neutron absorbing members 3 and support rods 45 are disclosed in the upper reflector zone 10 (upper reflector zone 10A).

When the burnup of the fuel assembly 41 is zero, in all the fuel rods 44 (the fuel rods 44A to 44E shown in FIG. 19) of the fuel assembly 41, depleted uranium is filled in the three blanket zones of the upper blanket zone 5, the internal blanket zone 7 and the lower blanket zone 9, and when the TRU weight is assumed as 100, mixed oxide fuel at an enrichment of 15.7 wt % of fissionable Pu with the depleted uranium mixed at a rate of weight 213 is filled in the upper fissile zone 6, and when the TRU weight is assumed as 100, mixed oxide fuel at an enrichment of 20.2 wt % of fissionable Pu with the depleted uranium mixed at a rate of weight 143 is filled in the lower fissile zone 8. The upper blanket zone 5, internal blanket zone 7, and lower blanket zone 9 include no TRUs. The average enrichment of fissionable Pu in the upper fissile zone 6 and the lower fissile zone 8 is 17.5 wt %. The TRU is a material recovered by the nuclear fuel reprocessing from the nuclear fuel material (spent nuclear fuel) included in the fuel assembly 41 taken out from the reactor pressure vessel 27 as a spent fuel assembly. In each blanket zone, the mixed oxide fuel is not filled. Further, in each blanket zone, instead of depleted uranium, natural uranium or degraded uranium recovered from the spent fuel assemblies may be used.

Figure 19:
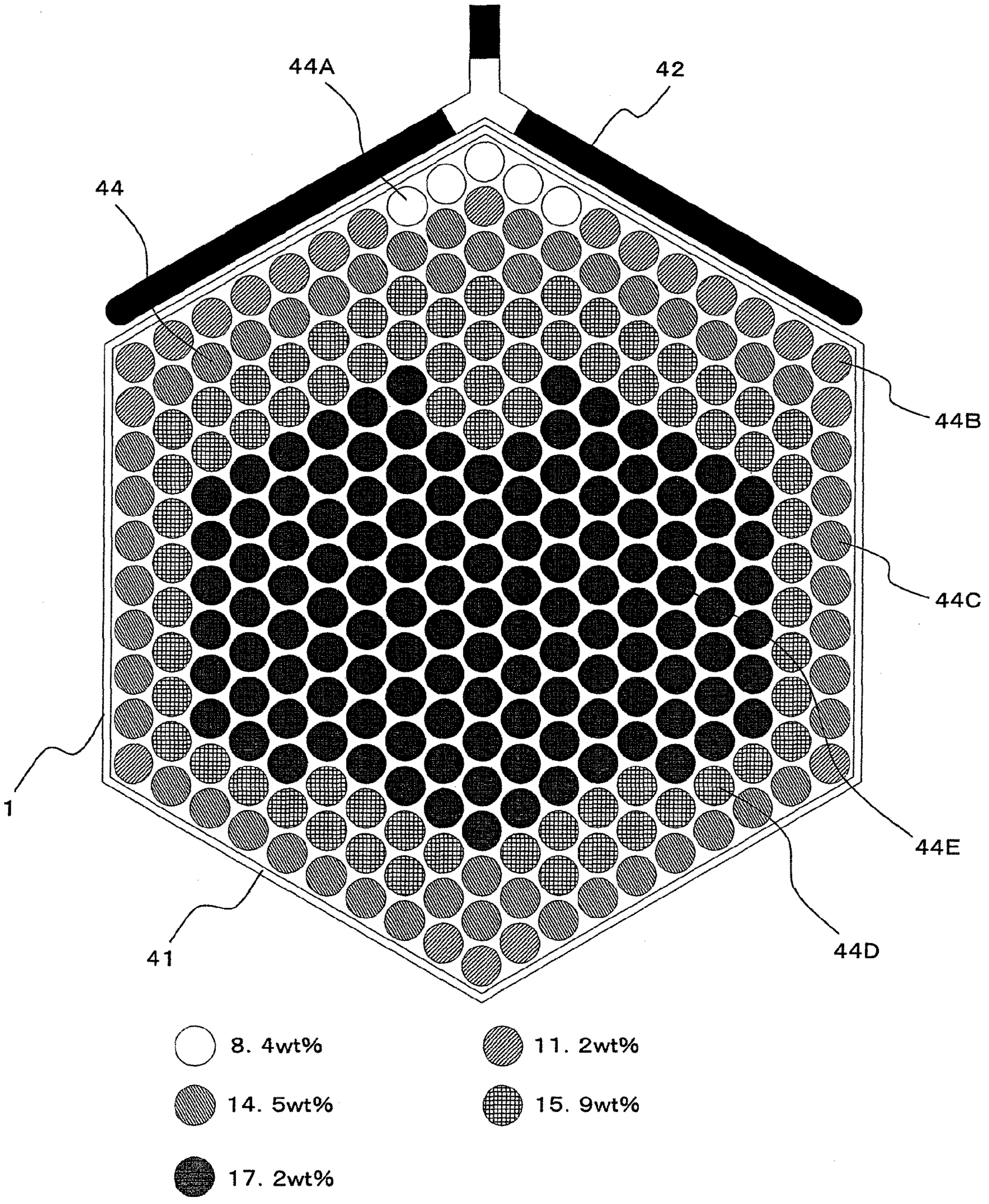
FIG. 19 is an explanatory drawing showing an enrichment distribution of fissionable Pu in a cross section of an upper fissile zone of a fuel assembly shown in FIG. 17.
Figure 20:
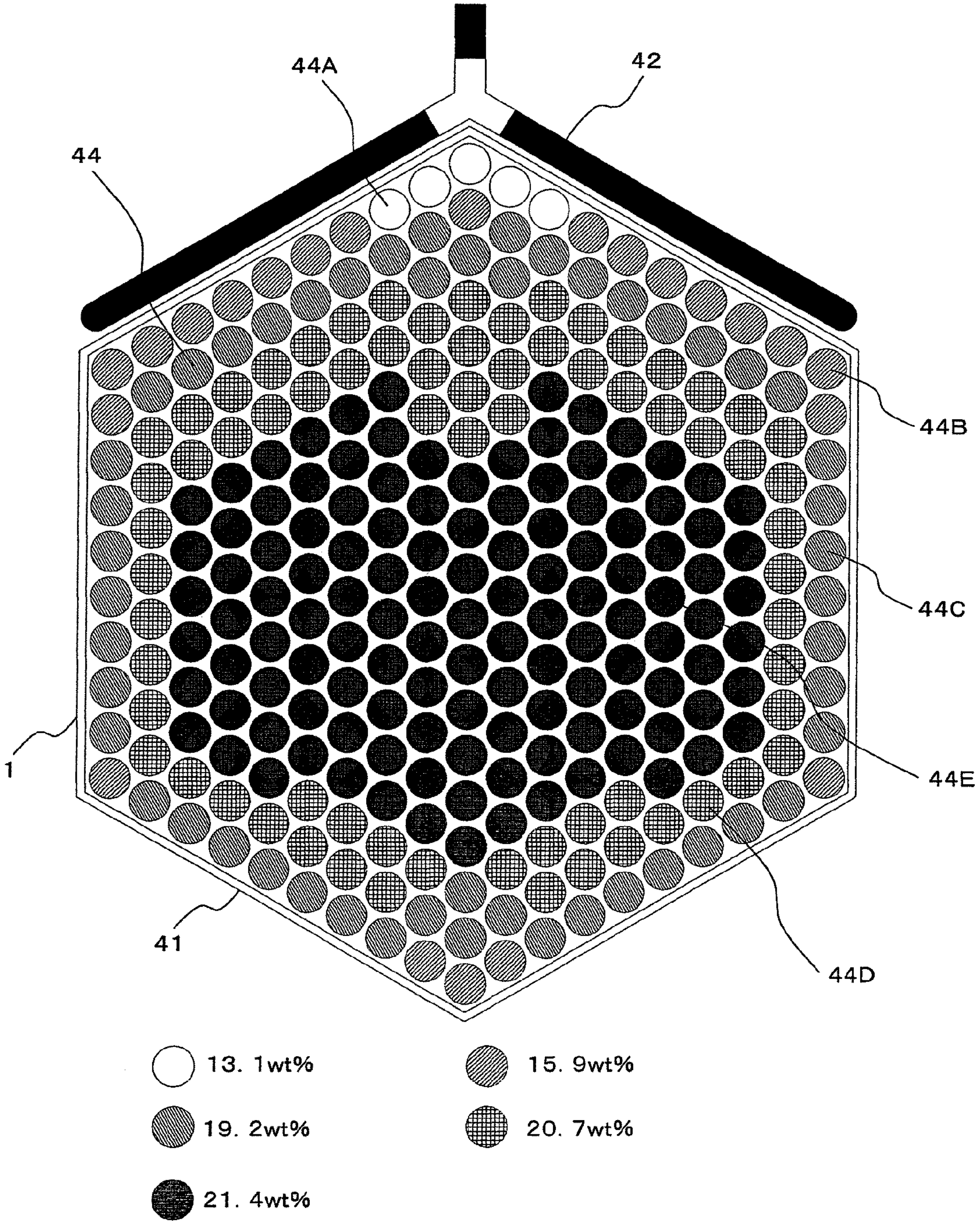
FIG. 20 is an explanatory drawing showing an enrichment distribution of fissionable Pu in a cross section of a lower fissile zone of a fuel assembly shown in FIG. 17.

The fuel assembly 41 has a plurality of fuel rods 44A to 44E as fuel rods 44 and these fuel rods are arranged as shown in FIGS. 19 and 20. FIG. 19 shows a cross section of the fuel assembly 41 in the upper fissile zone 6. FIG. 20 shows a cross section of the fuel assembly 41 in the lower fissile zone 8. The mixed oxide fuel filled in the respective upper fissile zones 6 of the fuel rods 44A to 44E has the enrichment of fissionable Pu indicated below in the state of a burnup of 0 (refer to FIG. 19). In the fuel rod 44A, the enrichment of fissionable Pu is 8.4 wt %, and in the fuel rod 44B, the enrichment of fissionable Pu is 11.2 wt %, and in the fuel rod 44C, the enrichment of fissionable Pu is 14.5 wt %, and in the fuel rod 44D, the enrichment of fissionable Pu is 15.9 wt %, and in the fuel rod 44E, the enrichment of fissionable Pu is 17.2 wt %.

The mixed oxide fuel filled in the respective lower fissile zones 8 of the fuel rods 44A to 44E has the enrichment of fissionable Pu indicated below in the state of a burnup of 0 (refer to FIG. 20). In the fuel rod 44A, the enrichment of fissionable Pu is 13.1 wt %, and in the fuel rod 44B, the enrichment of fissionable Pu is 15.9 wt %, and in the fuel rod 44C, the enrichment of fissionable Pu is 19.2 wt %, and in the fuel rod 44D, the enrichment of fissionable Pu is 20.7 wt %, and in the fuel rod 44E, the enrichment of fissionable Pu is 21.4 wt %.

In each blanket zone of the fuel rods 44A to 44E, there exists no TRU, though each mixed oxide fuel in the upper fissile zone 6 and lower fissile zone 8 of the fuel rods 44A to 44E includes the TRUs of the composition shown in Table 1. In the fuel assembly 41, the rate of fissionable Pu-239 in all the TRUs is 44 wt % in the state of a burnup of 0. Table 1 shows the composition of the TRUs existing in the nuclear fuel material included in the fresh fuel assemblies loaded in the core which is obtained by reprocessing the nuclear fuel material in the spent fuel assemblies. This spent fuel assemblies stayed outside the BWR 1 for two years in the fuel storage pool and fuel reprocessing equipment and for one year in the fuel manufacture equipment, that is, for three years in total after taken out from the core 20.

During the operation of the BWR 1, the volatile fission product generated by fission of the fissionable material in each of the fuel rods 44 is stored in the plenum 2. Since the plenum 2 has the length of 1100 mm, it can store the sufficient quantity of the volatile fission product generated by fission of the fissionable material. Therefore, the soundness of the fuel rods 44 can be ensured.

According to the present embodiment, even though it is assumed that the overall core becomes the state of 100% void, which is an impossible event as an initiating event in the ABWR, neutrons leaking upward or downward from the nuclear fuel material zone 12 can be absorbed by the neutron absorbing members 3 and neutron absorbing material filling zones 4 because a plurality of neutron absorbing members 3 with a length of 500 mm are disposed at the position 300 mm upward from the upper end of the nuclear fuel material zone 12 and a plurality of neutron absorbing material filling zones 4 are disposed downward from the lower end of the nuclear fuel material zone 12. Therefore, even though the overall core becomes the state of 100% void, the insertion of positive reactivity to the nuclear fuel material zone 12 can be avoided. When such a state occurs, negative reactivity is inserted to the nuclear fuel material zone 12.

In addition, the core 20 has the upper fissile zone 6 with an enrichment of fissionable Pu of 15.7 wt % and a height of 283 mm and the lower fissile zone 8 with an enrichment of fissionable Pu of 20.2 wt % and a height of 194 mm. The average enrichment of fissionable Pu in the upper fissile zone 6 and the lower fissile zone 8 is 17.5 wt %. The total of the height of the lower fissile zone 8 and the height of the higher fissile zone 6 is 477 mm, and the height of the higher fissile zone 6 is 1.46 times of the height of the lower fissile zone 8. The enrichment of fissionable Pu in the lower fissile zone 8 is 1.29 times the enrichment of fissionable Pu in the higher fissile zone 6. In such core 20, the breeding ratio is 1 or more and the thermal margin can be increased more. As a result, the core 20 of the present embodiment can reduce a maximum linear heat generating rate by 2% in comparison with that when the enrichment of fissionable Pu in both upper and lower fissile zones are the same and the void coefficient is negative. The BWR 1 having such a core 20 can continue the TRU multiple-recycling.

Since the present embodiment has the core structures of (1), (2), and (3), even though the overall core becomes the state of 100% void, the positive reactivity is not inserted to the nuclear fuel material zone 12, and the soundness of the fuel rods 44 is increased, and the thermal margin is increased. Consequently, the safety margin can be improved more without impairing the economical efficiency of fuel of the light water reactor.

In the core 20 of the present embodiment, when the same electric power of 1350 MW as that of the ABWR is generated by using the reactor pressure vessel 27 of almost the same size as that of the current ABWR, a discharge burnup of the nuclear fuel material zone 12 including the upper fissile zone 6A, lower fissile zone 8A, and internal blanket zone 7A excluding the upper blanket zone 5A and lower blanket zone 9A becomes 53 GWd/t and the discharge burnup of the nuclear fuel material zone 12 including the upper blanket zone 5A and lower blanket zone 9A becomes 45 GWd/t. In the core 20, the void coefficient becomes $-3\times10^{-4}\Delta k/k/\%$ void and the MCPR becomes 1.3. Therefore, in the core 20, a breeding ratio of 1.01 can be realized in the state that the rate of each isotope of the TRU is kept substantially constant as mentioned above.

Figure 17:
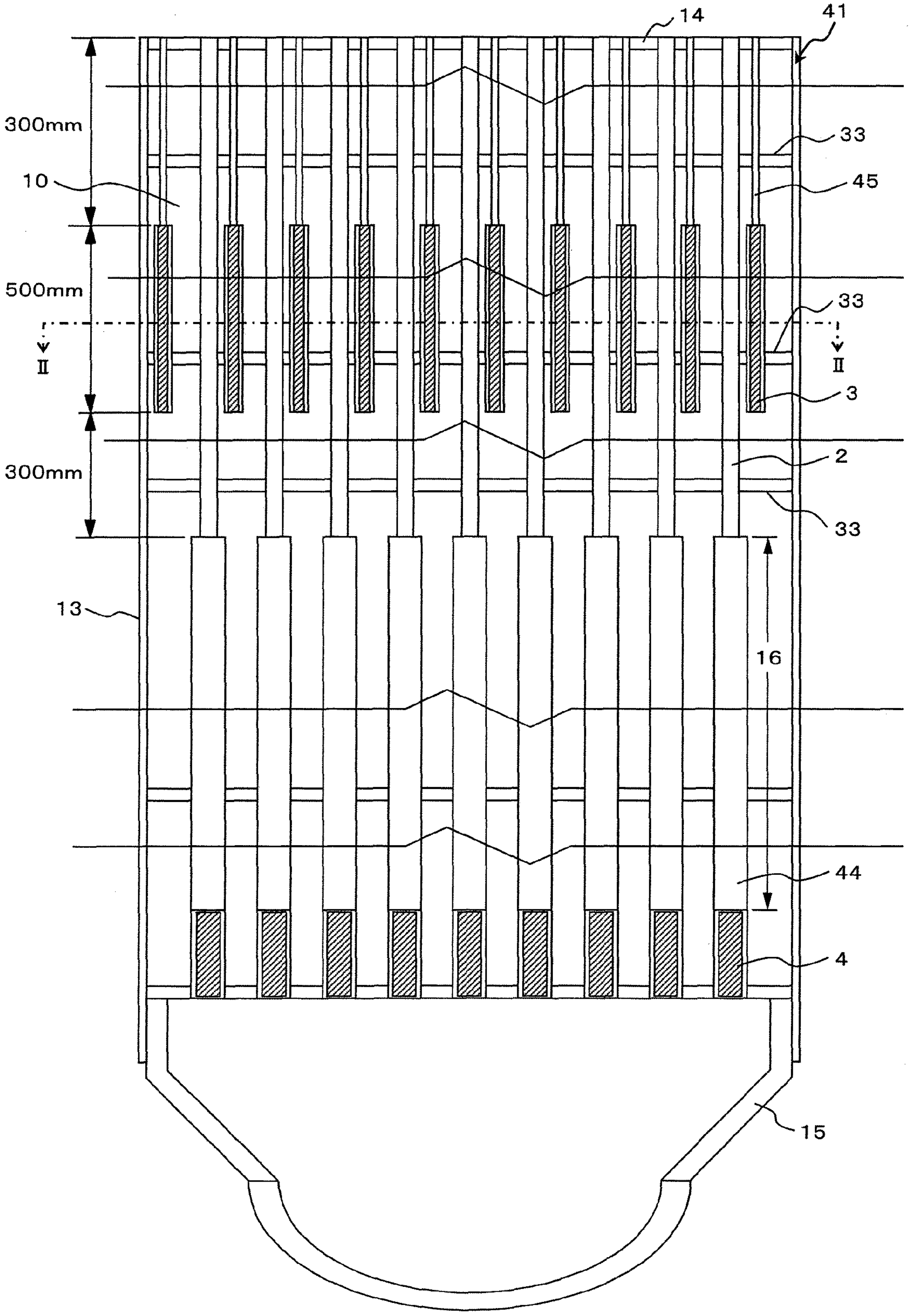
FIG. 17 is a longitudinal sectional view showing a fuel assembly and a sectional view taken along a line I-I of FIG. 13.

In the present embodiment, a flow path area of the vapor-liquid two-phase flow formed between the mutual plenums 2 of the fuel rods 44 on a section II-II of FIG. 17 becomes narrower the neutron absorbing members 3 are disposed in the upper reflector zone 10 and the pressure loss in the upper reflector zone 10 is increased. Since the pressure loss in the upper reflector zone 10 is smaller than the pressure loss of the core 20, there is no problem particularly. In the upper blanket zone 5 and the upper reflector zone 10, the pressure loss in the upper reflector zone 10 can be reduced by forming a plurality of openings passing through the side wall of the channel box 13.

Figure 21:
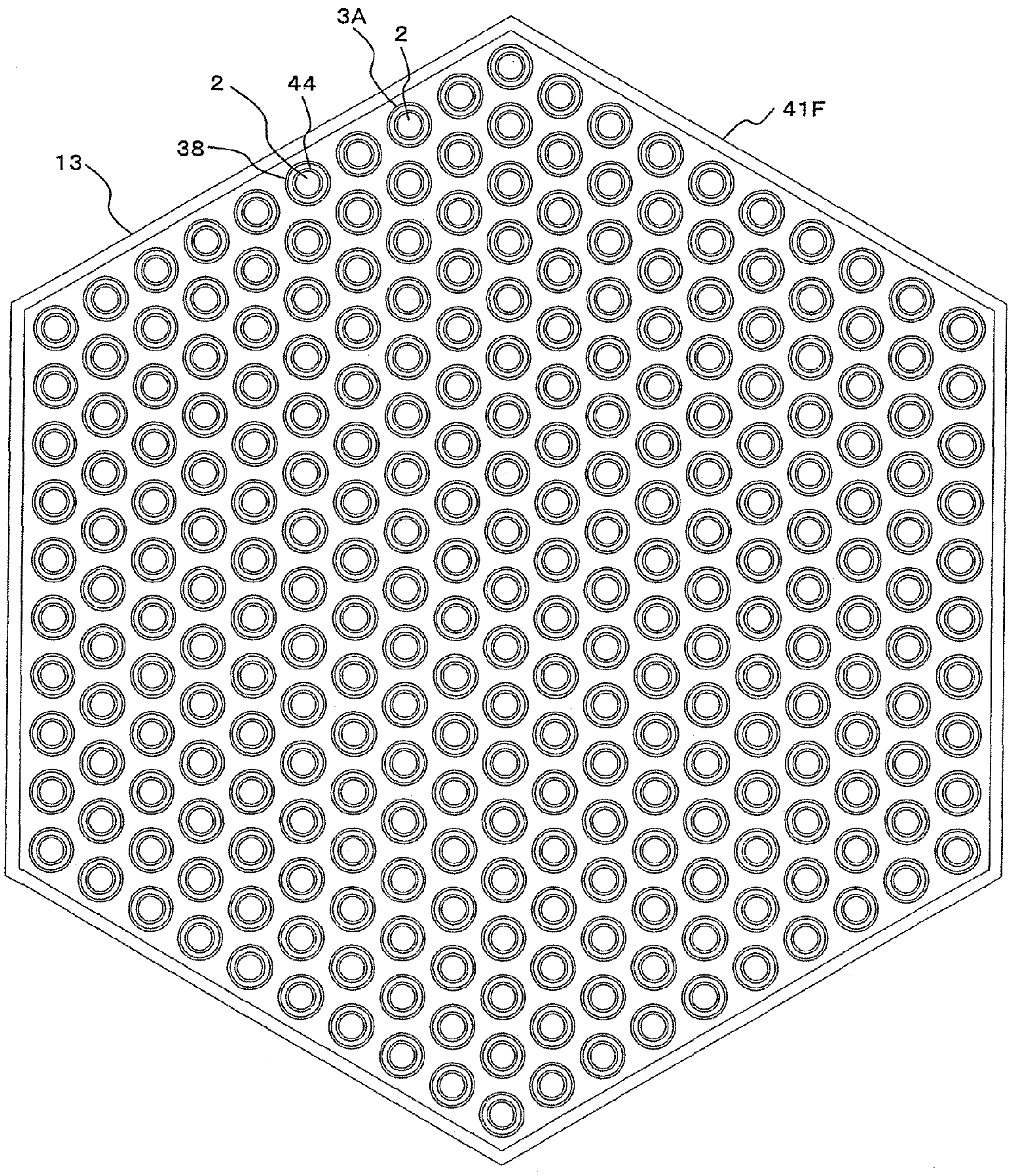
FIG. 21 is a cross sectional view of a fuel assembly being another embodiment at arrangement position of a neutron absorbing member.
Figure 22:
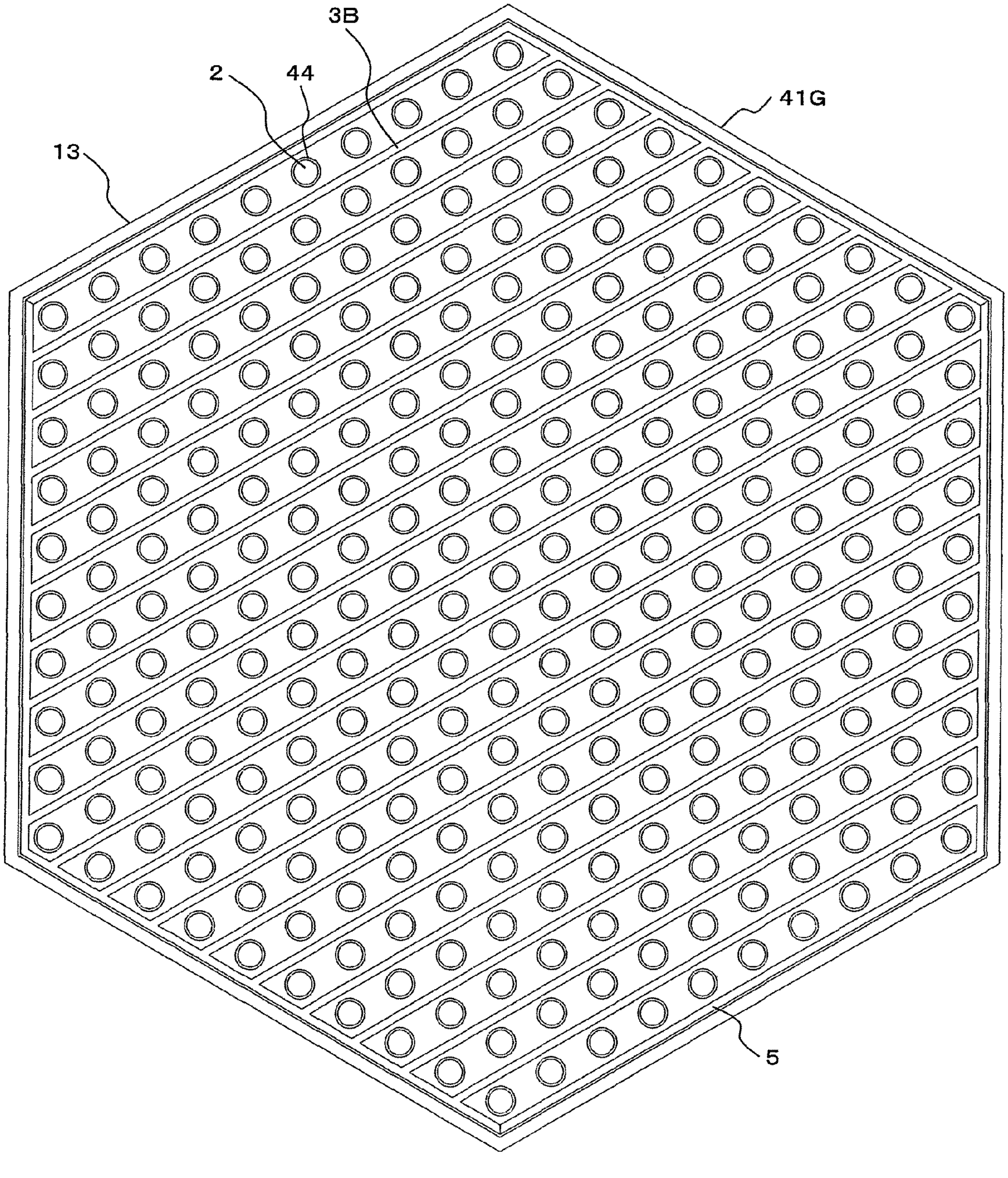
FIG. 22 is a cross sectional view of a fuel assembly being another embodiment at arrangement position of a neutron absorbing member.

Neutron absorbing members 3A shown in FIG. 21 and neutron absorbing members 3B shown in FIG. 22 may be used in place of the neutron absorbing members 3 shown in FIGS. 17 and 18. A fuel assembly 41F shown in FIG. 21 has a structure that in the fuel assembly 41 shown in FIG. 17, the neutron absorbing members 3 are exchanged with the neutron absorbing members 3A. Other structures of the fuel assembly 41F are the same as that of the fuel assembly 41. The neutron absorbing members 3A are circular bodies and are disposed so as to surround the plenum 2 of each of the fuel rods 44. The neutron absorbing members 3A are structured so as to attach a circular sealed vessel 38 with an outside diameter of 8.8 mm arranged so as to surround the outside surface of the fuel rod 44 to the outside surface of the fuel rod 44 and to fill $B_4C$ in the circular zone formed between the outside surface of the fuel rod 44 and the sealed vessel. An upper end and lower end of the sealed vessel are sealed. When applying the neutron absorbing members 3A, the support rods 45 are not necessary.

The fuel assembly 41G shown in FIG. 22 has a structure that in the fuel assembly 41 shown in FIG. 17, the neutron absorbing members 3 are exchanged with the neutron absorbing members 3B. Other structures of the fuel assembly 41G are the same as that of the fuel assembly 41. The neutron absorbing members 3B are an Hf plate and are disposed between the arrangement of the fuel rods 44. Both ends of each Hf plate with a thickness of 1.5 mm are attached to a frame member 5 with a hexagonal cross section. The frame members 5 are arranged along the inner surface of the channel box 13 and are attached to the upper tie-plate 14 by a plurality of support rods 45 and are disposed so as to enclose the plenum 2.

By use of the neutron absorbing members 3A and 3B, the similar effect to embodiment 1 can be obtained.

Embodiment 2

A core of a light water reactor according to embodiment 2 which is another embodiment of the present invention will be explained in detail below by referring to FIGS. 23 to 27 and Table 2. A core 20A of the light water reactor of the present embodiment has the aforementioned core structures of (1) and (2).

TABLE 2

| Nuclide | Composition (wt %) |
|---|---|
| Np-237 | 0.1 |
| Pu-238 | 4.8 |
| Pu-239 | 8.5 |
| Pu-240 | 39.1 |
| Pu-241 | 4.5 |
| Pu-242 | 26.0 |
| Am-241 | 4.5 |
| Am-242M | 0.2 |
| Am-243 | 4.8 |
| Cm-244 | 4.5 |
| Cm-245 | 1.4 |
| Cm-246 | 1.1 |
| Cm-247 | 0.2 |
| Cm-248 | 0.3 |

The core 20A of the light water reactor has a structure that the fuel assembly 41 is exchanged with a fuel assembly 41H in the core 20 of embodiment 1. Other structure of the core 20A is the same as that of the core 20. The portion of the core 20A different from the core 20A will be explained. The core 20A is a parfait core similarly to the core 20. The BWR which is a light water reactor to which the core 20A is applied has a structure that the core 20 is exchanged with the core 20A in the BWR. The BWR has a structure similar to the BWR 1 except the core 20 and is a TRU burner reactor having the core 20A.

The fuel assembly 41H (refer to FIGS. 23 and 25) loaded in the core 20A has 397 fuel rods 44F with an outside diameter of 7.2 mm arranged in an equilateral triangle lattice in the channel box 13. The gap between the mutual fuel rods 44F is 2.2 mm and a fuel rod row in the outermost layer includes nine fuel rods 44. The rate of the cross sectional area of the fuel pellets occupying in the cross sectional area of the unit fuel rod lattice in the channel box 13 is 36%. In the core 20A, the fuel assemblies 41A to 41D different in the experienced operation cycle number are disposed as shown in FIG. 24 in the state of the equilibrium core. The fuel assemblies 41D, the operation cycle of which is the fourth cycle, are disposed in the core outermost layer region 46 (refer to FIG. 15). The fuel assemblies 41A, the operation cycle of which is the first cycle, are disposed in the core outer region 48 and the fuel assemblies 41B, 41C, and 41D, the operation cycles of which are respectively the second cycle, third cycle and fourth cycle, are respectively scattered and disposed in the core inner region 50. There exists an intermediate zone, in which a plurality of fuel assemblies 41B are disposed circularly, between the core inner region 50 and the core outer region 48. The power distribution of such a core in the radial direction is flattened more. The fuel assemblies 41A to 41E shown in FIG. 24 are respectively the fuel assembly 41H.

Figure 26:
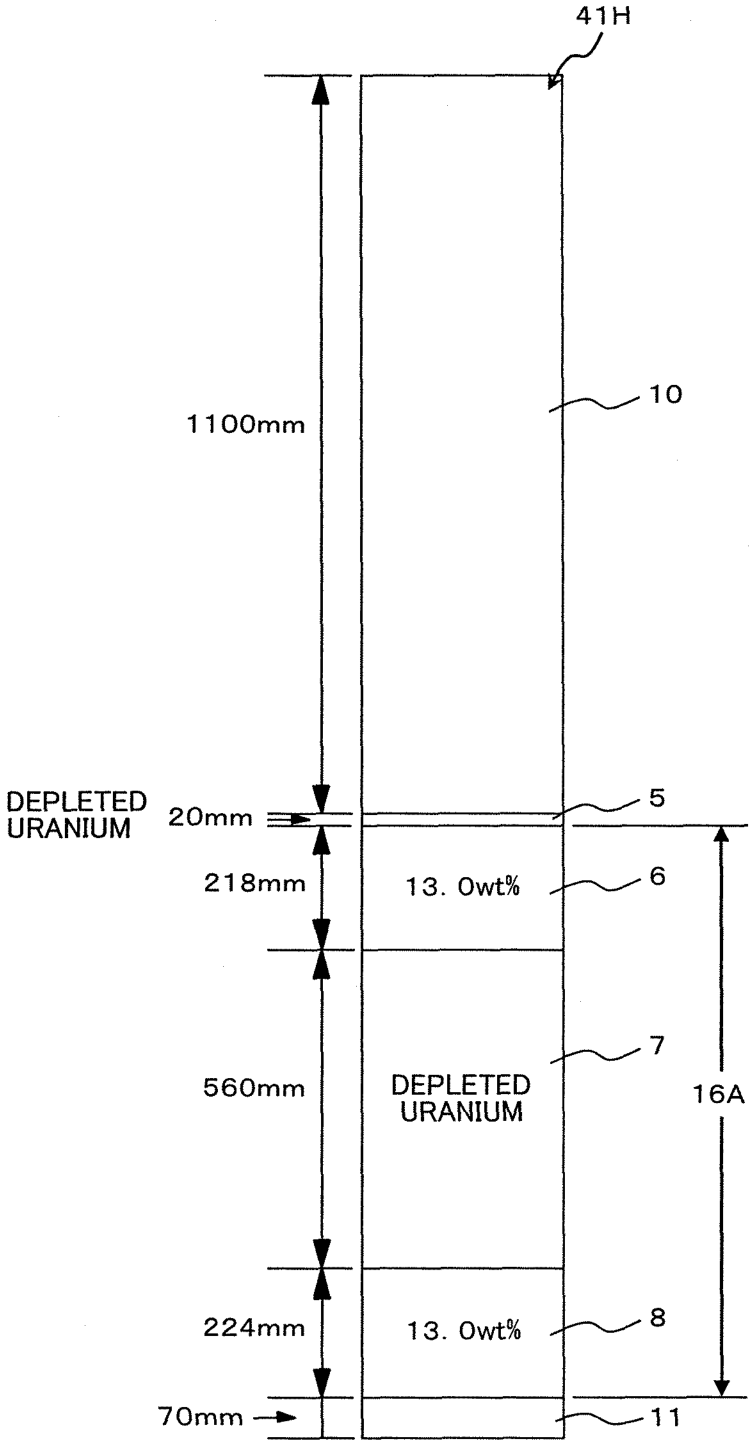
FIG. 26 is an explanatory drawing showing a height of each zone of a fresh fuel assembly loaded in an equilibrium core shown in FIG. 24 in an axial direction and an enrichment distribution of fissionable Pu in a fissile zone of the fresh fuel assembly.

The nuclear fuel material zone 16A wherein the nuclear fuel material of the fuel assembly 41H exists (refer to FIG. 26) has a structure that the lower blanket zone 9 is removed from the fuel assembly 41. In the nuclear fuel material zone 16A, as shown in FIG. 26, the height of the upper blanket zone 5 is 20 mm, and the height of the upper fissile zone 6 is 218 mm, and the height of the internal blanket zone 7 is 560 mm, and the height of the lower fissile zone 8 is 224 mm. Additionally, the height of the upper reflector zone 10 formed above the upper blanket zone 5 is 1100 mm and the height of the lower reflector zone 11 formed under the lower fissile zone 8 is 70 mm.

The nuclear fuel material zone 12 of the core 20A does not have the lower blanket zone 9A. The nuclear fuel material zone 12 includes the upper blanket zone 5A, upper fissile zone 6A, internal blanket zone 7A, and lower fissile zone 8A having the same heights as the respective heights of the upper blanket zone 5, upper fissile zone 6, internal blanket zone 7, and lower fissile zone 8.

Figure 25:
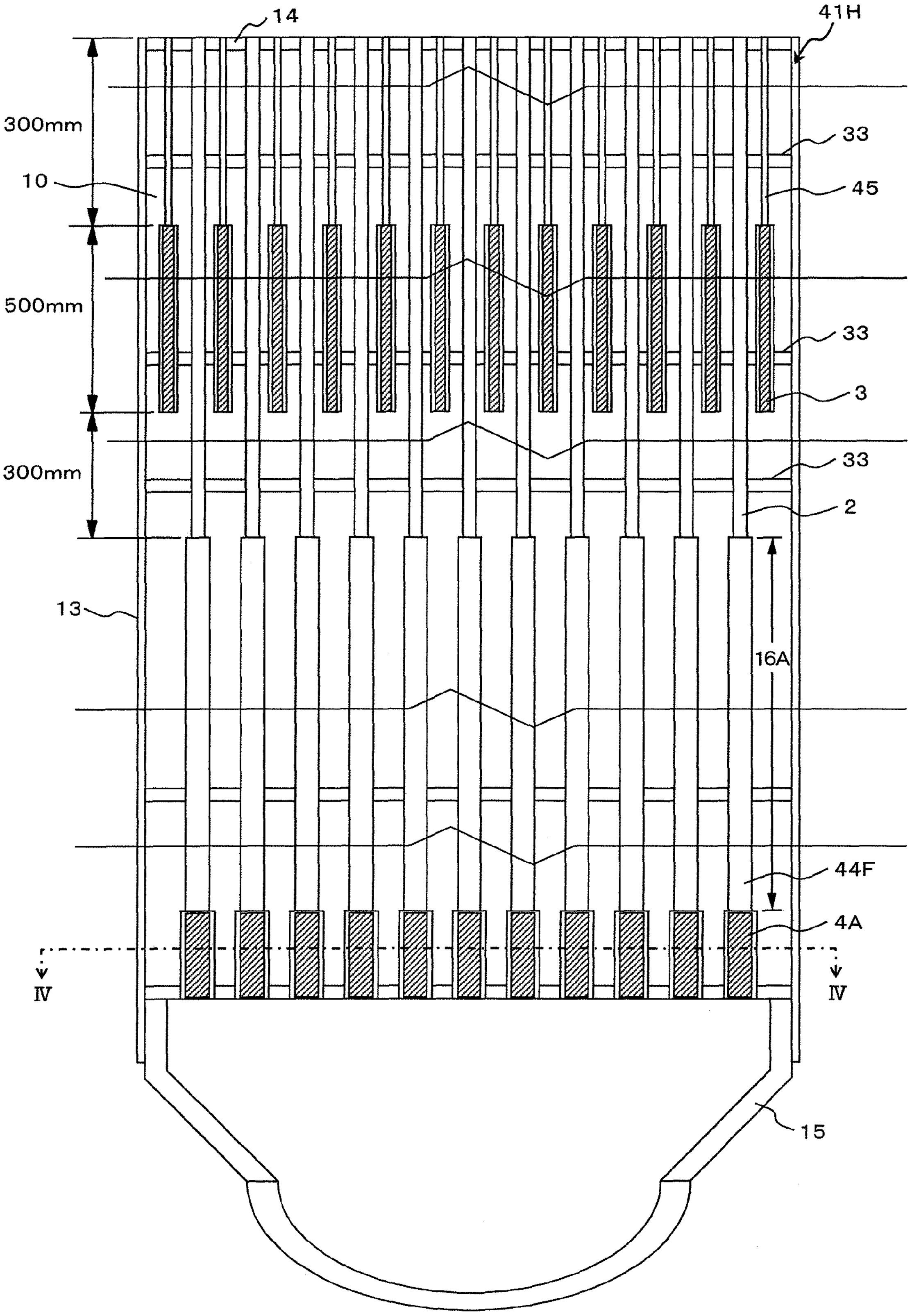
FIG. 25 is a longitudinal sectional view showing a fuel assembly and a sectional view taken along a line III-III of FIG. 23.

The structure of each of the fuel assemblies 41H will be explained below by referring to FIG. 25. Each of the fuel assemblies 41H has the same structure as that of the fuel assembly 44 except that the fuel rods 44 of the fuel assembly 41 are exchanged with the fuel rods 44F. The fuel rods 44F has the nuclear fuel material zone 16A aforementioned and has the plenum 2 above the nuclear fuel material zone 16A and the neutron absorbing material filling zone 4A under the nuclear fuel material zone 16A. The outside diameter of the plenum 2 is 3.7 mm and the length of the plenum 2 is 1100 mm. In the nuclear fuel material zone 16A of the fuel rod 44F, the upper blanket zone 5, upper fissile zone 6, internal blanket zone 7, and lower fissile zone 8 exist. The outside diameter of the portion of the fuel rod 44F in the neutron absorbing material filling zone 4A is 8.1 mm and is larger than the outside diameter of the portion of the fuel rod 44F in the nuclear fuel material zone 16A (refer to FIGS. 25 and 27). The neutron absorbing members 3 with an outside diameter of 6.2 mm are disposed between the plenums 2. A rate of a total cross sectional area of all the neutron absorbing material filling zone 4A to the cross sectional area of the fuel assembly lattice is 44.0%. The value 44.0% does not include the cross sectional area of the control rods 42.

When the burnup of the fuel assembly 41H is 0, all the fuel rods 44F (the fuel rods 44A to 44E shown in FIG. 19) of the fuel assembly 41H fill the upper blanket zone 5 and the internal blanket zone 7 with depleted uranium and fill the upper fissile zone 6 and the lower fissile zone 8 with TRU oxide fuel including TRUs of the composition shown in Table 2 in the state of a burnup of 0. The enrichment of fissionable Pu of the TRU oxide fuel is 13.0 wt % and the rate of Pu-239 in the TRU is 8.5 wt %. The TRUs used in the fuel assembly 41H are obtained by reprocessing the spent nuclear fuel included in the spent fuel assembly. Each blanket zone is not filled with the mixed oxide fuel and does not include TRUs. Further, in each blanket zone, natural uranium or degraded uranium recovered from the spent fuel assembly may be used instead of depleted uranium.

During the operation of the BWR, a sufficient quantity of the volatile fission product generated by the fission of the fissionable material in each of the fuel rods 44F can be stored in the plenum 2 with a length of 1100 mm. Therefore, the soundness of the fuel rods 44F is increased.

According to the present embodiment, even if it is assumed that the overall core becomes the state of 100% void, which is an impossible event as an initiating event in the ABWR, the insertion of positive reactivity to the nuclear fuel material zone 12 can be avoided because a plurality of neutron absorbing members 3 with a length of 500 mm are disposed at the position 300 mm upward from the upper end of the nuclear fuel material zone 12 and a plurality of neutron absorbing material filling zones 4A are disposed downward from the lower end of the nuclear fuel material zone 12. When the state results, negative reactivity is inserted to the nuclear fuel material zone 12.

Furthermore, the present embodiment can obtain the effects occurred in embodiment 1. The present embodiment has the core structures of (1) and (2), so that even when the overall core becomes the state of 100% void, positive reactivity is not inserted to the nuclear fuel material zone 12 and the soundness of the fuel rods 44F is increased. Therefore, the present embodiment can improve more the safety margin without impairing the economical efficiency of fuel of the light water reactor.

In the core 20A of the present embodiment, when the same electric power of 1350 MW as that of the ABWR is generated by using the reactor pressure vessel 27 of almost the same size as that of the current ABWR, the discharge burnup becomes 65 GWd/t, and the void coefficient becomes $-3\times10^{-4}\Delta k/k/\%$ void, and the MCPR becomes 1.3. In the core 20A, while the keeping of the rate of the TRU isotopes is realized, the weight of the TRUs obtained by reprocessing the spent nuclear fuel in the spent fuel assembly after 3 years from takeout of the fuel assembly 41H from the core 20A as a spent fuel assembly reduces a weight of 8.3% from the TRU weight of the fresh fuel assembly 41H loaded in the core. In addition, during the period from loading of the fuel assembly 41H in the core 20A to takeout, the TRU fission efficiency which is a rate of the TRU fission weight occupying in all the fission weights of the nuclear fuel material in the fuel assembly 41H is 55%. Further, the keeping of the rate of the TRU isotopes means that the rates of the TRU isotopes are the same in the n TRU recycle generation and (n+1) TRU recycle generation.

Even in the present embodiment, either of the neutron absorbing members 3A and 3B may be used instead of the neutron absorbing members 3.

Embodiment 3

Figure 28:
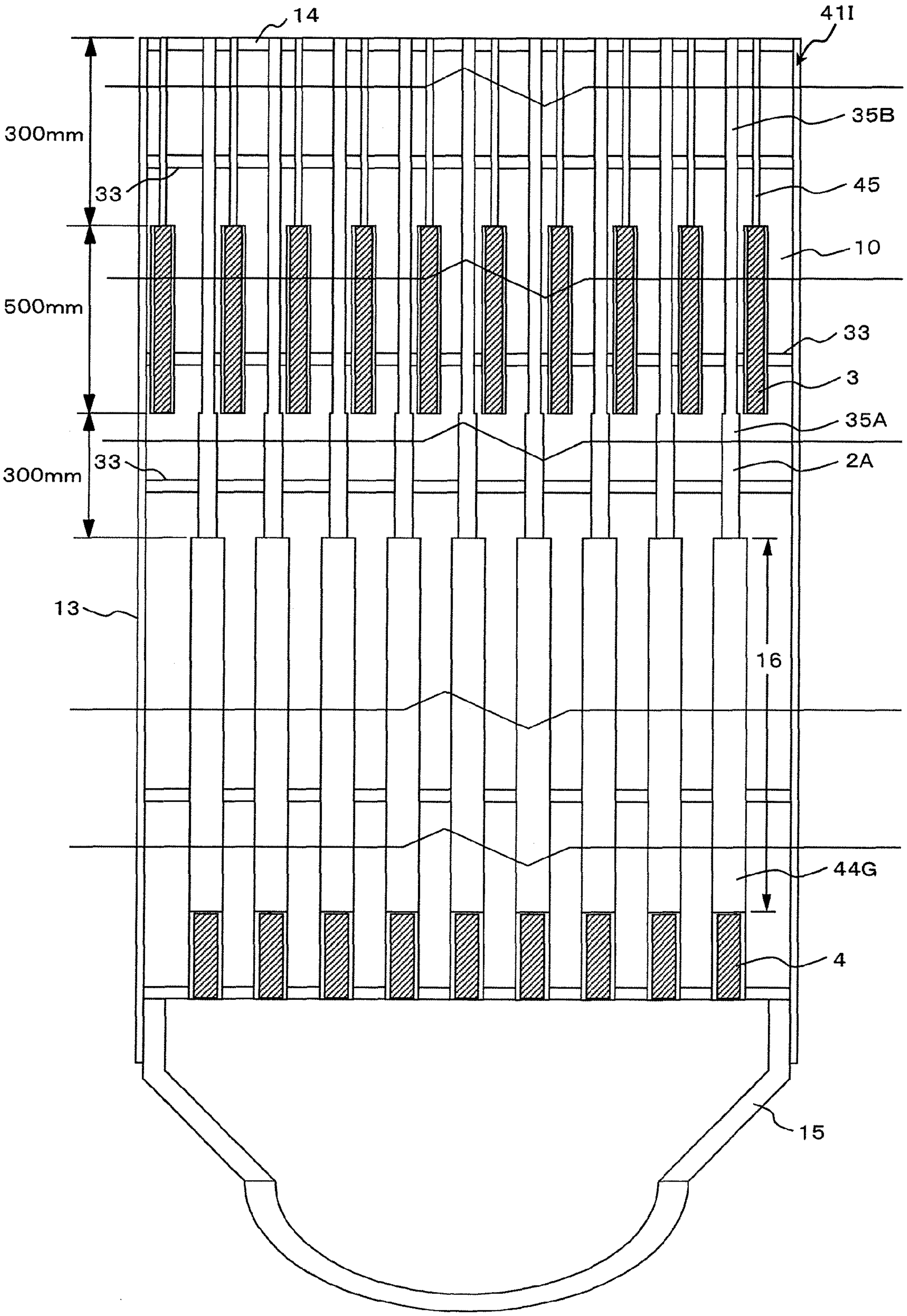
FIG. 28 is a longitudinal sectional view showing a fuel assembly loaded in a core of a light water reactor according to embodiment 3 which is another embodiment of the present invention.

A core of a light water reactor according to embodiment 3 which is another embodiment of the present invention will be explained below by referring to FIG. 28. The core of the light water reactor of the present embodiment has the aforementioned core structure of (1), (2), and (3) similarly to the core 20 of embodiment 1.

The core of the present embodiment has a structure that in the core 20 of embodiment 1, the fuel assembly 41 is exchanged with a fuel assembly 41I. Other structure of the core of the present embodiment is the same as that of the core 20. The fuel assembly 41I has a structure that in the fuel assembly 41, the fuel rods 44 are exchanged with fuel rods 44G. Other structure of the fuel assembly 41I is the same as that of the fuel assembly 41.

Each of the fuel rods 44G included in the fuel assembly 41I has a structure that the plenum 2 of the fuel rod 44 is exchanged with a plenum 2A. The fuel rod 44G has the plenum 2A, and the nuclear fuel material zone 16 and the neutron absorbing material filling zone 4 similar to that of the fuel rod 44. The plenum 2A is disposed above the nuclear fuel material zone 16 and the neutron absorbing material filling zone 4 is disposed under the nuclear fuel material zone 16. The outside diameters of the respective portions of the fuel rod 44G in the nuclear fuel material zone 16 and the neutron absorbing material filling zone 4 are 10.1 mm. The rate of the cross sectional area of the fuel pellets occupying in the cross section area of the unit fuel rod lattice in the channel box 13 is 53%.

The plenum 2A has a first zone 35A and a second zone 35B. An outside diameter of the portion of the plenum 2A in the first zone 35A is 4.8 mm and an outside diameter of the portion of the plenum 2A in the second zone 35B is 4.4 mm. The outside diameter of the portion in the first zone 35A is larger than the outside diameter of the portion in the second zone 35B. The first zone 35A is a large diameter portion and the second zone 35B is a small diameter portion. The second zone 35B is positioned above the first zone 35A. A length of the first zone 35A is 300 mm and an upper end of the first zone 35A is positioned at a position (the lower end of the neutron absorbing member 3) 300 mm upward away from the upper end of the nuclear fuel material zone 16. A lower end of the second zone 35B is disposed at the same position as that of the upper end of the first zone 35A.

Each of the neutron absorbing members 3 is disposed between the mutual second zones 35B which are the small diameter portion of the neighboring fuel rods 44G. The outside diameter of the neutron absorbing member 3 is larger than the outside diameter (6 mm) of the neutron absorbing members 3 used in embodiment 1 such as 7.4 mm. The rate of the total cross sectional area of all the neutron absorbing members 3 to the cross sectional area of the fuel assembly lattice is 26.7%.

The core of the light water reactor of the present embodiment meets all the restrictive conditions and can maintain the breeding ratio 1.01. Furthermore, in the present embodiment, even if it is assumed that the overall core becomes the state of 100% void, which is impossible as an initiating event in the ABWR, the positive reactivity is not inserted to the nuclear fuel material zone 12. Particularly, in the present embodiment, even when the overall core enters the state of 100% void, the reactivity inserted to the core in the present embodiment becomes negative more than the reactivity inserted at that time in embodiment 1 because the outside diameter of the neutron absorbing member 3 is larger than the outside diameter of the neutron absorbing members 3 in embodiment 1.

Furthermore, the present embodiment can obtain the effects occurred in embodiment 1. The present embodiment has the core structures of (2) and (3), so that the soundness of the fuel rods is increased and the thermal margin is increased. Accordingly, the present embodiment can improve more the safety margin without impairing the economical efficiency of fuel of the light water reactor.

Embodiment 4

Figure 29:
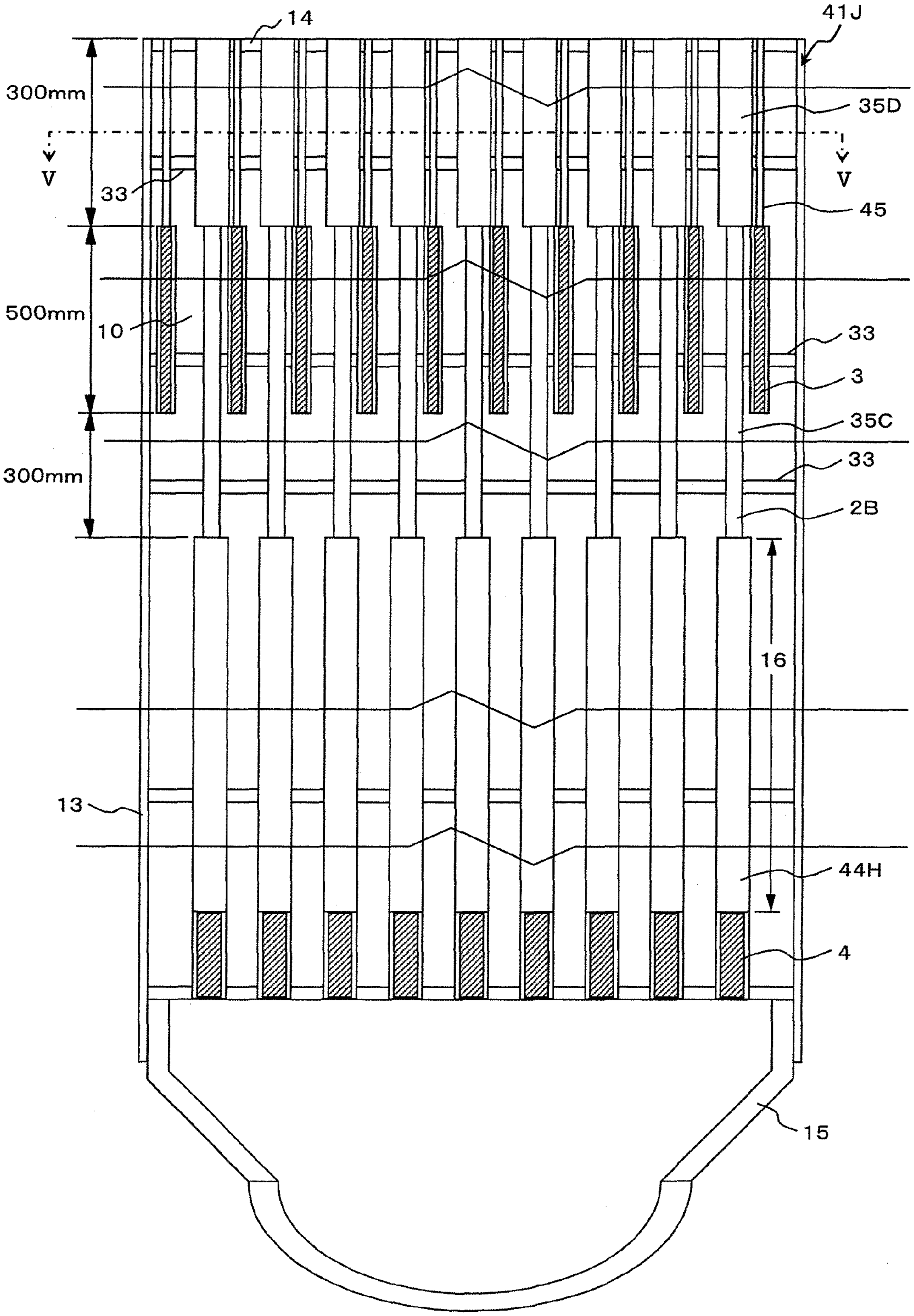
FIG. 29 is a longitudinal sectional view showing a fuel assembly loaded in a core of a light water reactor according to embodiment 4 which is another embodiment of the present invention.
Figure 30:
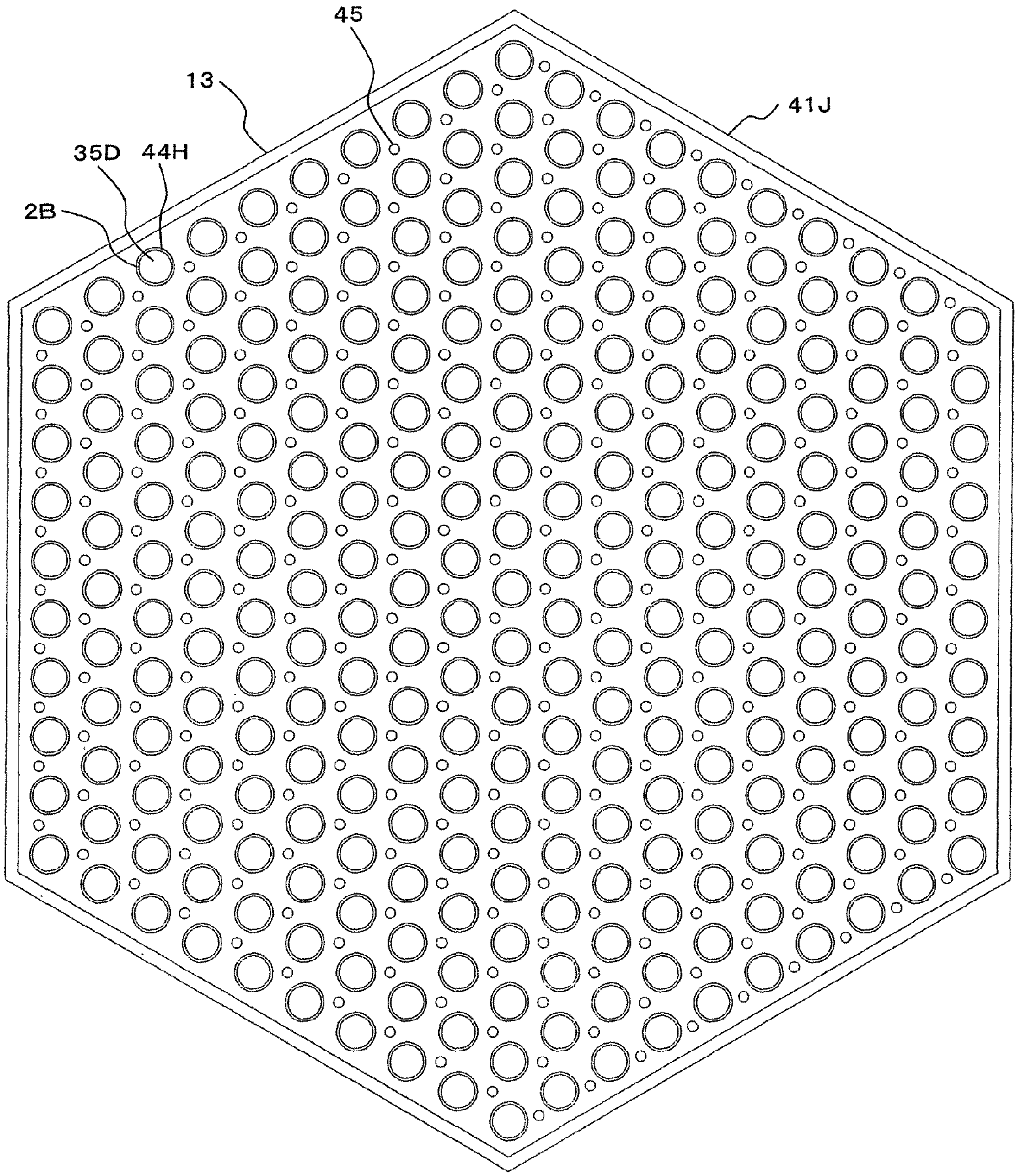
FIG. 30 is a sectional view taken along a line V-V of FIG. 29.

A core of the light water reactor according to embodiment 4 which is a further embodiment of the present invention will be explained below by referring to FIGS. 29 and 30. The core of the light water reactor of the present embodiment has the aforementioned core structures of (1) and (3) similarly to the core 20 of embodiment 1.

The core of the present embodiment has a structure that in the core 20 of embodiment 1, the fuel assembly 41 is exchanged with a fuel assembly 41J. Other structure of the core of the present embodiment is the same as that of the core 20. The fuel assembly 41J has a structure that in the fuel assembly 41, the fuel rods 44 are exchanged with fuel rods 44H. Other structure of the fuel assembly 41J is the same as that of the fuel assembly 41.

Each of the fuel rods 44H included in the fuel assembly 41J has a structure that the plenum 2 of the fuel rod 44 is exchanged with a plenum 2B. The fuel rod 44H has the plenum 2B, and the nuclear fuel material zone 16 and the neutron absorbing material filling zone 4 similar to that of the fuel rod 44. The plenum 2B is disposed above the nuclear fuel material zone 16 and the neutron absorbing material filling zone 4 is disposed under the nuclear fuel material zone 16. Outside diameters of the respective portions of the fuel rod 44H in the nuclear fuel material zone 16 and the neutron absorbing material filling zone 4 are 10.1 mm. The rate of the cross sectional area of the fuel pellet occupying in the cross section area of the unit fuel rod lattice in the channel box is 53%. The plenum 2B has a first zone 35C and a second zone 35D. An outside diameter of the portion of the plenum 2B in the first zone 35C is 5.8 mm and an outside diameter of the portion of the plenum 2B in the second zone 35D is 7.4 mm. The outside diameter of the portion in the second zone 35D is larger than the outside diameter of the portion in the first zone 35C. The first zone 35C is a small diameter portion and the second zone 35D is a large diameter portion. The second zone 35D is positioned above the first zone 35C. A length of the first zone 35C is 800 mm and a length of the second zone 35D is 300 mm. The lower end of the second zone 35D is positioned at a position (the upper end of the neutron absorbing member 3) 800 mm upward away from the upper end of the nuclear fuel material zone 16 and is positioned at the same position as that of the upper end of the first zone 35C.

Each of the neutron absorbing members 3 with an outside diameter of 6 mm is disclosed between the mutual first zones 35C which are the small diameter portion of the neighboring fuel rods 44H.

The core of the light water reactor of the present embodiment meets all the restrictive conditions and can maintain the breeding ratio 1.01. In the present embodiment, the volume of the plenum 2B is larger than that of the plenum 2 of embodiment 1 because the second zone 35D of the plenum 2B existing above the upper end of the neutron absorbing member 3 is a larger diameter portion. Thus, the pressure in the fuel rod 44H is lowered more and the soundness of the fuel rods 44H used in the present embodiment is increased more than that of the fuel rods 44H used in embodiment 1.

The present embodiment can obtain the effects occurred in embodiment 1. The present embodiment has the core structures of (1) and (3), so that even if the overall core becomes the state of 100% void, the insertion of positive reactivity to the core can be avoided, and the thermal margin is increased. Accordingly, the present embodiment can improve more the safety margin without impairing the economical efficiency of fuel of the light water reactor.

Embodiment 5

Figure 31:
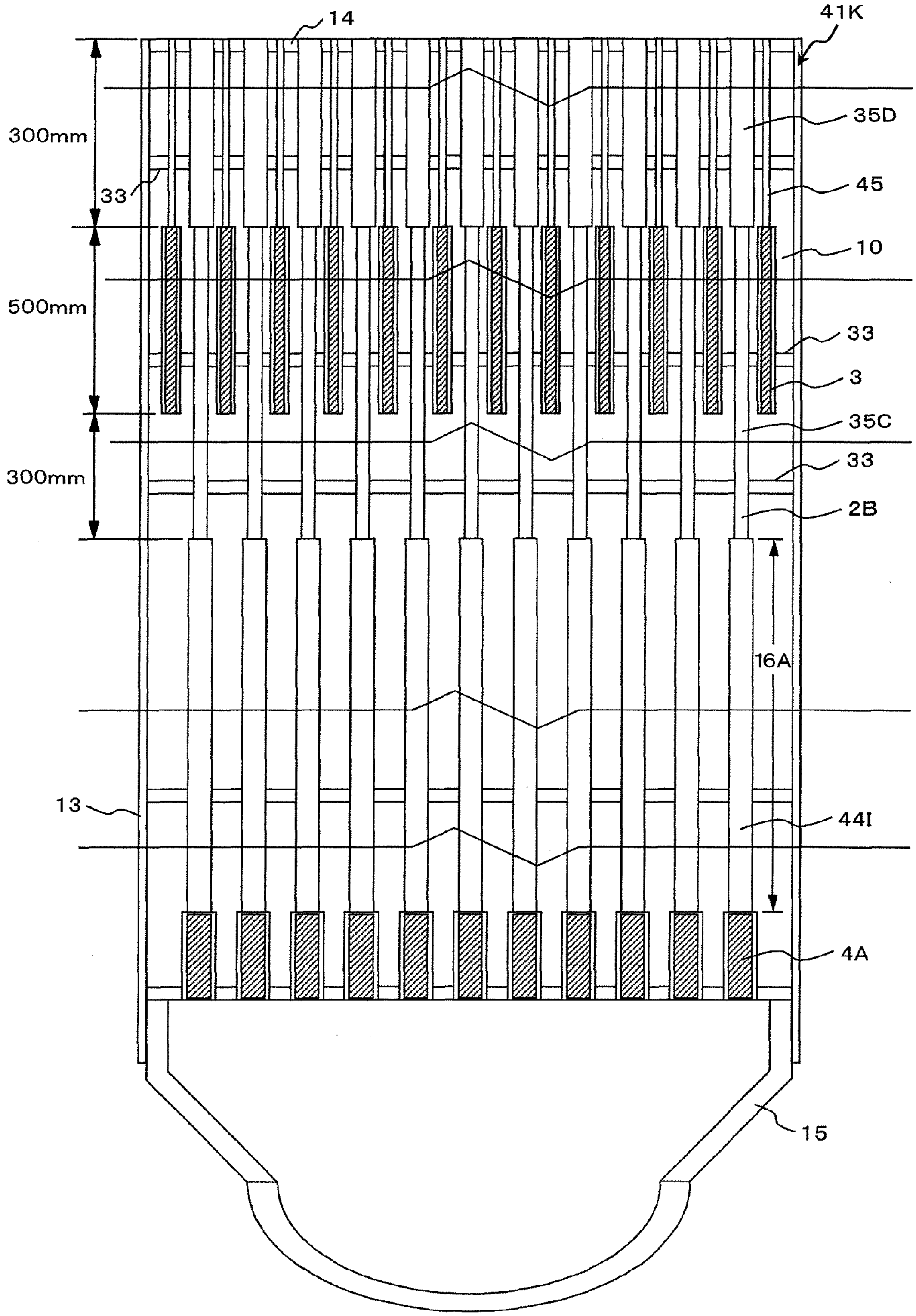
FIG. 31 is a longitudinal sectional view showing a fuel assembly loaded in a core of a light water reactor according to embodiment 5 which is another embodiment of the present invention.

A core of a light water reactor according to embodiment 5 which is another embodiment of the present invention will be explained below by referring to FIG. 31 and Table 2. The core of the light water reactor of the present embodiment has the aforementioned core structures of (1) and (3). The light water reactor to which the core of the light water reactor of the present embodiment is applied is a TRU burner reactor.

The core of the light water reactor of the present embodiment has a structure that in the core 20A of embodiment 2, the fuel assembly 41H is exchanged with a fuel assembly 41K. Other structure of the core of the present embodiment is the same as that of the core 20A. The fuel assembly 41K has a structure that in the fuel assembly 41H, the fuel rods 44F are exchanged with the fuel rods 44I. Other structure of the fuel assembly 41K is the same as that of the fuel assembly 41H. The rate of the cross sectional area of the fuel pellet occupying in the cross section area of the unit fuel rod lattice in the channel box is 36%.

Each of the fuel rods 44I included in the fuel assembly 41K has a structure that the plenum 2 of the fuel rod 44F is exchanged with the plenum 2B. The fuel rod 44J has the plenum 2B, and the nuclear fuel material zone 16 and the neutron absorbing material filling zone 4A similar to that of the fuel rod 44. The plenum 2B having the first zone 35C and second zone 35D in embodiment 4 is disposed above the nuclear fuel material zone 16 and the neutron absorbing material filling zone 4A is disposed under the nuclear fuel material zone 16. The outside diameter of the portion of the plenum 2B in the first zone 35C is 3.7 mm and the outside diameter of the portion of the plenum 2B in the second zone 35D is 5.6 mm. The outside diameter of the portion in the second zone 35D is larger than the outside diameter of the portion in the first zone 35C. The second zone 35D is positioned above the first zone 35C. The lower end of the second zone 35D is positioned at a position (the upper end of the neutron absorbing member 3) 800 mm upward away from the upper end of the nuclear fuel material zone 16 and is positioned at the same position as that of the upper end of the first zone 35C.

Each of the neutron absorbing members 3 with an outside diameter of 8.1 mm is disposed between the mutual first zones 35C which are the small diameter portion of the neighboring fuel rods 44I.

The core of the light water reactor of the present embodiment meets all the restrictive conditions and can maintain the breeding ratio 1.01. In the present embodiment, the volume of the plenum 2B becomes larger than the volume of the plenum 2 used in embodiment 2 because the plenum 2B existing above the upper end of the neutron absorbing member 3 has the second zone 35D. Therefore, the pressure in the fuel rod 44I can be lowered and the soundness of the fuel rods 44I used in the present embodiment is increased more than that of the fuel rods 44F used in embodiment 2.

The present embodiment can obtain the effects occurred in embodiment 2. The present embodiment has the core structures of (1) and (3), so that even if the overall core becomes the state of 100% void, the insertion of positive reactivity to the core can be avoided, and the thermal margin is increased. Accordingly, the present embodiment can improve more the safety margin without impairing the economical efficiency of fuel of the light water reactor.

Embodiment 6

Figure 32:
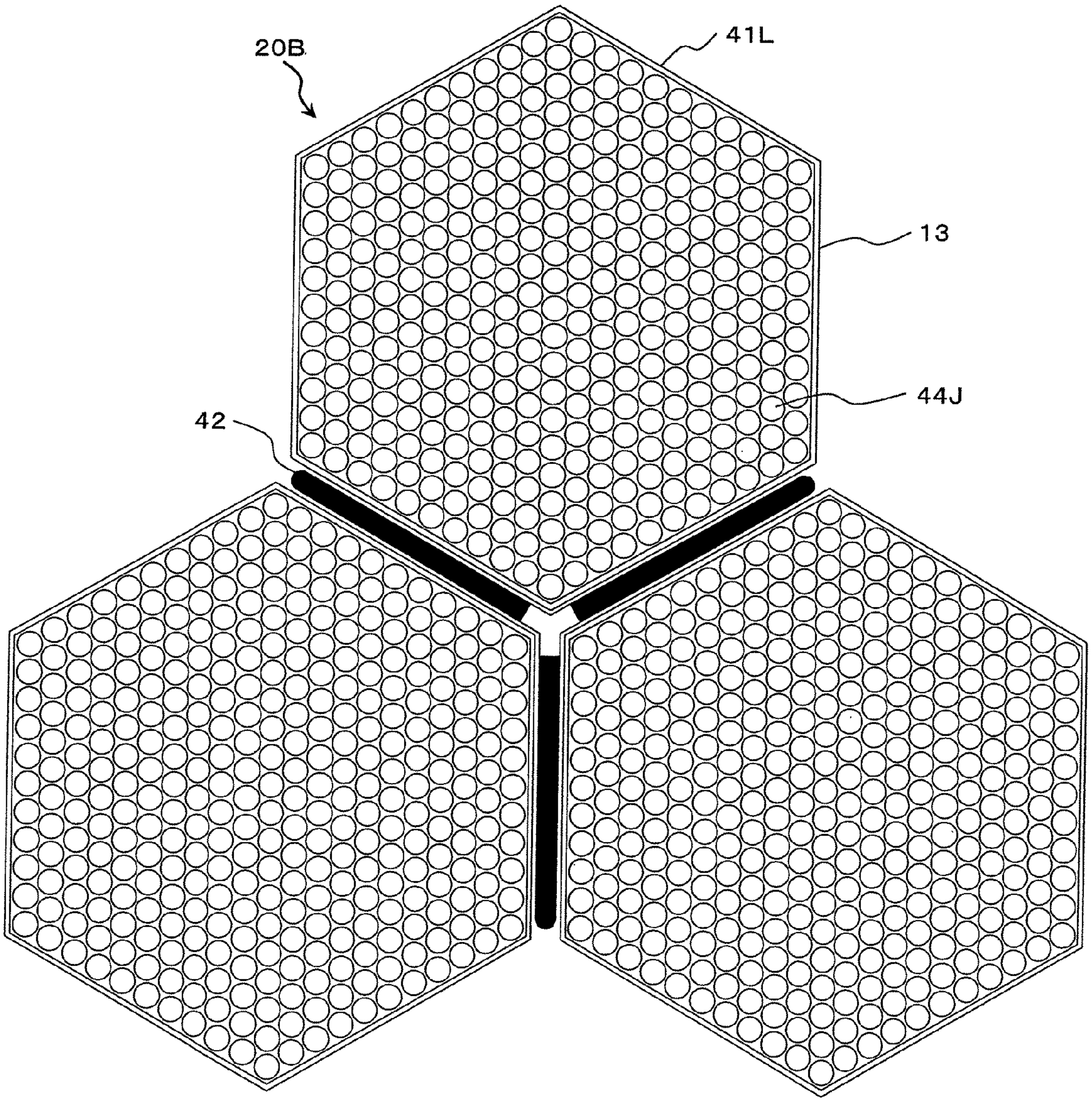
FIG. 32 is a cross sectional view of a fuel assembly lattice in a core of a light water reactor according to embodiment 6 which is another embodiment of the present invention.
Figure 33:
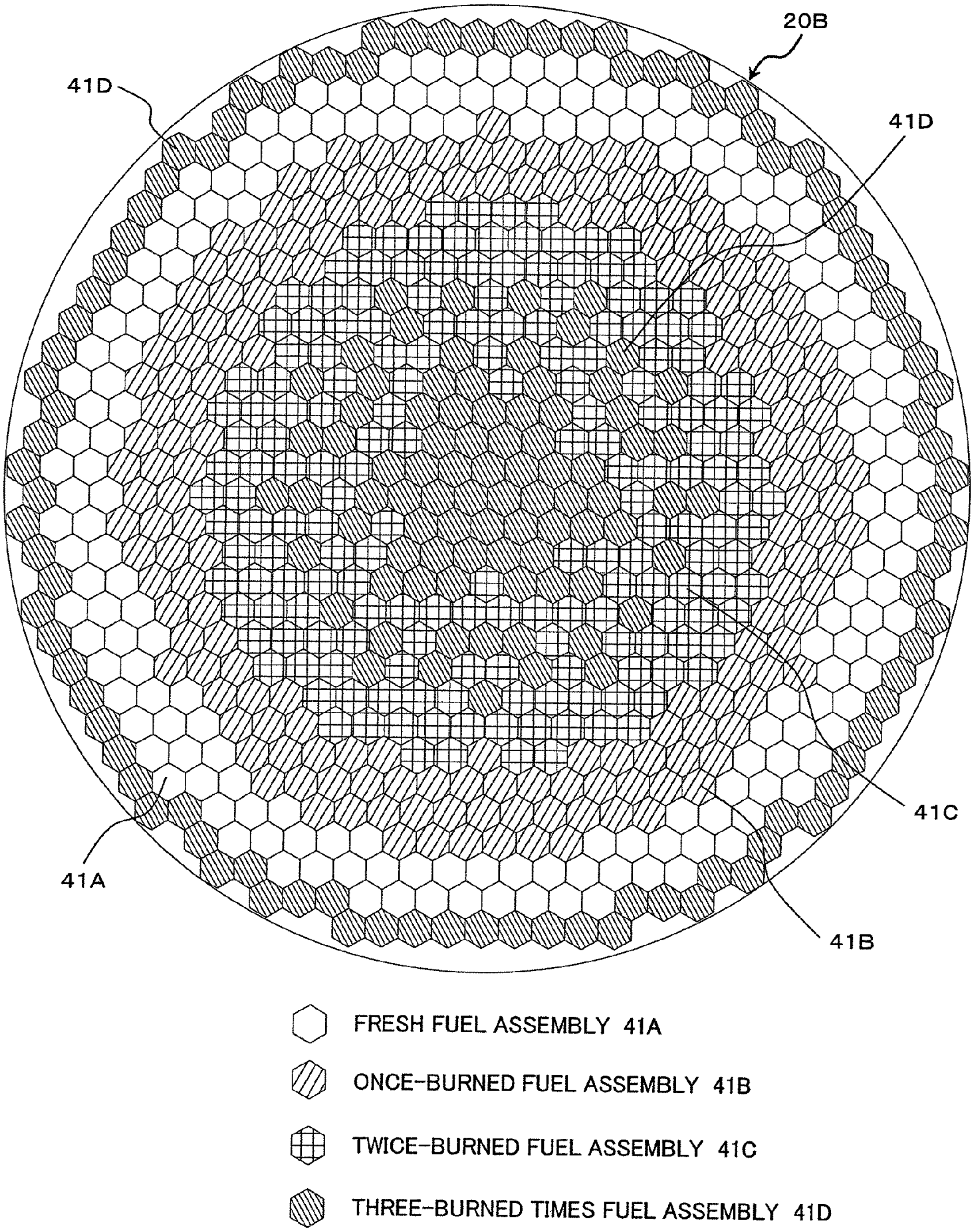
FIG. 33 is an explanatory drawing showing an arrangement of fuel assemblies in an equilibrium core state of a core of a light water reactor according to embodiment 6.
Figure 34:
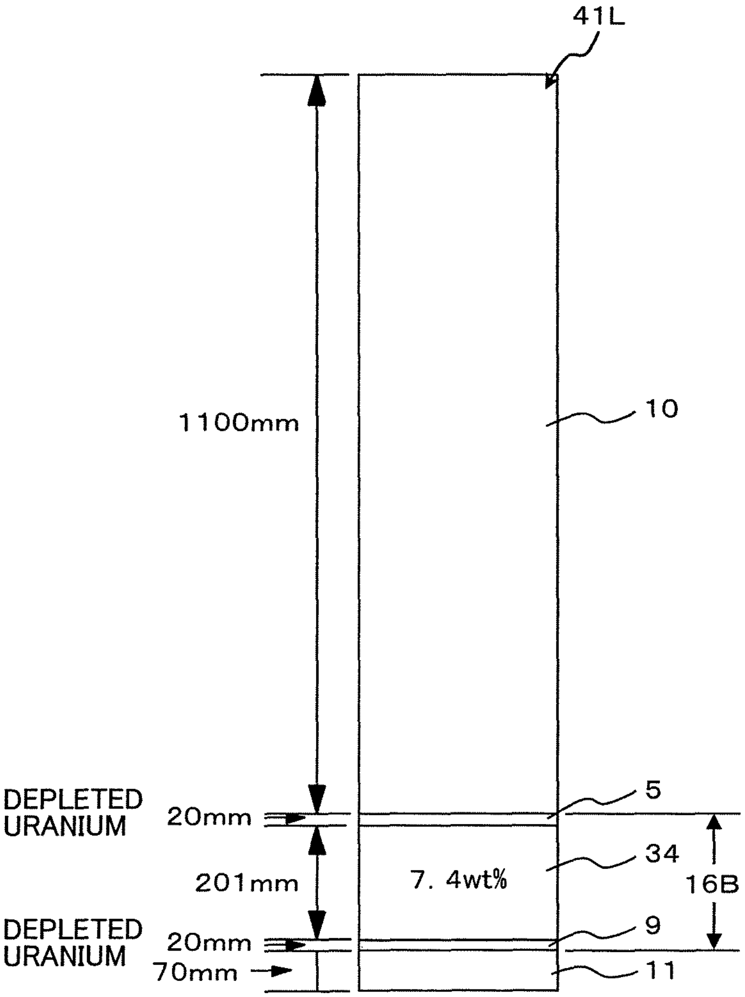
FIG. 34 is an explanatory drawing showing a height of each zone of a fresh fuel assembly loaded in an equilibrium core shown in FIG. 33 in an axial direction and an enrichment distribution of fissionable Pu in a fissile zone of the fresh fuel assembly.

A core of a light water reactor according to embodiment 6 which is another embodiment of the present invention will be explained below by referring to FIGS. 32 to 34 and Table 3. The core 20B of the light water reactor of the present embodiment has the aforementioned core structures of (1) and (2). The light water reactor to which the core of the light water reactor of the present embodiment is applied is a TRU burner reactor.

TABLE 3

| Nuclide | Composition (wt %) |
|---|---|
| Np-237 | 0.2 |
| Pu-238 | 4.2 |
| Pu-239 | 4.0 |
| Pu-240 | 37.7 |
| Pu-241 | 3.4 |
| Pu-242 | 33.0 |
| Am-241 | 4.3 |

TABLE 3-continued

| Nuclide | Composition (wt %) |
|---|---|
| Am-242M | 0.2 |
| Am-243 | 5.7 |
| Cm-244 | 4.4 |
| Cm-245 | 1.3 |
| Cm-246 | 1.1 |
| Cm-247 | 0.2 |
| Cm-248 | 0.3 |

The core 20B of the present embodiment has a structure that in the core 20A of embodiment 2, the fuel assembly 41H is exchanged with a fuel assembly 41L. Other structure of the core 20B of the present embodiment is the same as that of the core 20A. The fuel assembly 41L has a structure that in the fuel assembly 41L, the fuel rods 44F are exchanged with the fuel rods 44J. Other structure of the fuel assembly 41L is the same as that of the fuel assembly 41H. The shape of the longitudinal section of the fuel assembly 41L is the same as the shape of the longitudinal section, shown in FIG. 25, of the fuel assembly 41H.

The core 20B of the present embodiment is a one fissile zone core of electric power of 450 MW and is a core applied to the TRU burner reactor. The fuel assembly 41L loaded in the core 20B has 331 fuel rods 44J with an outside diameter of 8.7 mm arranged in an equilateral triangle lattice in the channel box 13. The gap between the mutual fuel rods 44J is 1.6 mm and a fuel rod row in the outermost layer includes ten fuel rods 44. The rate of the cross sectional area of the fuel pellet occupying in the cross section area of the unit fuel rod lattice in the channel box is 46%. In the core 20B the fuel assemblies 41A to 41D different in the experienced operation cycle number are disposed as shown in FIG. 33 in the state of the equilibrium core. The fuel assemblies 41D, the operation cycle of which is the fourth cycle, are disposed in the core outermost layer region 46. The fuel assemblies 41A, the operation cycle of which is the first cycle, are disposed in the core outer region 48 and the fuel assemblies 41B, 41C, and 41D, the operation cycles of which are respectively the second cycle, third cycle and fourth cycle, are respectively scattered and disposed in the core inner region 50. There exists an intermediate zone, in which a plurality of fuel assemblies 41B are disposed circularly, between the core inner region 50 and the core outer region 48. The power distribution of such a core 20B in the radial direction is flattened more. The fuel assemblies 41A to 41D shown in FIG. 33 are respectively the fuel assembly 41L.

The nuclear fuel material zone 16B wherein the nuclear fuel material of the fuel assembly 41L exists (refer to FIG. 34) has the upper blanket zone 5, a fissile zone 34, and the lower blanket zone 9. The upper reflector zone 10 exists above the upper end of the upper blanket zone 5 and the lower reflector zone 11 exists below the lower end of the lower blanket zone 9. The height of the upper blanket zone 5 is 20 mm, and the height of the fissile zone 34 is 201 mm, and the height of the lower fissile zone 9 is 20 mm. Besides, the height of the upper reflector zone 10 is 1100 mm and the height of the lower reflector zone 11 is 70 mm.

Although not shown, the nuclear fuel material zone 12 of the core 20B includes the upper blanket zone 5A, fissile zone 34A, and lower blanket zone 9A having the same heights as the respective heights of the upper blanket zone 5, fissile zone 34, and lower blanket zone 9. The upper blanket zone 5A, fissile zone 34A, and lower blanket zone 9A are disposed in this order in the axial direction of the core 20B.

The outside diameter of the portion of the plenum 2 of the fuel rod 44J is 4.2 mm and the outside diameter of the neutron absorbing members 3 is 6.7 mm. The outside diameter of the portion of the neutron absorbing material filling zone 4A of the fuel rod 44J is 9.0 mm. The rate of the total cross sectional area of all the neutron absorbing members 3 to the cross sectional area of the fuel assembly lattice is 26.0%. The rate of the total cross sectional area of all the neutron absorbing material filling zone 4A to the cross sectional area of the fuel assembly lattice is 46.7%.

When the burnup of the fuel assembly 41L is 0, all the fuel rods 44J (the fuel rods 44A to 44E shown in FIG. 19) of the fuel assembly 41L fill the upper blanket zone 5 and the lower blanket zone 9 with depleted uranium and fill the fissile zone 34 with TRU oxide fuel including TRUs of the composition shown in Table 3 in the state of a burnup of 0. The enrichment of fissionable Pu of the TRU oxide fuel is 7.4 wt % and the rate of Pu-239 in the TRU is 4.0 wt %. The TRUs included in the fuel assembly 41L are obtained by reprocessing the spent nuclear fuel included in the spent fuel assembly. Each blanket zone is not filled with the mixed oxide fuel and does not include TRUs. Further, in each blanket zone, natural uranium or degraded uranium recovered from the spent fuel assembly may be used instead of depleted uranium.

During the operation of the light water reactor to which the core 20B of the present embodiment is applied, a sufficient quantity of the volatile fission product generated by the fission of the fissionable material in each of the fuel rods 44J can be stored in the plenum 2 with a length of 1100 mm. Therefore, the soundness of the fuel rods 44 is ensured.

According to the present embodiment, even if it is assumed that the overall core becomes the state of 100% void, which is an impossible event as an initiating event in the ABWR, the insertion of positive reactivity to the nuclear fuel material zone 12 can be avoided because a plurality of neutron absorbing members 3 with a length of 500 mm are disposed at the position 300 mm upward from the upper end of the nuclear fuel material zone 12 and a plurality of neutron absorbing material filling zones 4A are disposed downward from the lower end of the nuclear fuel material zone 12. When the state results, negative reactivity is inserted to the nuclear fuel material zone 12.

Furthermore, the present embodiment can obtain the effects occurred in embodiment 2. The present embodiment has the core structures of (1) and (2), so that it can improve more the safety margin without impairing the economical efficiency of fuel of the light water reactor.

In the core 20B of the present embodiment, when the electric power of 450 MW is generated by using the reactor pressure vessel 27 of almost the same size as that of the current ABWR, the discharge burnup becomes 75 GWd/t, and the void coefficient becomes $-3\times10^{-5}\Delta k/k/\%$ void, and the MCPR becomes 1.3. In the core 20B, while the keeping of the rate of the TRU isotopes is realized, the weight of the TRUs obtained by reprocessing the spent nuclear fuel in the spent fuel assembly after 3 years from takeout of the fuel assembly 41L from the core 20B as a spent fuel assembly reduces a weight of 7.4% from the TRU weight of the fresh fuel assembly 41L loaded in the core. In addition, during the period from when the fuel assembly 41L is loaded in the core 20B to takeout, the TRU fission efficiency which is a rate of the TRU fission weight occupying in all the fission weights of the nuclear fuel material in the fuel assembly 41L is 80%.

Embodiment 7

A core of a light water reactor according to embodiment 7 which is another embodiment of the present invention will be explained below by referring to FIGS. 10, 35, and 36 and Table 4. A core 20C of the light water reactor of the present embodiment has the core structure of (4). The core 20C of the light water reactor of the present embodiment is a core of the ABWR in which the electric power is 1350 MW and 872 fuel assemblies 41M are loaded. A plurality of control rods 47 with a cross-shaped cross section are inserted into the core 20C and withdrawn from the core 200 to control the reactor power.

TABLE 4

| Nuclide | A | B | C | D | E | F | G | H | Taken-out fuel |
|---|---|---|---|---|---|---|---|---|---|
| TRU weight (t) | 1.51 | 1.20 | 1.04 | 0.93 | 0.86 | 0.79 | 0.70 | 0.70 | 0.67 |
| Np-237 | 6.66 | 5.00 | 3.93 | 3.24 | 2.70 | 2.31 | 2.00 | 1.82 | 1.63 |
| Pu-238 | 2.76 | 7.65 | 10.03 | 11.44 | 12.33 | 12.98 | 13.37 | 13.39 | 13.45 |
| Pu-239 | 48.81 | 31.47 | 24.85 | 21.21 | 18.48 | 16.53 | 14.94 | 13.70 | 12.47 |
| Pu-240 | 23.05 | 28.41 | 29.93 | 30.85 | 31.45 | 32.22 | 33.18 | 34.41 | 35.47 |
| Pu-241 | 6.95 | 9.50 | 8.66 | 7.60 | 6.68 | 5.90 | 5.12 | 4.18 | 3.66 |
| Pu-242 | 5.05 | 8.44 | 10.56 | 12.03 | 13.50 | 14.52 | 15.38 | 16.03 | 16.68 |
| Am-241 | 4.67 | 4.76 | 5.75 | 6.54 | 7.12 | 7.56 | 8.01 | 8.66 | 8.97 |
| Am-242M | 0.02 | 0.06 | 0.09 | 0.11 | 0.13 | 0.14 | 0.16 | 0.18 | 0.20 |
| Am-243 | 1.47 | 2.62 | 3.14 | 3.42 | 3.69 | 3.83 | 3.90 | 3.95 | 3.99 |
| Cm-243 | 0.01 | 0.02 | 0.02 | 0.02 | 0.02 | 0.02 | 0.02 | 0.01 | 0.01 |
| Cm-244 | 0.50 | 1.82 | 2.55 | 2.88 | 3.09 | 3.09 | 2.95 | 2.65 | 2.43 |
| Cm-245 | 0.04 | 0.21 | 0.40 | 0.52 | 0.61 | 0.65 | 0.68 | 0.70 | 0.70 |
| Cm-246 | 0.01 | 0.04 | 0.09 | 0.13 | 0.18 | 0.22 | 0.26 | 0.28 | 0.30 |
| Cm-247 | 0.00 | 0.00 | 0.00 | 0.01 | 0.02 | 0.02 | 0.02 | 0.03 | 0.03 |
| Cm-248 | 0.00 | 0.00 | 0.00 | 0.00 | 0.00 | 0.01 | 0.01 | 0.01 | 0.01 |

One fuel assembly 41M has 74 fuel rods and a cross section of the fuel assembly 41M is a square. In the fuel assembly 41M, as shown in FIG. 36, the 74 fuel rods with an outside diameter of 11.2 mm are arranged in the cylindrical channel box 13A with a square cross section. These fuel rods 44K are arranged in a square lattice shape. Two water rods 39 are arranged in the central portion of the cross section of the fuel assembly 41M.

The height of the nuclear fuel material zone in which the nuclear fuel material of the core 20C is loaded is 3.71 mm. A plurality of fuel assemblies 41J loaded in the core 20C includes the fuel assemblies A, B, C, D, E, F, G, and H as shown in FIG. 10. These fuel assemblies fill TRUs different in the recycle frequency in the fuel rods 44K as a nuclear fuel material.

Concretely, each of the fuel rods 44K of the fuel assemble A with a burnup of 0 is filled with the TRUs (TRUs of a recycle frequency of 1) obtained by reprocessing the spent nuclear fuel of the spent fuel assembly taken out from the equilibrium core. Each of the fuel rods 44K of the fuel assemble B with a burnup of 0 is filled with the TRUs (TRUs of a recycle frequency of 2) obtained by reprocessing the spent nuclear fuel of the fuel assembly A which is a spent fuel assembly taken out from the equilibrium core. Each of the fuel rods 44K of the fuel assemble C with a burnup of 0 is filled with the TRUs (TRUs of a recycle frequency of 3) obtained by reprocessing the spent nuclear fuel of the fuel assembly B which is a spent fuel assembly taken out from the equilibrium core. Similarly, each of the fuel rods 44K of the fuel assemble D with a burnup of 0 is filled with the TRUs (TRUs of a recycle frequency of 4) obtained from the spent nuclear fuel of the fuel assembly C and each of the fuel rods 44K of the fuel assemble E with a burnup of 0 is filled with the TRUs (TRUs of a recycle frequency of 5) obtained from the spent nuclear fuel of the fuel assembly D. Each of the fuel rods 44K of the fuel assemble F with a burnup of 0 is filled with the TRUs (TRUs of a recycle frequency of 6) obtained from the spent nuclear fuel of the fuel assembly E, and each of the fuel rods 44K of the fuel assemble G with a burnup of 0 is filled with the TRUs (TRUs of a recycle frequency of 7) obtained from the spent nuclear fuel of the fuel assembly F, and each of the fuel rods 44K of the fuel assemble H with a burnup of 0 is filled with the TRUs (TRUs of a recycle frequency of 8) obtained from the spent nuclear fuel of the fuel assembly G. The TRUs (TRUs of a recycle frequency of 1) filled in each of the fuel rods 44K of the fuel assembly A are recovered from the spent nuclear fuel of the fuel assembly with slightly enriched uranium filled in the fuel rods which does not include TRUs when the burnup is 0. TRUs different in the recycle frequency are not mixed and are separately filled in the fuel rods of different fuel assemblies (for example, the fuel assemblies A, B, C, etc.).

In the core 20C, among the fuel assemblies A to H different in the recycle frequency of the TRUs, a plurality of fuel assemblies A including the TRUs having the least recycle frequency are disposed at the central part, and between the central part and the outermost layer zone of the core, the fuel assemblies including the TRUs having higher recycle frequencies are disposed on the side of the outermost layer zone of the core. Concretely, each fuel assembly of the fuel assemblies B, C, D, E, F, G, and H, in the alphabetic order, is disposed from the central part of the core where the fuel assemblies A are disposed toward the outermost layer zone.

The core 20C includes 100 fuel assemblies A1, 40 fuel assemblies B1, 24 fuel assemblies C1, 16 fuel assemblies D1, 12 fuel assemblies E1, 8 fuel assemblies F1, 4 fuel assemblies G1, and 4 fuel assemblies H1. These numbers of fuel assemblies are the numbers when the fuel assemblies A1, B1, C1, D1, E1, F1, G1, and H1 are in the state of a burnup of 0.

The fuel assemblies A to H loaded in the core 20C include fuel assemblies different in the in-core fuel dwelling time (the operation cycle number). The numerals 1, 2, 3, 4, and 5 attached after the alphabet (for example, A to H described next to the fuel assembly) for discriminating the fuel assembly including TRUs different in the recycle frequency indicate the in-core fuel dwelling time (the operation cycle number) of the concerned fuel assembly (for example, the fuel assembly A, the fuel assembly B, etc.). As the number increases, it means that the in-core fuel dwelling time is longer. The fuel assembly with "1" attached is a fuel assembly in the first cycle of the in-core fuel dwelling time and the fuel assembly with "5" attached is a fuel assembly in the fifth cycle of the in-core fuel dwelling time.

For example, the fuel assembly A1 is a fuel assembly that includes TRUs of a recycle frequency of 1 and that is experiencing the operation in the first operation cycle after loaded in the core 20C. The fuel assembly E5 is a fuel assembly that includes TRUs of a recycle frequency of 5 and that is experiencing the operation in the fifth operation cycle after loaded in the core 20C. The fuel assemblies A to C and a part of the fuel assembly D are taken out from the nuclear reactor as a spent fuel assembly after finishing of the operation in the fourth operation cycle after loaded in the core 20C. The rest of the fuel assembly D and the fuel assemblies F to H are taken out from the nuclear reactor as a spent fuel assembly after finishing of the operation in the fifth operation cycle after loaded in the core 20C.

In a plurality of fuel assemblies including TRUs of the same recycle frequency, the fuel assemblies different in the in-core fuel dwelling time are arranged in the neighborhood of each other. For example, in a certain fuel assembly A1, the fuel assemblies A4 are adjoined in right side and left side in FIG. 10 and the fuel assemblies A3 are adjoined up and down in FIG. 10.

Table 4 shows the weight of each of the TRUs of the fuel assemblies A to H and the fuel assembly taken out as a spent fuel assembly and the composition of each of the TRUs. A to H shown in Table 4 are equivalent to the fuel assemblies A to H. The fuel assembly taken out as a spent fuel assembly is, for example, the fuel assembly H5.

According to the core 20C of the present embodiment, when the void fraction of the core 20C is increased, the increase of the infinite neutron effective multiplication factor at the central part of the core 20C is made relatively smaller than the increase of the infinite neutron effective multiplication factor in the core outermost layer zone. Therefore, the shift of the power distribution to the central pat of the core is reduced (refer to FIG. 9). Thus, although the nuclear fuel assemblies H1 to H5 including the TRUs of a recycle frequency of eight are loaded in the core 20C, the discharge burnup of the fuel assembly H5 taken out from the core 20C as a spent fuel assembly becomes 45 GWd/t and the void coefficient of the core 20C becomes $-4\times10^{-4}$% Δk/% void. In the core 20C, the number of generated spent fuel assemblies can be reduced to 0.5% or less compared with the case that the TRUs are not recycled.

Though mixed oxide fuel of TRUs and depleted uranium is used as a nuclear fuel material in the fuel assemblies loaded in the core 20C of the present embodiment, natural uranium or degraded uranium recovered from spent fuel assemblies may be used instead of depleted uranium. Further, Pu extracted from the TRUs or several minor actinoid nuclides in the TRUs and Pu may be used instead of the TRUs.

Embodiment 8

A core of a light water reactor according embodiment 8 which is another embodiment of the present invention will be explained below by referring to FIGS. 37 and 38. The core of the light water reactor of the present embodiment has the aforementioned core structures of (1), (2), and (3) similarly to the core 20 of embodiment 1.

The core of the present embodiment has a structure that in the core 20 of embodiment 1, the fuel assembly 41 is exchanged with a fuel assembly 41N. Other structure of the core of the present embodiment is the same as that of the core 20. The fuel assembly 41N has a structure that in the fuel assembly 41, the fuel rods 44 are exchanged with the fuel rods 44L. Other structure of the fuel assembly 41N is the same as that of the fuel assembly 41.

Each of the fuel rods 44L included in the fuel assembly 41N has the plenum 2, nuclear fuel material zone 16, and neutron absorbing material filling zone 4 similarly to the fuel rods 44 included in the fuel assembly 41. The outside diameters of the respective portions of the fuel rod 44L in the plenum 2, nuclear fuel material zone 16, and neutron absorbing material filling zone 4 are the same as the outside diameters of the portions of the fuel rods 44.

Figure 37:
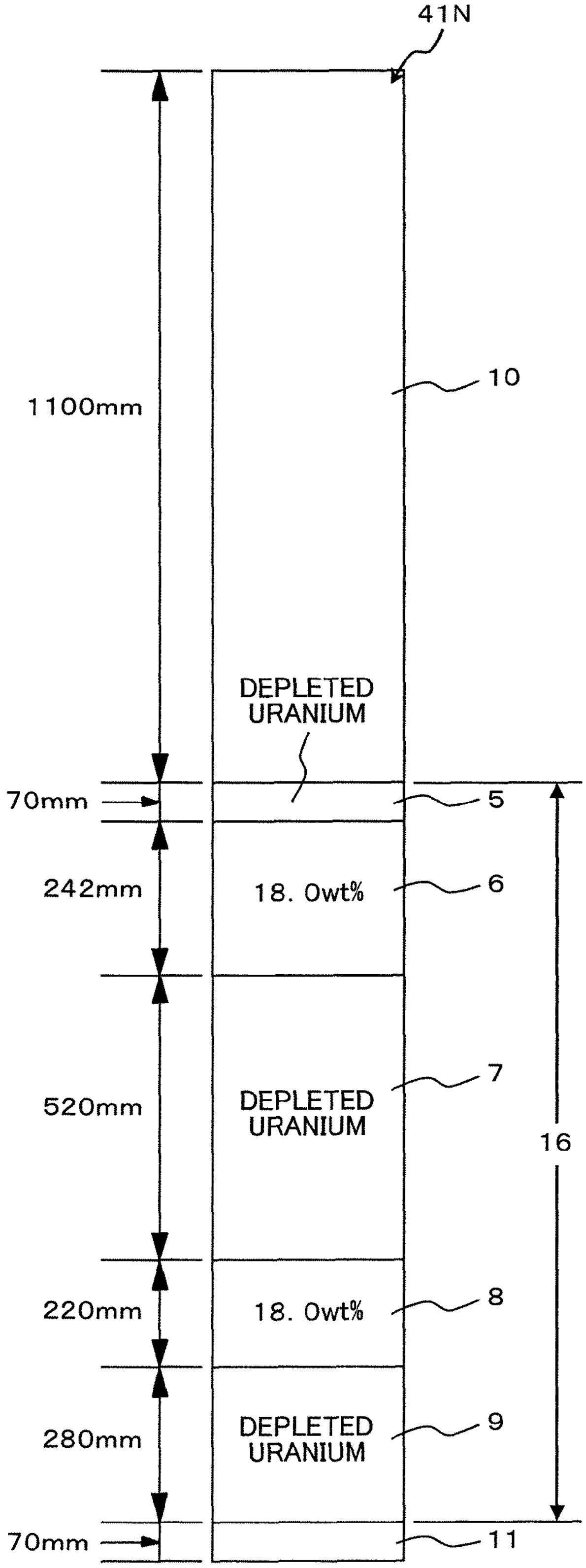
FIG. 37 is an explanatory drawing showing a height of each zone of a fresh fuel assembly loaded in an equilibrium core of a core of a light water reactor according to embodiment 8 which is another embodiment of the present invention, in an axial direction and an enrichment distribution of fissionable Pu in a fissile zone of the fresh fuel assembly.
Figure 38:
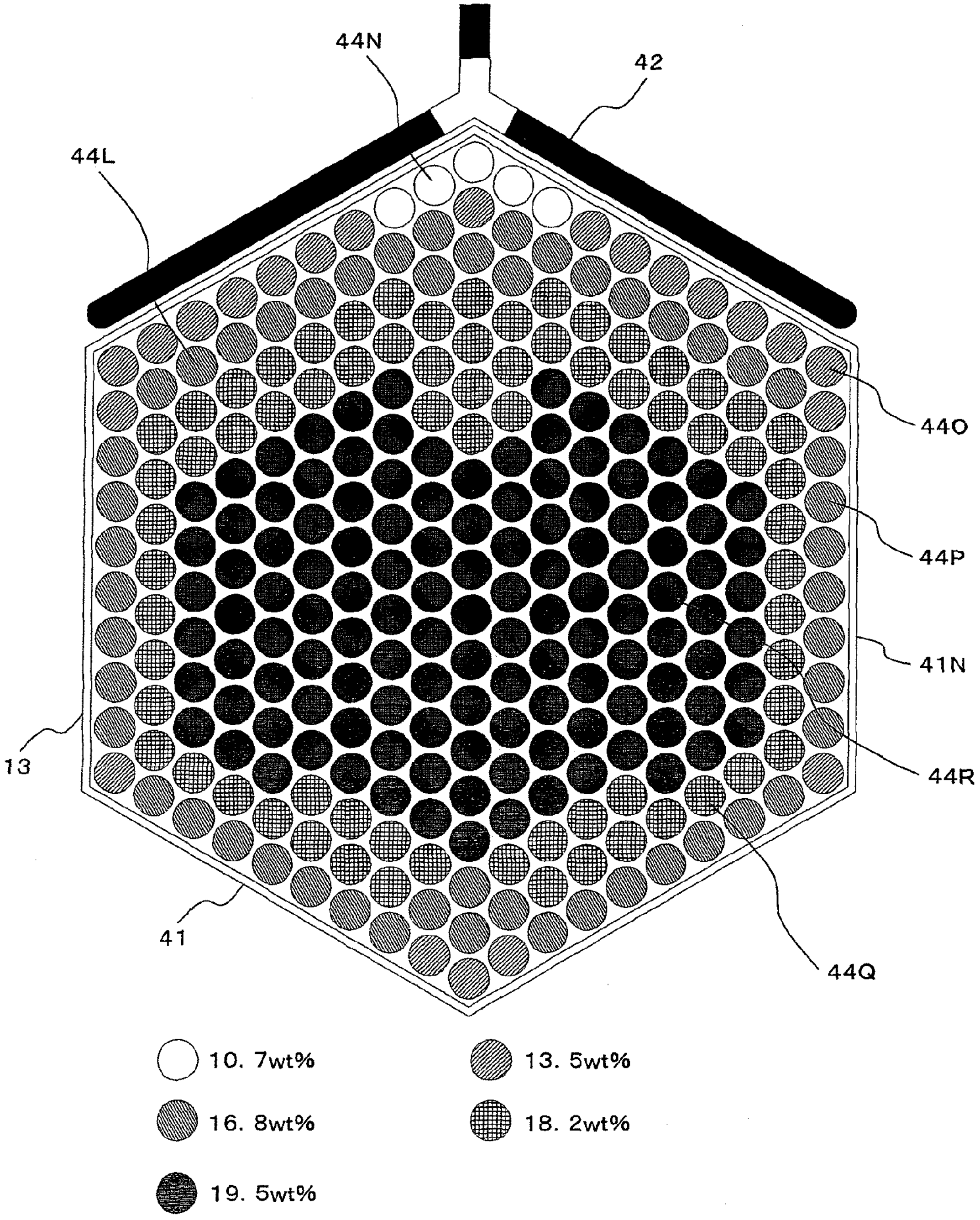
FIG. 38 is an explanatory drawing showing an enrichment distribution of fissionable Pu in each cross section of an upper fissile zone and a lower fissile zone of a fuel assembly shown in FIG. 37.

The nuclear fuel material zone 16 in which the nuclear fuel material of the fuel assembly 41N exists has the upper blanket zone 5, upper fissile zone 6, internal blanket zone 7, lower fissile zone 8, and lower blanket zone 9 as shown in FIG. 37. The upper reflector zone 10 exists above the upper end of the upper blanket zone 5 and the lower reflector zone 11 exists under the lower end of the lower blanket zone 9. The height of the upper blanket zone 5 is 70 mm, and the height of the upper fissile zone 6 is 242 mm, and the height of the internal blanket zone 7 is 520 mm, and the height of the lower fissile zone 8 is 220 mm, and the height of the lower blanket zone 9 is 280 mm. The total of the height of the lower fissile zone 8 and the height of the higher fissile zone 6 is 462 mm and the height of the higher fissile zone 6 is 1.10 times the height of the lower fissile zone 8. The height of the upper reflector zone 10 is 1100 mm and the height of the lower reflector zone 11 is 70 mm. In the present embodiment, the fuel pellets filled in the higher fissile zone 6 of the fuel rod 44L, different from other embodiments, are all hollow pellets. In the fuel rod 44L, all the fuel pellets filled respectively in the upper blanket zone 5, internal blanket zone 7, lower fissile zone 8, and lower blanket zone 9 other than the higher fissile zone 6 are solid pellets used in other embodiments.

When the burnup of the fuel assembly 41N is 0, all the fuel rods 44L of the fuel assembly 41N fill the three blanket zones with depleted uranium and fill the higher fissile zone 6 and lower fissile zone 8 with mixed oxide fuel. In the higher fissile zone 6 and lower fissile zone 8 of the fuel assembly 41N, assuming the TRU weight as 100, the enrichment of fissionable Pu with depleted uranium mixed at a rate of a weight of 173 are 18.0 wt % each. The TRUs are recovered from the spent nuclear fuel included in the fuel assembly 41N which is a spent fuel assembly by reprocessing. Each blanket zone is not filled with the mixed oxide fuel and does not include TRUs. Further, in each blanket zone, natural uranium or degraded uranium recovered from the spent fuel assembly may be used instead of depleted uranium.

Fuel rods 44N to 44R are used as fuel rods 44L arranged in the fuel assembly 41N. The fuel rods 44N to 44R are arranged in the channel box 13 as shown in FIG. 38. In the fuel assembly 41N with a burnup of 0, the enrichment of fissionable Pu respectively in the higher fissile zone 6 and lower fissile zone 8 are 10.7 wt % in the fuel rods 44N, 13.5 wt % in the fuel rods 44O, 16.8 wt % in the fuel rods 44P, 18.2 wt % in the fuel rods 44Q, and 19.5 wt % in the fuel rods 44R.

The present embodiment can obtain each effect occurred in embodiment 1. The present embodiment has the core structures of (1), (2), and (3), so that even when the overall core becomes the state of 100% void, positive reactivity is not inserted to the nuclear fuel material zone 12, and the soundness of the fuel rods is increased, and the thermal margin is increased. Accordingly, the present embodiment can improve more the safety margin without impairing the economical efficiency of fuel of the light water reactor.

The core of the present embodiment meets all the restrictive conditions and can maintain the breeding ratio 1.01. Furthermore, in the present embodiment, the enrichment of fissionable Pu are made equal to each other in the respective higher fissile zone 6 and lower fissile zone 8 of the fuel rods 44N to 44R of the fuel assembly 41N. Thus, in the present embodiment, the kind of the enrichment of fissionable Pu can be reduced from 9 kinds to 5 kinds compared with the fuel assembly 41N used in embodiment 1 different in the enrichment of fissionable Pu in the higher fissile zone 6 and lower fissile zone 8 and in correspondence to it, the kind of fuel pellets to be manufactured can be reduced.

Embodiment 9

Figure 39:
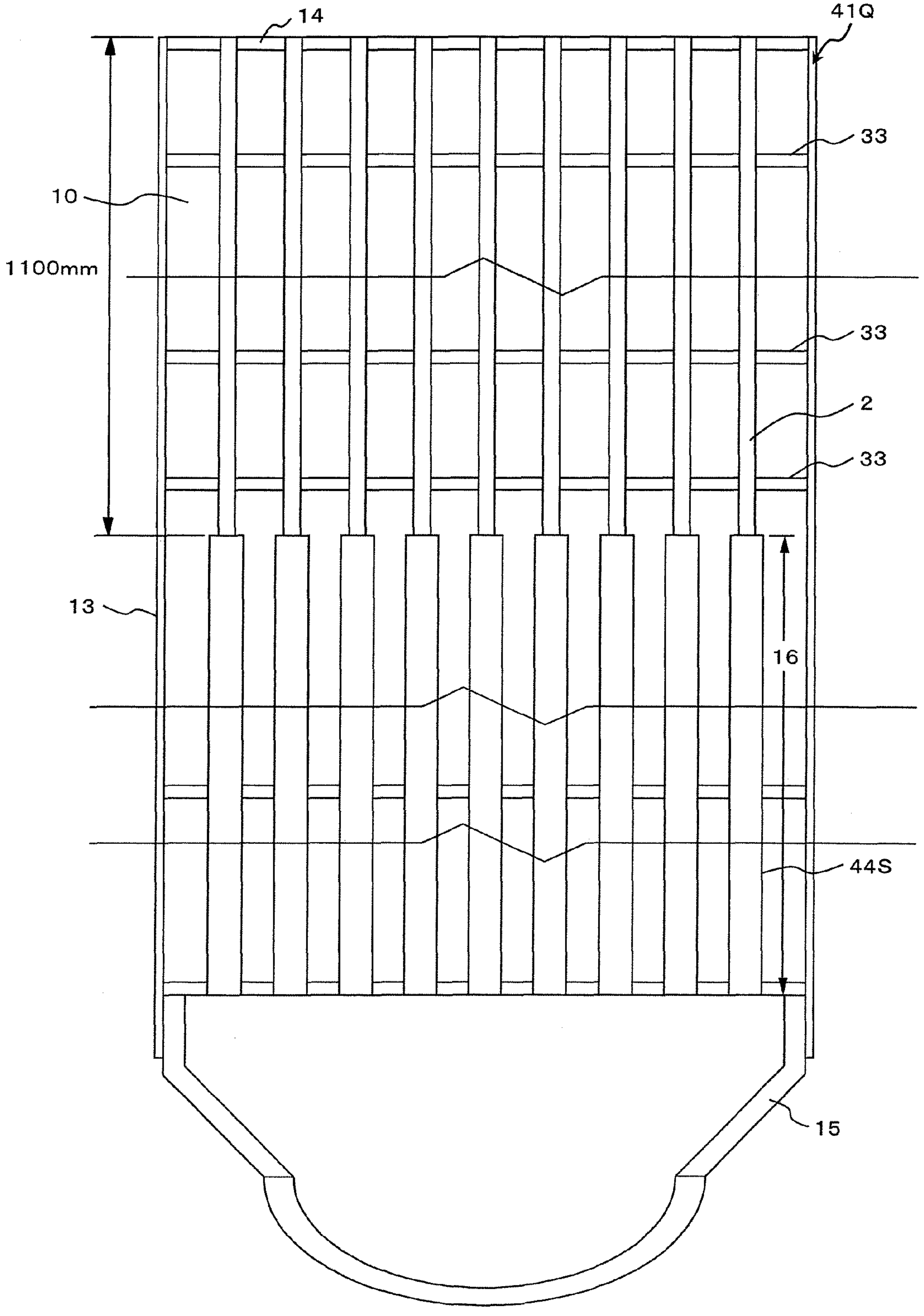
FIG. 39 is a longitudinal sectional view showing a fuel assembly loaded in a core of a light water reactor according to embodiment 9 which is another embodiment of the present invention.

A core of a light water reactor according to embodiment 9 which is another embodiment of the present invention will be explained below by referring to FIG. 39. The core of the light water reactor of the present embodiment has the aforementioned structure of (2).

The core of the present embodiment has a structure that in the core 20 of embodiment 1, the fuel assembly 41 is exchanged with a fuel assembly 41Q. Other structure of the core of the present embodiment is the same as that of the core 20. The fuel assembly 41Q has such a structure that the neutron absorbing members 3 and the neutron absorbing material zone 4 are removed in the fuel assembly 41. Other structure of the fuel assembly 41Q is the same as that of the fuel assembly 41. The fuel assembly 41Q has a plurality of fuel rods 44S. The fuel rods 44S have such a structure that the neutron absorbing material zone 4 is removed from the fuel rods 44.

In the present embodiment, the outside diameter of the portion of the plenum 2 of the fuel rods 44S is 5.8 mm and the length of the plenum 2 is 1100 mm. The outside diameter of the portion of the nuclear fuel material zone 16 of the fuel rods 44A is 10.1 mm. The rate of the cross sectional area of the fuel pellet occupying in the cross section area of the unit fuel rod lattice in the channel box is 53%.

Therefore, the soundness of the fuel rods can be increased because the volume of the plenum 2 is increased. Furthermore, even though the overall core becomes the state of 100% void, the reactivity inserted to the nuclear fuel material zone 12 becomes 1 dollar or less because the outside diameter of the portion of the plenum 2 formed in the fuel rods 44S is smaller than the outside diameter of the portion in the nuclear fuel material zone 16 under the plenum portion. Consequently, even though a composite event of a first accident beyond the design basis accident occurs, the fuel rods are automatically reduced in the power down to the coolable power at the flow rate of cooling water injected into the core by the operation of the high pressure core injection system, thus the safety margin of the BWR is kept. Accordingly the present embodiment can increase more the safety margin without impairing the economical efficiency of fuel of the light water reactor.

The core of the present embodiment meets all the restrictive conditions and can maintain the breeding ratio 1.01.

Embodiment 10

Figure 40:
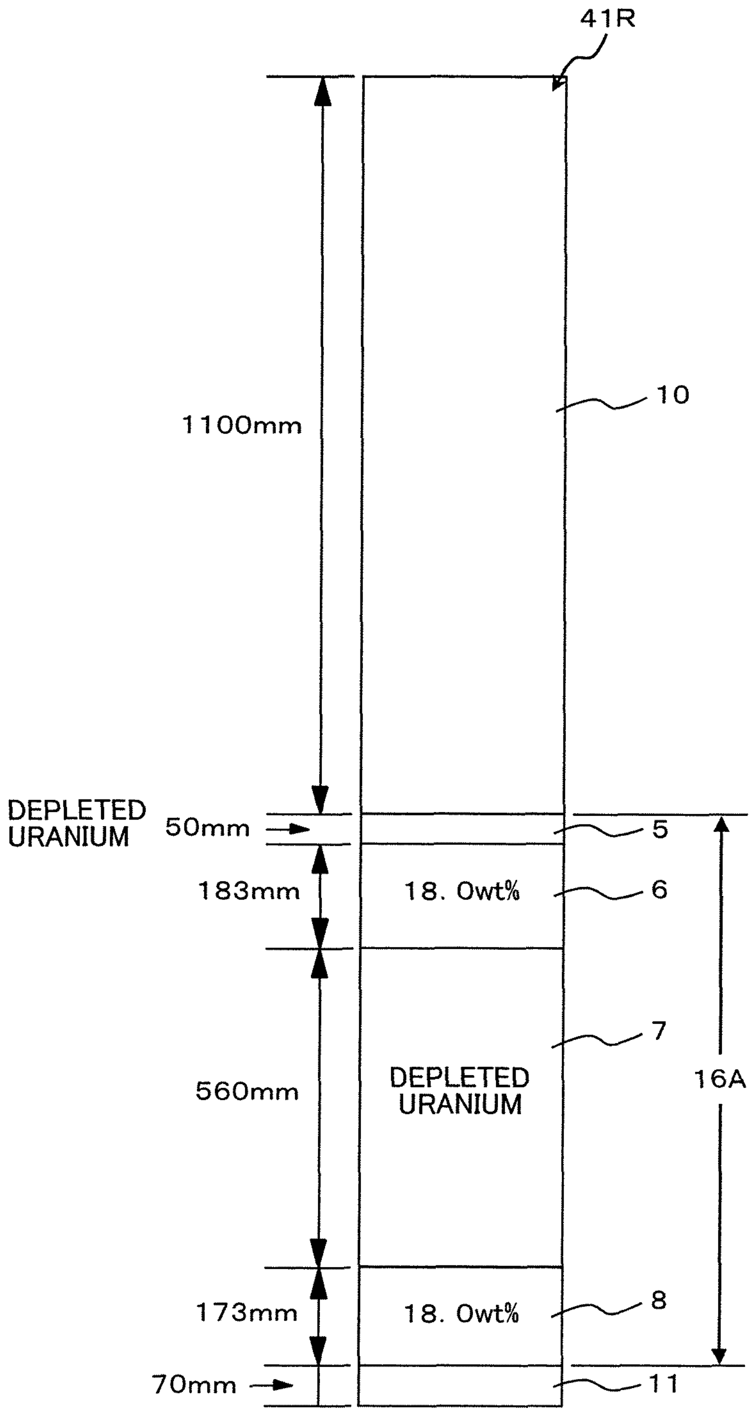
FIG. 40 is an explanatory drawing showing a height of each zone of a fresh fuel assembly loaded in an equilibrium core of a core of a light water reactor according to embodiment 10 which is another embodiment of the present invention, in an axial direction and an enrichment distribution of fissionable Pu in a fissile zone of the fresh fuel assembly.

A core of a light water reactor according to embodiment 10 which is another embodiment of the present invention will be explained below by referring to FIG. 40 and Table 5. The core of the light water reactor of the present embodiment has the aforementioned core structures of (1), (2), and (3) similarly to the core 20A of embodiment 2.

TABLE 5

| Nuclide | Composition (wt %) |
|---|---|
| Np-237 | 0.2 |
| Pu-238 | 5.0 |
| Pu-239 | 13.4 |
| Pu-240 | 40.8 |
| Pu-241 | 4.6 |
| Pu-242 | 21.1 |
| Am-241 | 4.7 |
| Am-242M | 0.2 |
| Am-243 | 4.1 |
| Cm-244 | 3.6 |
| Cm-245 | 1.1 |
| Cm-246 | 0.8 |
| Cm-247 | 0.2 |
| Cm-248 | 0.2 |

Figure 41:
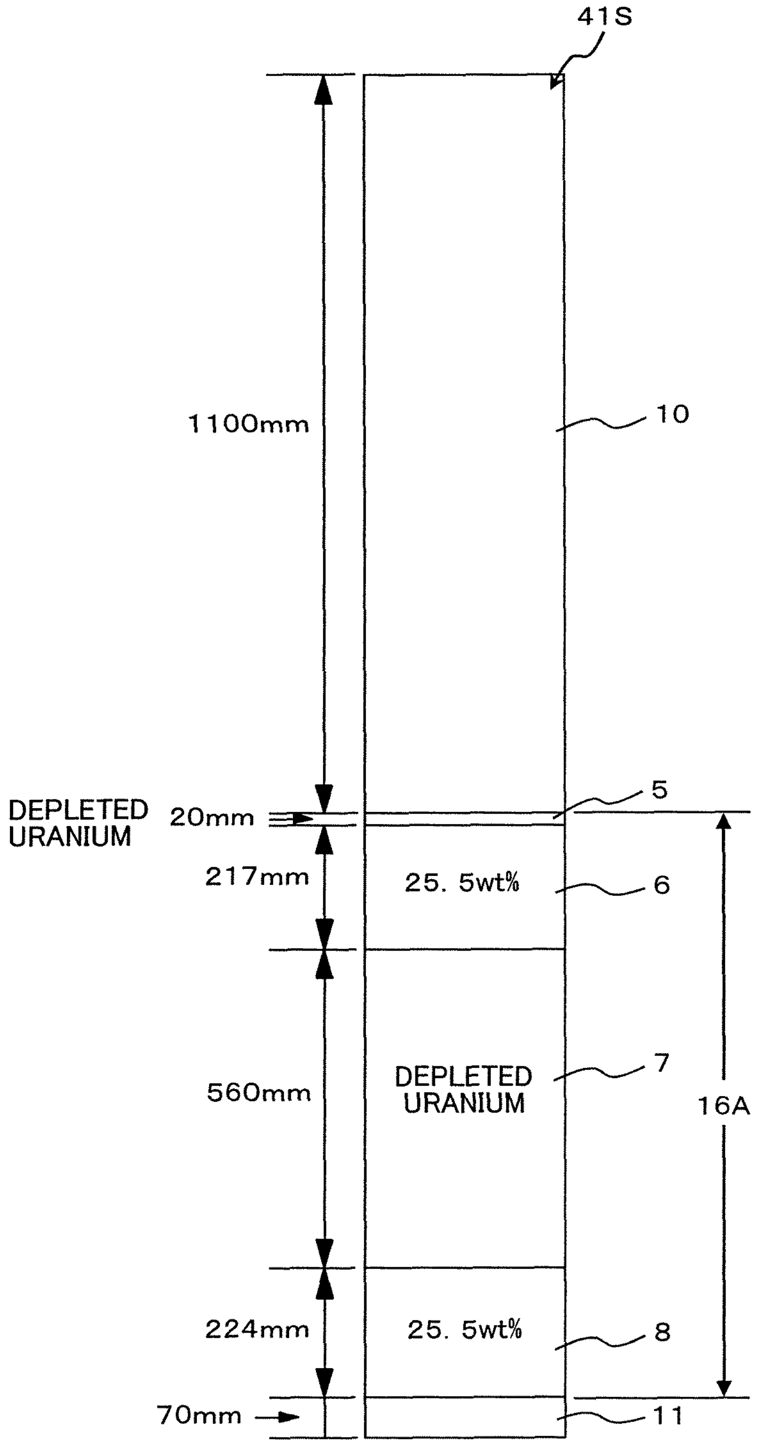
FIG. 41 is an explanatory drawing showing a height of each zone of a fresh fuel assembly loaded in an equilibrium core of a core of a light water reactor according to embodiment 11 which is another embodiment of the present invention, in an axial direction and an enrichment distribution of fissionable Pu in a fissile zone of the fresh fuel assembly.

The core of the present embodiment has a structure that in embodiment 2, the fuel assembly 41H is exchanged with a fuel assembly 41R (refer to FIG. 41). Other structure of the core of the present embodiment is the same as that of the core 20A.

The nuclear fuel material zone 16A in the fuel assembly 41R loaded in the core of the present embodiment has the upper blanket zone 5, upper fissile zone 6, internal blanket zone 7, and lower fissile zone 8 similarly to the fuel assembly 41H. The height of the upper blanket zone 5 is 50 mm, and the height of the upper fissile zone 6 is 183 mm, and the height of the internal blanket zone 7 is 560 mm, and the height of the lower fissile zone 8 is 173 mm. The upper reflector zone 10 with a height of 1100 mm exists and the lower reflector zone 11 with a height of 70 mm exists below the lower fissile zone 8 above the upper blanket zone 5. The height of the upper fissile zone 6 is 1.06 times the height of the lower fissile zone 8.

In the fuel assembly 41R, 397 fuel rods with an outside diameter of 7.6 mm are arranged in an equilateral triangle lattice in the channel box 13. The gap between the mutual fuel rods is 1.8 mm and a fuel rod row in the outermost layer includes eleven fuel rods 44. When the burnup of the fuel assembly 41R is 0, all the fuel rods of the fuel assembly 41R fill the upper blanket zone 5 and the lower blanket zone 9 with depleted uranium and fill the upper fissile zone 6 and lower fissile zone 8 with TRU oxide fuel including TRUs of the composition shown in Table 5 in the state of a burnup of 0. The enrichment of fissionable Pu of the TRU oxide fuel is 18.0 wt % and the rate of Pu-239 in the TRU is 13.4 wt %.

The present embodiment can obtain each effect occurred in embodiment 2. The core of the present embodiment can efficiently extinguish the TRUs even in the TRU composition different from the TRU composition of the fuel assembly 41H loaded in the core 20A of embodiment 2.

Embodiment 11

A core of a light water reactor according to embodiment 11 which is another embodiment of the present invention will be explained below by referring to FIG. 41 and Table 6. The core of the light water reactor of the present embodiment has the core structures of (1) and (2) similarly to the core 20A of embodiment 2.

TABLE 6

| Nuclide | Composition (wt %) |
|---|---|
| Np-237 | 5.49 |
| Pu-238 | 2.51 |

TABLE 6-continued

| Nuclide | Composition (wt %) |
|---|---|
| Pu-239 | 44.25 |
| Pu-240 | 25.79 |
| Pu-241 | 8.45 |
| Pu-242 | 7.44 |
| Am-241 | 3.89 |
| Am-242M | 0.01 |
| Am-243 | 1.59 |
| Cm-244 | 0.54 |
| Cm-245 | 0.03 |
| Cm-246 | 0.01 |

The core of the present embodiment has a structure where in embodiment 2, the fuel assembly 41H is exchanged with a fuel assembly 41S (refer to FIG. 41). Other structure of the core of the present embodiment is the same as that of the core 20A.

The nuclear fuel material zone 16A in the fuel assembly 41S loaded in the core of the present embodiment has the upper blanket zone 5, upper fissile zone 6, internal blanket zone 7, and lower fissile zone 8 similarly to the fuel assembly 41H. The height of the upper blanket zone 5 is 20 mm, and the height of the upper fissile zone 6 is 217 mm, and the height of the internal blanket zone 7 is 560 mm, and the height of the lower fissile zone 8 is 224 mm. Further, the height of the upper reflector zone 10 is 1100 mm and the height of the lower reflector zone 11 is 70 mm.

Figure 23:
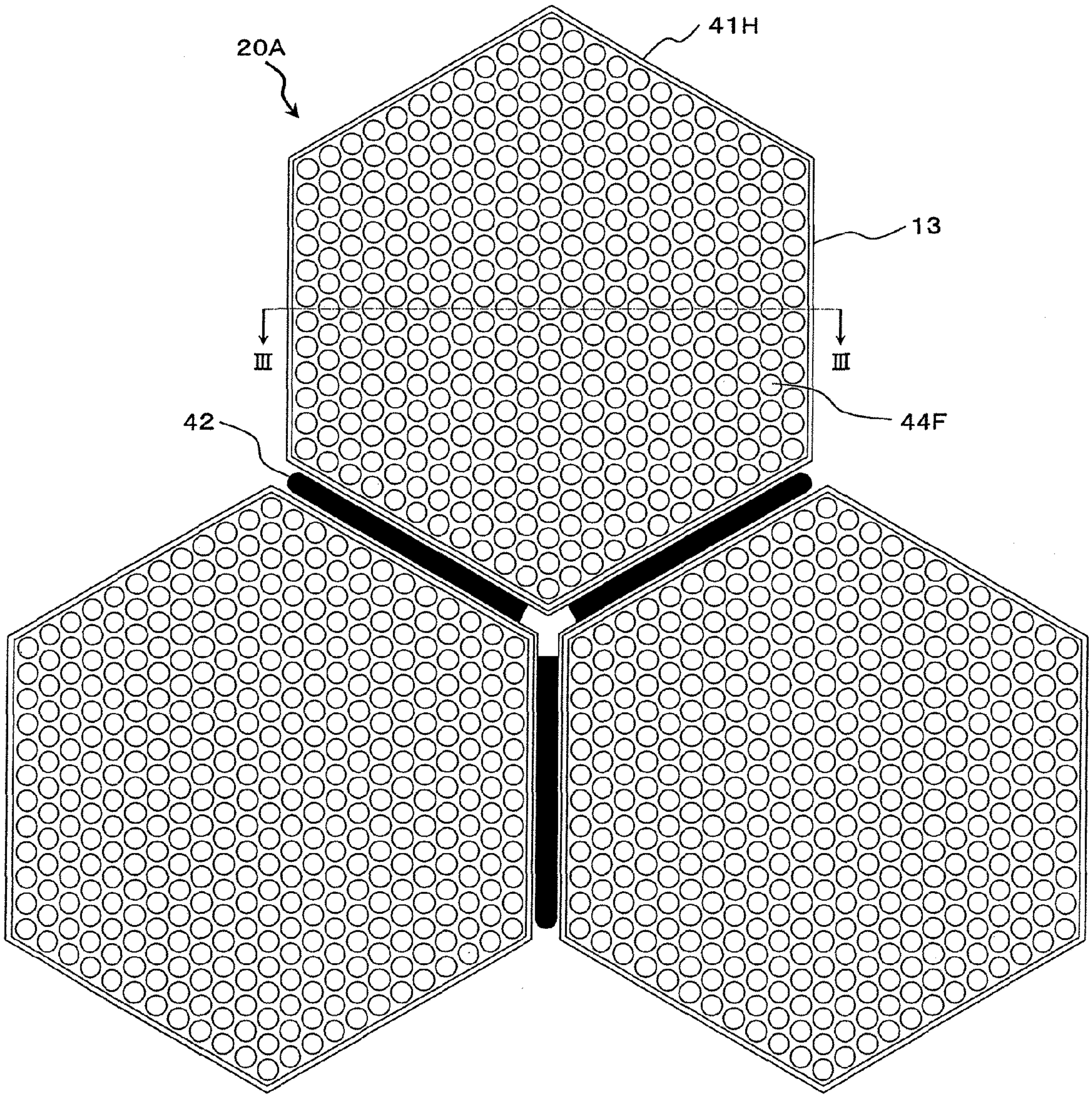
FIG. 23 is a cross sectional view showing a fuel assembly lattice in a core of a light water reactor according to embodiment 2 which is another embodiment of the present invention.
Figure 24:
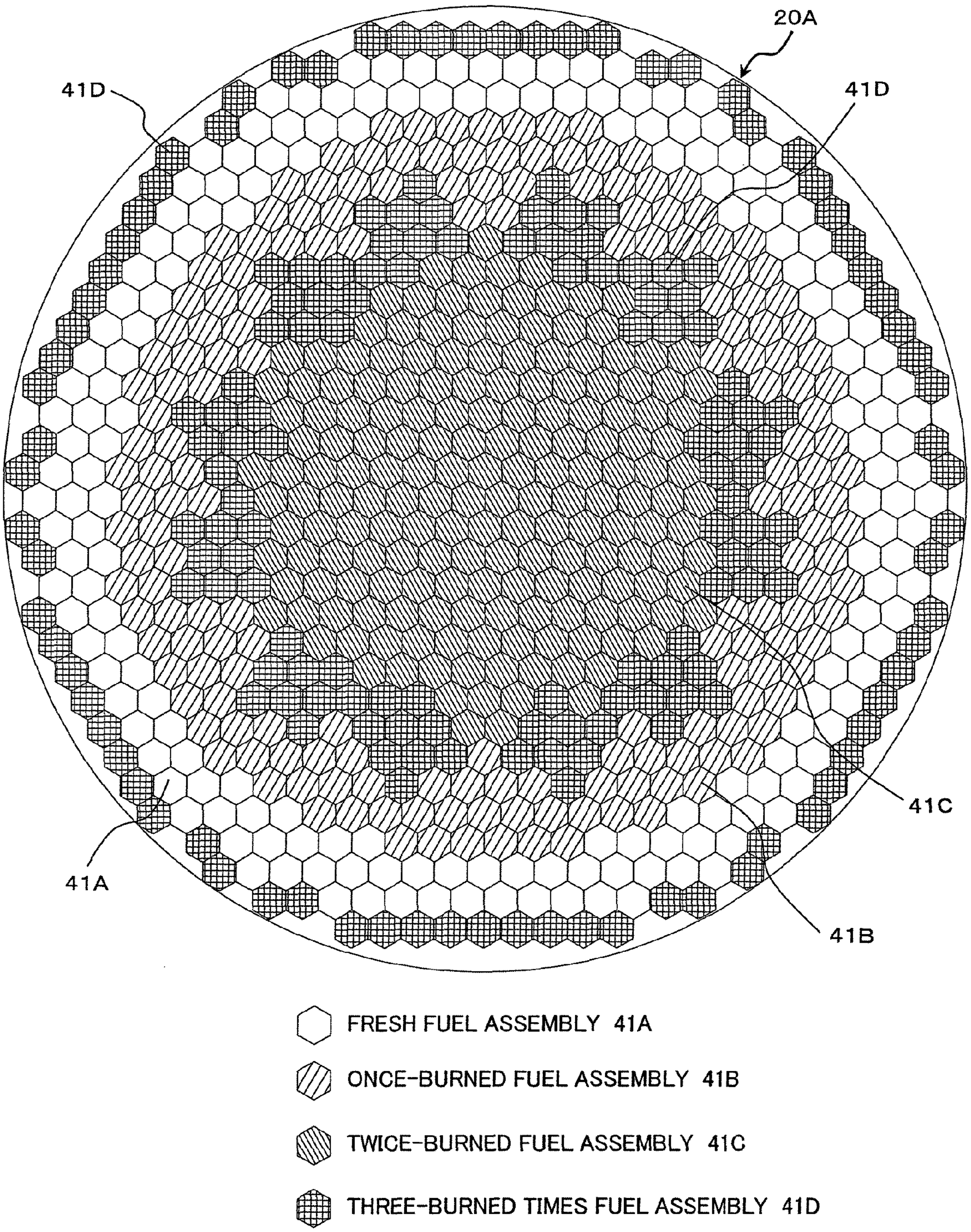
FIG. 24 is an explanatory drawing showing an arrangement of fuel assemblies in an equilibrium core state of a core of a light water reactor according to embodiment 2.

The cross section of the fuel assembly 41S is the same as that shown in FIG. 23. When the burnup of the fuel assembly 41S is 0, all the fuel rods of the fuel assembly 41S fill the upper blanket zone 5 and internal blanket zone 7 with thorium oxide. When the burnup of the fuel assembly 41S is 0, the upper fissile zone 6 and lower fissile zone 8 of this fuel assembly 41S loaded in the core 20A of the present embodiment include the TRUs (hereinafter referred to as current core discharge TRUs) having the composition shown in Table 6 obtained by reprocessing the spent fuel assembly (including slightly enriched uranium) with a discharge burnup of 45 GWd/t taken out from the current ABWR core and mixed oxide fuel of thorium. The core loaded with the fuel assembly 41S of a burnup of 0 is a TRU first generation recycle core (hereinafter referred to as an RG1 core). In the current ABWR core, a fuel assembly including slightly enriched uranium is loaded. The current core discharge TRU having the composition shown in Table 6 is added to the TRU obtained by reprocessing the fuel assembly 41S taken out from the RG1 core as a spent fuel assembly, by the quantity that will make the core critical. The core loading the fuel assembly 41S of a burnup of 0 including mixed oxide fuel of the TRUs obtained by the addition and thorium in the upper fissile zone 6 and lower fissile zone 8 is a TRU second generation recycle core (hereinafter referred to as an RG2 core). Hereafter, every repetition of the TRU recycling, the current core discharge TRU is added to the TRU obtained by reprocessing the fuel assembly 41S which is a spent fuel assembly generated from the TRU recycle core of each generation, by the quantity that will make the core critical, and the fuel assembly 41S of a burnup of 0 including the TRU obtained by the addition and mixed oxide fuel of thorium in the upper fissile zone 6 and lower fissile zone 8 is loaded in the core 20A, and until the composition of the TRU obtained by reprocessing the fuel assembly 41S which is a spent fuel assembly taken out from the core 20A becomes almost constant, the TRU recycling is repeated.

Figure 42:
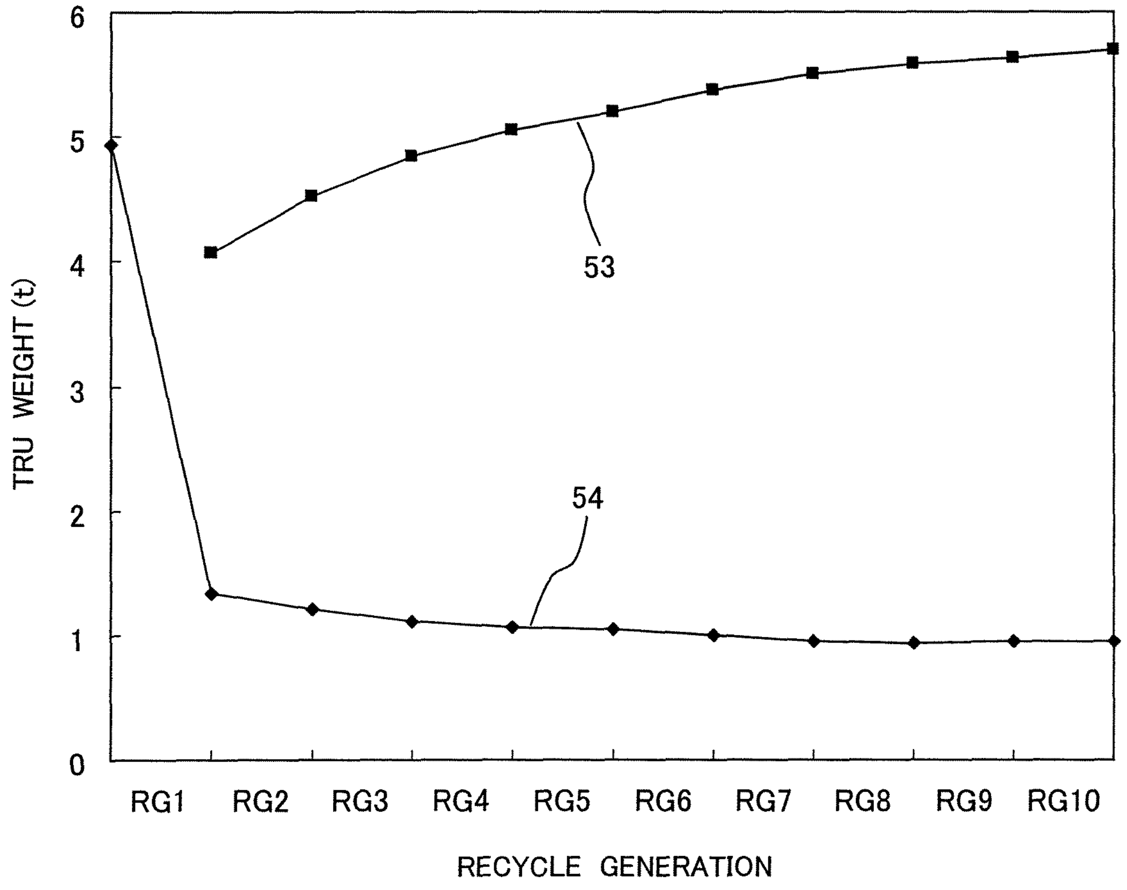
FIG. 42 is a characteristic diagram showing a relation between core of each TRU recycle generation in embodiment 11 and weight of TRU discharged from current reactor and added to a fuel assembly of a burnup of 0, and a relation between the core of each TRU recycle generation and TRU weight in a spent fuel assembly.
Figure 43:
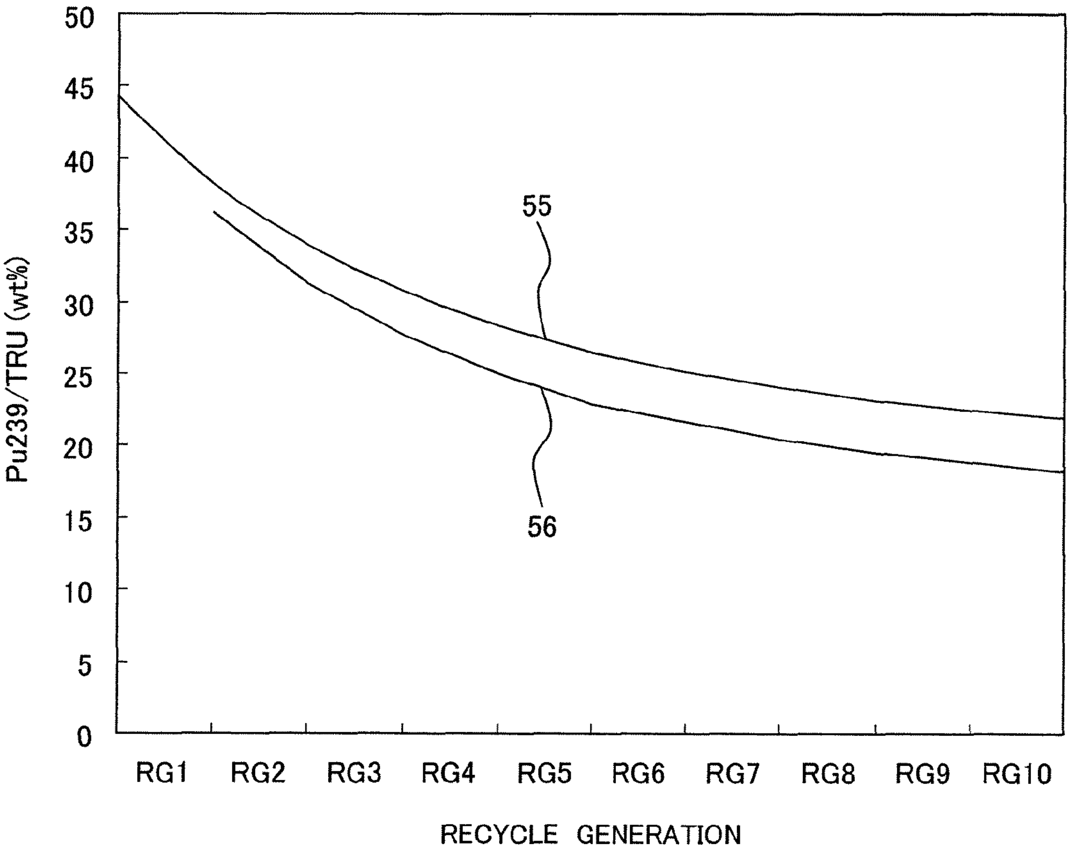
FIG. 43 is a characteristic diagram showing a relation between core of each recycle generation in embodiment 11 and a weight rate of Pu-239 included in TRUs in a fuel assembly of a burnup of 0, and a relation between the core of each recycle generation and a weight rate of Pu-239 included in TRUs in a spent fuel assembly.

In FIG. 42, a characteristic 54 indicates weight of the current core discharge TRU added to fresh fuel assembly of a burnup of 0 loaded in the recycle core of each recycle generation and a characteristic 53 indicates weights of the TRUs in the spent fuel assemblies taken out from these recycle cores. In FIG. 43, a characteristic 55 indicates weight rate of Pu-239 included the TRUs in the fuel assembly of a burnup of 0 loaded in the recycle core of each recycle generation and a characteristic 56 indicates weight rate of Pu-239 included in the TRUs in the spent fuel assemblies taken out from these recycle cores. Each blanket zone is not filled with the mixed oxide fuel and does not include TRUs.

Figure 44:
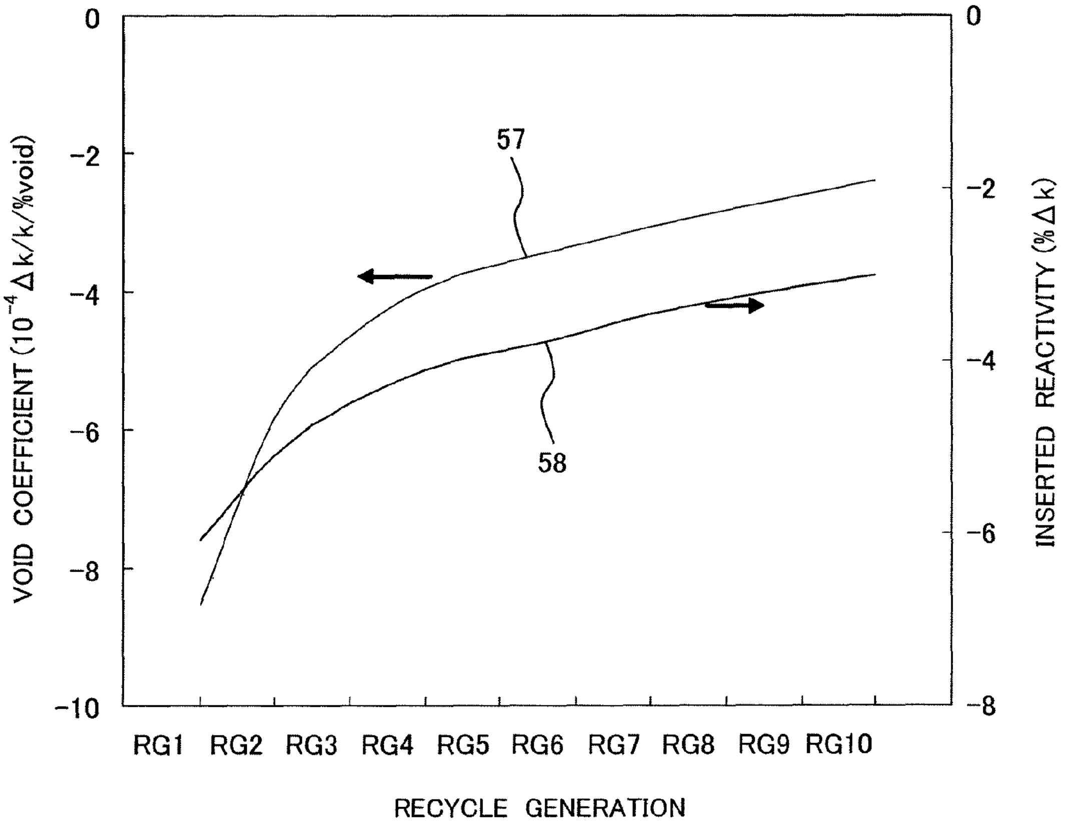
FIG. 44 is a characteristic diagram showing a relation between core of each recycle generation in embodiment 11 and void coefficient, and a relation between the core of each recycle generation and inserted reactivity when the overall core becomes a state of 100% void.

The core of each recycle generation from the RG1 core to the RG10 core is loaded with fuel assemblies including the current core discharge TRU and having a discharge burnup of 65 GWd/t. In these recycle generation cores, the current core discharge TRU undergoes fission. In the present embodiment, in these recycle generation cores, when the void coefficient is negative like a characteristic 57 shown in FIG. 44, and like the characteristic 58, when the overall core becomes the state of 100% void, which cannot be caused as an initiating event in the BWR, and furthermore, even when it is assumed that all the control rods are not operated, no positive reactivity is inserted.

The present embodiment can obtain each effect occurred in embodiment 2. The present embodiment can efficiently extinguish the TRUs, even in a nuclear fuel material of the TRU composition different from that of embodiment 2.

In W. S. Yang et al., A Metal Fuel Core Concept for 1000 MWt Advanced Burner Reactor GLOBAL '07 Boise, USA, September, 2007, P. 52, the concept of a sodium cooling type ABR for permitting the TRU recovered by reprocessing the spent nuclear fuel of the light water reactor to fission and reduce in quantity is described. Furthermore, the literature describes that the TRUs generated from the light water reactor can be imprisoned in the light water reactor, ABR, and fuel cycle equipment by operating the light water reactor and ABR in operation at present in the coexistence thereof, and the TRUs need not be stored outside the nuclear reactor, and the quantity of a long-life radioactive waste material can be reduced greatly.

However, the neutron energy in the core of the ABR is increased because the ABR uses a nuclear fuel material with TRUs enriched in depleted uranium and uses Na as a coolant. Therefore, simultaneously with that the enriched TRUs undergoes fission and are reduced in quantity, there are many TRUs newly created from U-238. To store all the quantity of TRUs from the light water reactor in operation at present in the ABR, the ABR needs to be built at a rate of one ABR per each light water reactor. It is expected that the power generation cost of the ABR becomes higher than that of the light water reactor, so that compared with the case of the operation of only the light water reactor, there is concern that the economical efficiency of fuel may be impaired.

Therefore, instead of enriching the TRUs in depleted uranium, a fuel assembly including a nuclear fuel material with TRUs enriched in thorium for newly generating no TRUs is loaded in a TRU burner reactor described in Japanese Patent Laid-Open No. 2008-215818 including low neutron energy in the core and is operated, thus new generation of TRUs is prevented and the TRU fission efficiency can be promoted. Therefore, the TRUs of three light water reactors can be permitted to fission by one TRU burner reactor of the present embodiment, thus a Na cooling ABR of a high power generation cost is unnecessary and the economical efficiency of fuel is improved greatly.

Embodiment 12

Figure 45:
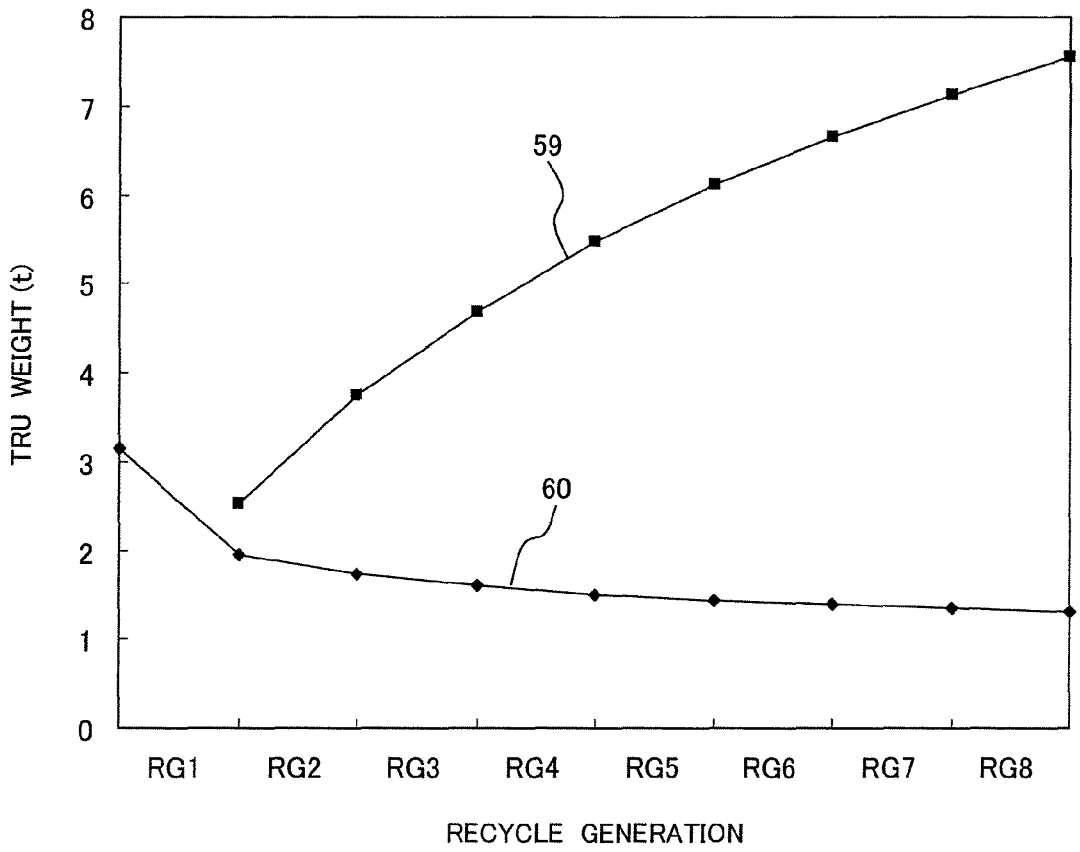
FIG. 45 is a characteristic diagram showing a relation between core of each recycle generation in a core of a light water reactor according to embodiment 12 which is another embodiment of the present invention and weight of TRU discharged from current reactor and added to a fuel assembly of a burnup of 0, and a relation between the core of each TRU recycle generation and weight of TRU included in a spent fuel assembly.
Figure 46:
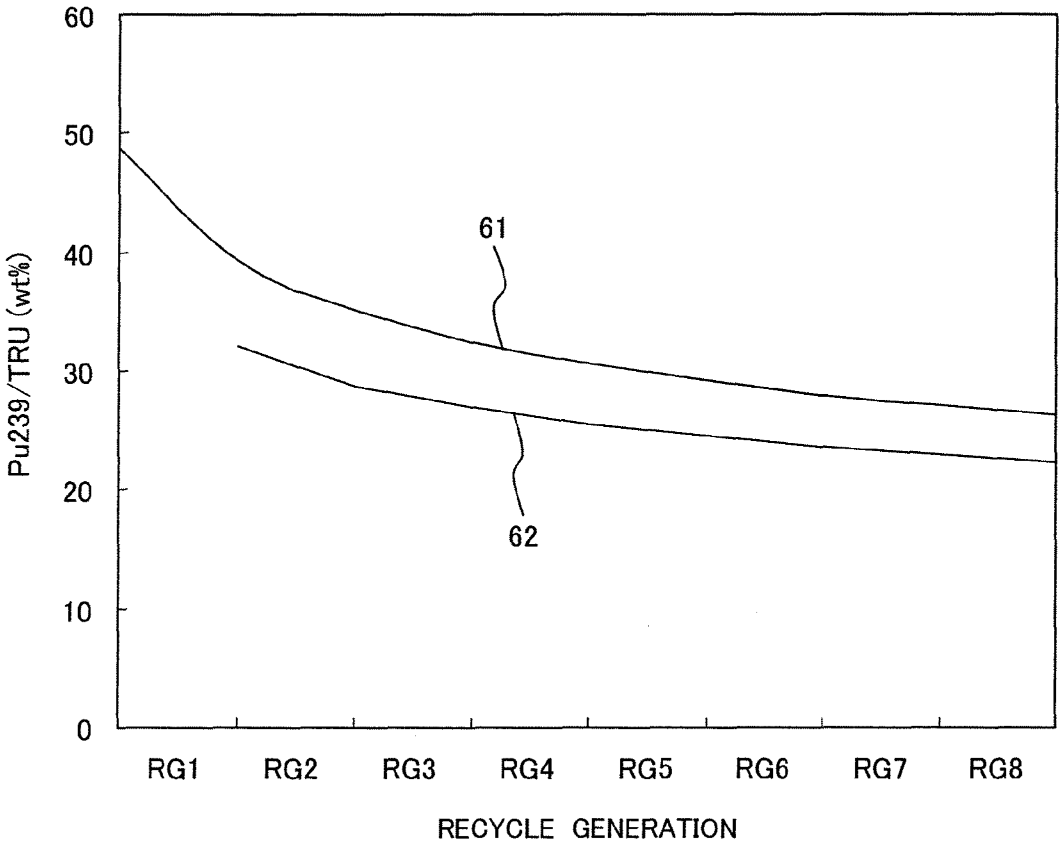
FIG. 46 is a characteristic diagram showing a relation between core of each recycle generation in embodiment 12 and a weight rate of Pu-239 included in TRUs in a fuel assembly of a burnup of 0, and a relation between the core of each recycle generation and a weight rate of Pu-239 included in TRUs in a spent fuel assembly.

A core of a light water reactor according to embodiment 12 which is another embodiment of the present invention will be explained in detail below by referring to FIGS. 45 and 46 and Tables 7 and 8. The core of the present embodiment is the core 20C similar to that of embodiment 7 and is a core of the ABWR in which the electric power in operation at present is 1350 MW and 872 fuel assemblies having 74 fuel rods per each fuel assembly are loaded. This core is the core of the TRU burner reactor. With respect to the structure of the present embodiment, the portion different from that of embodiment 7 will be explained and the explanation of the same portion as that of embodiment 7 will be omitted.

TABLE 7

| Nuclide | Composition (wt %) |
|---|---|
| Np-237 | 6.66 |
| Pu-238 | 2.76 |
| Pu-239 | 48.81 |
| Pu-240 | 23.05 |
| Pu-241 | 6.95 |
| Pu-242 | 5.05 |
| Am-241 | 4.67 |
| Am-242M | 0.02 |
| Am-243 | 1.47 |
| Cm-243 | 0.01 |
| Cm-244 | 0.50 |
| Cm-245 | 0.04 |
| Cm-246 | 0.01 |

Figure 35:
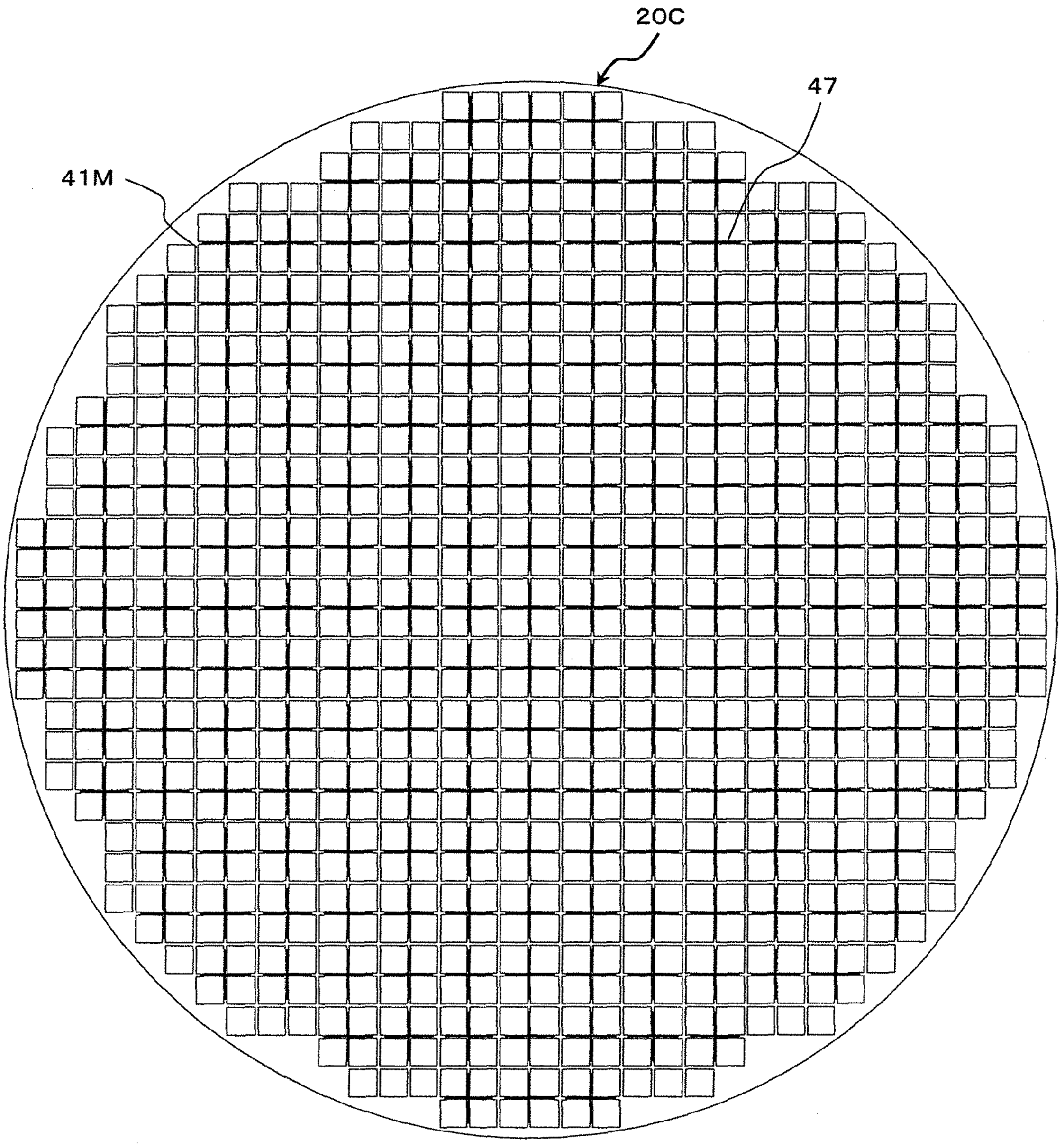
FIG. 35 is a cross sectional view showing a core of a light water reactor according to embodiment 7 which is another embodiment of the present invention.
Figure 36:
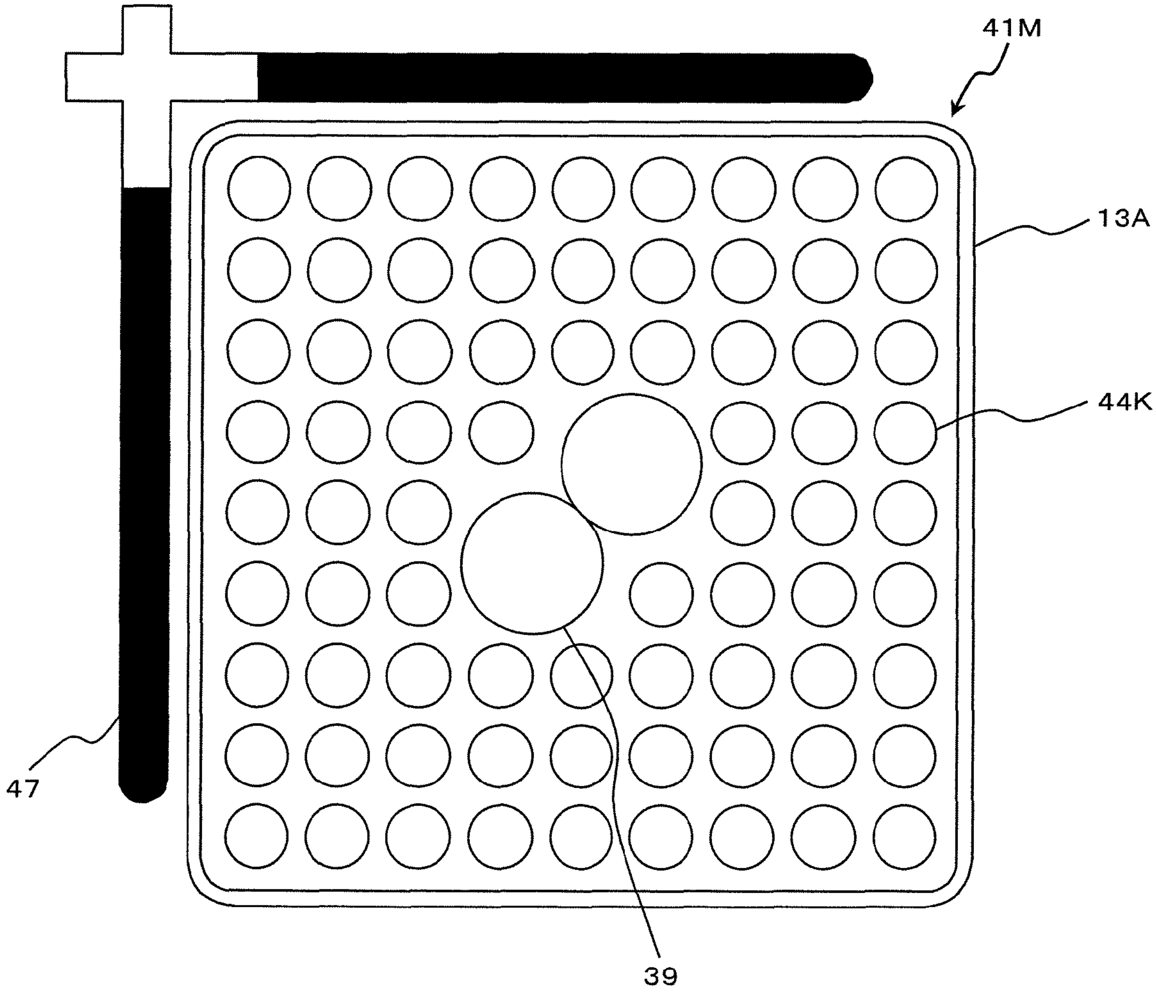
FIG. 36 is a cross sectional view showing a fuel assembly shown in FIG. 35.

The cross section of the core 20C of the present embodiment is the same as that shown in FIG. 35 and the cross section of the fuel assembly 41M loaded in the core 20C is the same as that shown in FIG. 36. In the core 20C, the fuel assembly 41M in which the height of the nuclear fuel material zone is 3.71 m is loaded. Further, in the core of the PWR, fuel assemblies including slightly enriched uranium are loaded. The core loading a fuel assembly of a burnup of 0 having mixed oxide fuel of the TRUs (hereinafter referred to as current core discharge TRUs) having the composition shown in Table 7 obtained by reprocessing the spent fuel assembly with a discharge burnup of 50 GWd/t taken out from the core of the PWR, and depleted uranium is a TRU first generation recycle core (hereinafter referred to as an RG1 core). The current core discharge TRUs having the composition shown in Table 7 are added to the TRUs obtained by reprocessing the fuel assembly taken out from the RG1 core, by the quantity that will make the core critical. The core loading the fuel assembly of a burnup of 0 having mixed oxide fuel including depleted uranium and the TRUs obtained by the addition is a TRU second generation recycle core (hereinafter referred to as an RG2 core). Hereafter, every repetition of the TRU recycling, the current core discharge TRUs are added to the TRUs obtained by reprocessing the spent fuel assembly taken out from the recycle core of each generation, by the quantity that will make the core critical, and the fuel assembly of a burnup of 0 having mixed oxide fuel of the obtained TRUs and depleted uranium is loaded in the core.

TABLE 8

| Nuclide | RG1 | RG2 | RG3 | RG4 | RG5 | RG6 | RG7 | RG8 | RG8 Taken-out fuel |
|---|---|---|---|---|---|---|---|---|---|
| TRU weight (t) | 3.14 | 4.46 | 5.48 | 6.30 | 6.97 | 7.55 | 8.04 | 8.48 | 7.57 |
| Np-237 | 6.66 | 5.77 | 5.17 | 4.72 | 4.37 | 4.08 | 3.85 | 3.66 | 2.94 |
| Np-239 | 0.00 | 0.00 | 0.00 | 0.00 | 0.00 | 0.00 | 0.00 | 0.00 | 0.02 |
| Pu-238 | 2.76 | 5.41 | 6.86 | 7.86 | 8.60 | 9.15 | 9.57 | 9.89 | 11.35 |
| Pu-239 | 48.81 | 39.35 | 35.12 | 32.47 | 30.57 | 29.12 | 27.97 | 27.03 | 22.26 |
| Pu-240 | 23.05 | 26.03 | 27.01 | 27.57 | 27.97 | 28.28 | 28.52 | 28.73 | 29.47 |
| Pu-241 | 6.95 | 8.33 | 8.31 | 8.06 | 7.79 | 7.56 | 7.35 | 7.18 | 8.12 |
| Pu-242 | 5.05 | 6.86 | 8.00 | 8.85 | 9.53 | 10.12 | 10.63 | 11.08 | 12.57 |
| Am-241 | 4.67 | 4.75 | 5.10 | 5.40 | 5.62 | 5.79 | 5.91 | 6.00 | 5.22 |
| Am-242M | 0.02 | 0.04 | 0.06 | 0.07 | 0.08 | 0.08 | 0.09 | 0.09 | 0.11 |
| Am-243 | 1.47 | 2.08 | 2.41 | 2.63 | 2.79 | 2.91 | 3.01 | 3.09 | 3.45 |
| Cm-242 | 0.00 | 0.00 | 0.00 | 0.00 | 0.00 | 0.00 | 0.00 | 0.00 | 0.30 |
| Cm-243 | 0.01 | 0.02 | 0.02 | 0.02 | 0.02 | 0.02 | 0.02 | 0.02 | 0.02 |
| Cm-244 | 0.50 | 1.20 | 1.66 | 1.96 | 2.18 | 2.34 | 2.46 | 2.55 | 3.33 |
| Cm-245 | 0.04 | 0.13 | 0.23 | 0.31 | 0.37 | 0.41 | 0.45 | 0.47 | 0.57 |
| Cm-246 | 0.01 | 0.03 | 0.05 | 0.08 | 0.10 | 0.13 | 0.16 | 0.18 | 0.24 |
| Cm-247 | 0.00 | 0.00 | 0.00 | 0.00 | 0.01 | 0.01 | 0.01 | 0.02 | 0.02 |
| Cm-248 | 0.00 | 0.00 | 0.00 | 0.00 | 0.00 | 0.00 | 0.00 | 0.01 | 0.01 |

Table 8 shows the TRU composition included in the fuel assembly of a burnup of 0 in the recycle core of each recycle generation from the RG1 core to the RG8 core and the composition of the TRUs included in the spent fuel assemblies taken out from the RG8 core. In FIG. 45, weights of the current core discharge TRUs added to the fuel assembly of a burnup of 0 loaded in the recycle core of each recycle generation from the RG1 core to the RG8 core are indicated in a characteristic 60 and weights of the TRUs included in the spent fuel assemblies taken out from these recycle cores are indicated in a characteristic 59. In FIG. 46, weight rate of Pu-239 included in the TRUs in the fuel assembly of a burnup of 0 loaded in the recycle core of each recycle generation from the RG1 core to the RG8 core is indicated in a characteristic 61 and weight rate of Pu-239 included in the TRUs in the spent fuel assemblies taken out from these recycle cores is indicated in a characteristic 62.

Figure 47:
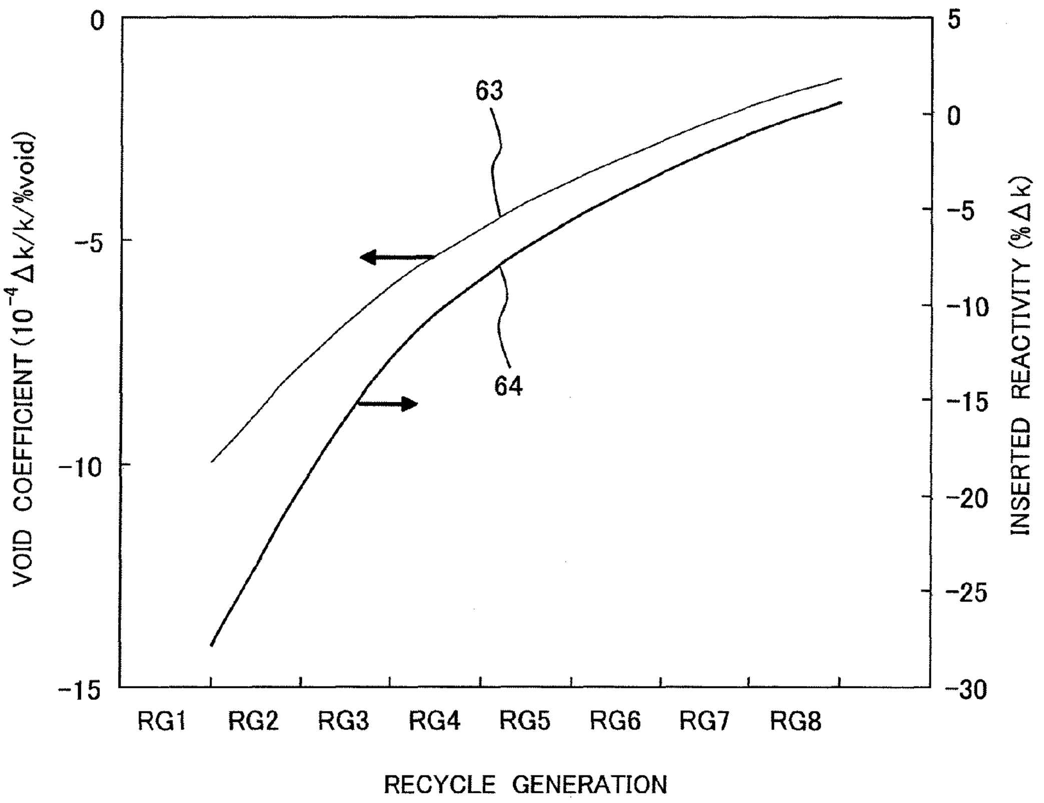
FIG. 47 is a characteristic diagram showing a relation between core of each recycle generation in embodiment 12 and void coefficient, and a relation between the core of each recycle generation and inserted reactivity when the overall core becomes a state of 100% void.

The core of each recycle generation from the RG1 core to the RG8 core is loaded with the fuel assemblies including the current core discharge TRUs and having a discharge burnup of 45 GWd/t. In these recycle generation cores, the current core discharge TRUs undergo fission. In the present embodiment, in these recycle generation cores, when the void coefficient is negative like the characteristic 63 shown in FIG. 47, and like the characteristic 64, when the overall core becomes the state of 100% void, which cannot be caused as an initiating event in the BWR and furthermore, even when it is assumed that all the control rods are not operated, no positive reactivity is inserted in up to the RG7 core. The RG8 core has a sufficient negative void coefficient for safety's sake although the positive reactivity is 1 dollar or less.

In the present embodiment, the spent fuel assemblies from the RG1 core to the RG7 core are all reprocessed and the discharge TRUs are handed over to the next recycle generation core together with the current core discharge TRUs. Therefore, among the RG1 to the RG8, only 208 fuel assemblies taken out from the RG8 core every year can remain as a spent fuel assembly. On the other hand, about 8000 spent fuel assemblies must be reprocessed in term of the fuel assemblies of slightly enriched uranium currently in use by the ABWR in order to supply about 14 tons of TRUs used in the RG1 to the RG8. The ABWR of the present embodiment and the ABWR using slightly enriched uranium in operation at present are used jointly, thus the number of residual spent fuel assemblies can be greatly reduced to about 2.6% of that when only the ABWR using slightly enriched uranium fuel is operated.

Embodiment 13

Figure 49:
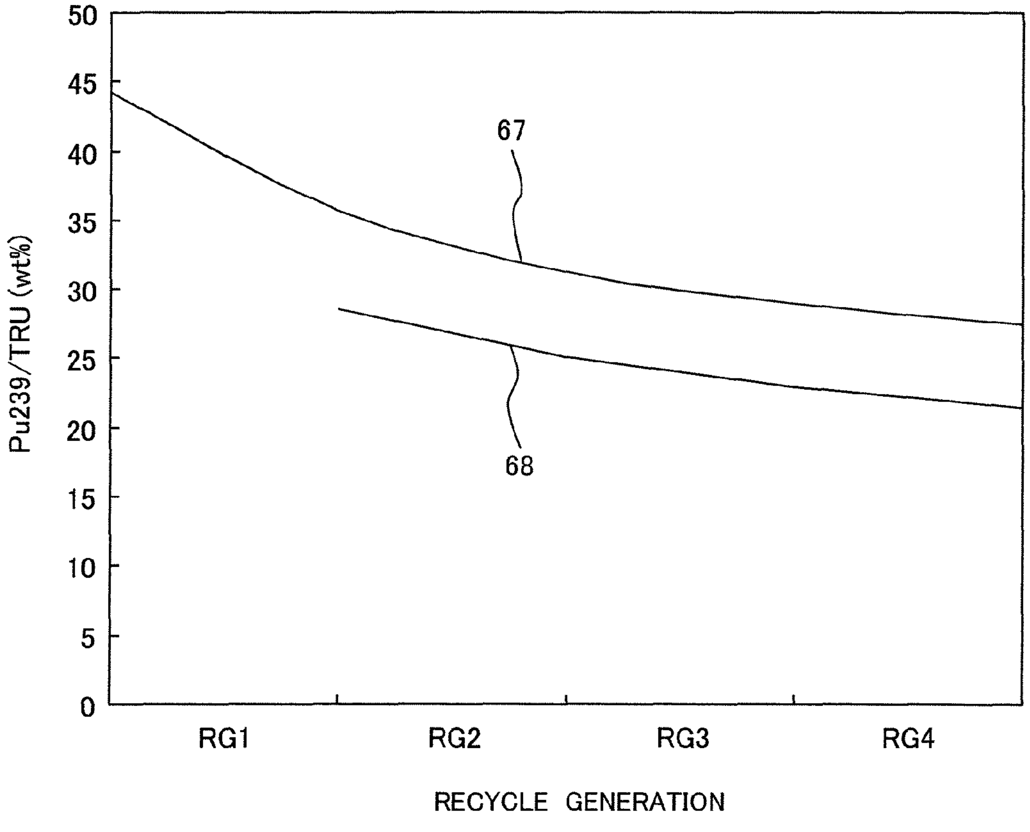
FIG. 49 is a characteristic diagram showing a relation between core of each recycle generation in embodiment 13 and a weight rate of Pu-239 included in TRUs in a fuel assembly of a burnup of 0, and a relation between the core of each recycle generation and a weight rate of Pu-239 included in TRUs in a spent fuel assembly.
Figure 50:
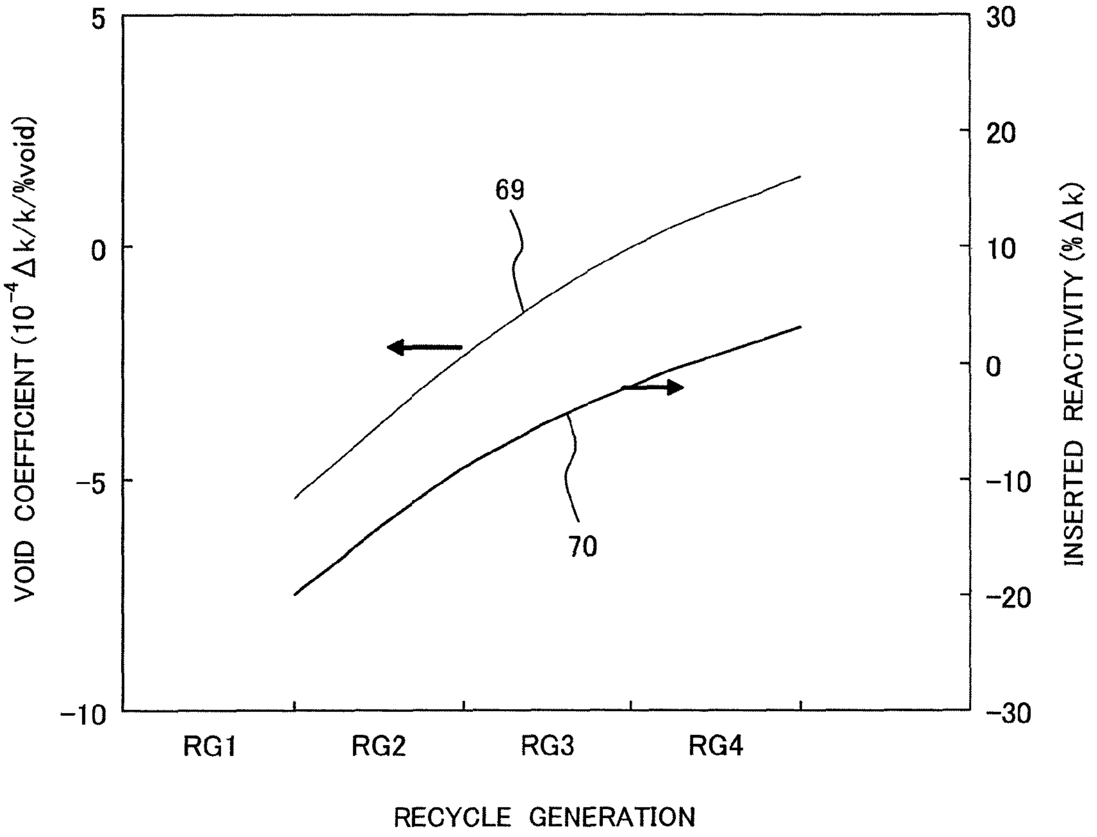
FIG. 50 is a characteristic diagram showing a relation between core of each recycle generation in embodiment 13 and void coefficient, and a relation between the core of each recycle generation and inserted reactivity when the overall core becomes a state of 100% void.

A core of a light water reactor according to embodiment 13 which is another embodiment of the present invention will be explained in detail below by referring to FIGS. 48 to 50 and Table 6. The core of the present embodiment is the core 20C similar to that of embodiment 12 and is a core of the ABWR in which the electric power in operation at present is 1350 MW and 872 fuel assemblies having 74 fuel rods per each fuel assembly are loaded. This core is the core of the TRU burner reactor. With respect to the structure of the present embodiment, the portion different from that of embodiment 12 will be explained and the explanation of the same portion as that of embodiment 12 will be omitted.

In the core 20C of the present embodiment, the fuel assembly 41M in which the height of the nuclear fuel material zone is 3.71 m is loaded. Further, in the core of the PWR, fuel assemblies including slightly enriched uranium are loaded. Further, in the core of the ABWR, fuel assemblies including slightly enriched uranium are loaded. The core loading a fuel assembly of a burnup of 0 including mixed oxide fuel of the TRUs (hereinafter referred to as current core discharge TRUs) having the composition shown in Table 6 obtained by reprocessing the spent fuel assembly with a discharge burnup of 45 GWd/t taken out from the core of the PWR and thorium is a TRU first generation recycle core (hereinafter referred to as an RG1 core). The current core discharge TRUs having the composition shown in Table 6 are added to the TRUs obtained by reprocessing the fuel assembly taken out from the RG1 core, by the quantity that will make the core critical. The core loading the fuel assembly of a burnup of 0 having mixed oxide fuel of the TRUs obtained by addition and thorium is a TRU second generation recycle core (hereinafter referred to as an RG2 core). Hereafter, every repetition of the TRU recycling, the current core discharge TRUs are added to the TRUs obtained by reprocessing the spent fuel assembly taken out from the recycle core of each generation, by the quantity that the core becomes critical, and the fuel assembly of a burnup of 0 having mixed oxide fuel of the obtained TRUs and thorium is loaded in the core.

Figure 48:
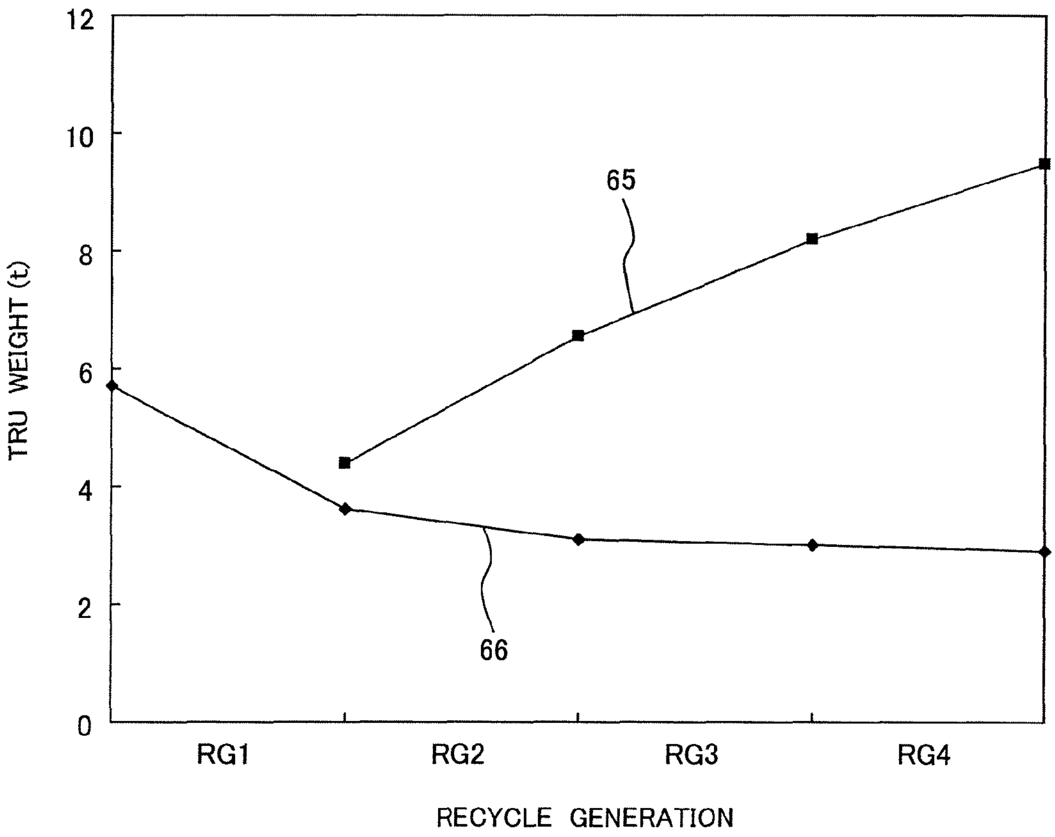
FIG. 48 is a characteristic diagram showing a relation between core of each recycle generation in a core of a light water reactor according to embodiment 13 which is another embodiment of the present invention and weight of TRU discharged from current reactor and added to a fuel assembly of a burnup of 0, and a relation between the core of each TRU recycle generation and weight of TRU included in a spent fuel assembly.

In FIG. 48, a characteristic 66 indicates weight of the current core discharge TRU added to the fuel assembly of a burnup of 0 loaded in the recycle core of each recycle generation and a characteristic 65 indicates weights of the TRUs in the spent fuel assemblies taken out from these recycle cores. In FIG. 49, a characteristic 67 indicates weight rate of Pu-239 included the TRUs in the fuel assembly of a burnup of 0 loaded in the recycle core of each recycle generation and a characteristic 68 indicates weight rate of Pu-239 included in the TRUs in the spent, fuel assemblies taken out from these recycle cores.

The core of each recycle generation from the RG1 core to the RG4 core is loaded with the fuel assemblies including the current core discharge TRUs and having a discharge burnup of 45 GWd/t. In these recycle generation cores, the current core discharge TRUs undergo fission. In the present embodiment, in these recycle generation cores, when the void coefficient is negative in up to the RG3 like the characteristic 69 shown in FIG. 50 and like the characteristic 70 shown in FIG. 50, and when the overall core becomes the state of 100% void, which cannot be caused as an initiating event in the ABWR and furthermore, even when it is assumed that all the control rods are not operated, in up to the RG3 core, no positive reactivity is inserted.

In the present embodiment, the problems for safety must be solved in the TRU multiple-recycling in and after the RG4 core, but the use quantity of the current core discharge TRUs of the RG1 is large compared with the ABR and other embodiments. Assuming that before the reprocessing technology of fuel assemblies including thorium is established, the reprocessing is not executed in and after the RG2 core for the present, the case that the RG1 core and the current ABWR using slightly enriched uranium are used jointly is evaluated. 208 spent fuel assemblies are taken out every year from the RG1 core. On the other hand, about 3200 spent fuel assemblies of the fuel assemblies of slightly enriched uranium currently in use by the ABWR must be reprocessed to supply about 5.7 tons of TRUs used in the RG1. The ABWR of the RG1 core and the ABWR using slightly enriched uranium in operation at present are used jointly, thus the number of residual spent fuel assemblies can be greatly reduced to about 6.5% of that when only the ABWR using slightly enriched uranium fuel is operated. The present embodiment is one of the methods capable of realizing the great reduction of the number of residual spent fuel assemblies only by changing the fuel assemblies in the ABWR in operation at present. Further, when disposing the spent fuel assemblies straight in the ground, which is considered at present as one of the choices of the TRU disposal, it is considered that mixed oxide fuel pellets of TRUs and thorium are far stable chemically than mixed oxide fuel pellets of TRUs and uranium, so that it is a valid method before the reprocessing technology of fuel assemblies including thorium is established.

REFERENCE SIGNS LIST

1: boiling water reactor, 2, 2A, 2B: plenum, 3, 3A, 3B: neutron absorbing member, 4: neutron absorbing material filling zone, 5, 5A: upper blanket zone, 6, 6A: upper fissile zone, 7, 7A: internal blanket zone, 8, 8A: lower fissile zone, 9, 9A: lower blanket zone, 10: upper reflector zone, 11: lower reflector zone, 12, 16, 16A: nuclear fuel material zone, 14: upper tie-plate, 15: lower tie-plate, 20, 20A: core, 25: core shroud, 27: reactor pressure vessel, 34: fissile zone, 35A, 35C: first zone, 35B, 35D: second zone, 41, 41A-41N, 41Q-41S: fuel assembly, 42, 47: control rod, 44, 44A-44N, 44P-44S: fuel rod.

What is claimed is:

1. A core of a light water reactor, comprising:

a plurality of fuel assemblies having a nuclear fuel material zone including nuclear fuel material that includes a plurality of isotopes of transuranic nuclides disposed in said core, wherein said fuel assemblies have a lower fuel support member supporting each lower end portion of a plurality of fuel rods internally forming said nuclear fuel material zone, and an upper fuel support member supporting an upper end portion of each of said plurality of fuel rods, wherein a plenum is formed above said nuclear fuel material zone in said fuel rod, and wherein an outside diameter of a first portion of said fuel rod in a first position in which said plenum is formed is smaller than an outside diameter of a second portion of said fuel rod in a second position in which said nuclear fuel material zone is formed and is within a range of 3 mm or more, and wherein a length of said plenum in an axial direction of said core is within a range from 400 mm to 2500 mm.

2. A fuel assembly, comprising:

a plurality of fuel rods; a lower fuel support member supporting a lower end portion of each of said plurality of fuel rods; an upper fuel support member supporting an upper end portion of each of said plurality of fuel rods; and a plurality of neutron absorbing members, wherein said plurality of fuel rods internally form a nuclear fuel material zone having a nuclear fuel material including a plurality of isotopes of transuranic nuclides, wherein a plenum is formed above said nuclear fuel material zone in each of said fuel rods, wherein an outside diameter of a first portion of said fuel rod where said plenum is formed is smaller than an outside diameter of a second portion of said fuel rod where said nuclear fuel material zone is formed and is within a range of 3 mm or more, and wherein a length of said plenum in an axial direction of said fuel assembly is within a range from 400 mm to 2500 mm.

3. A core of a light water reactor, comprising:

a plurality of fuel assemblies having a nuclear fuel material zone including nuclear fuel material disposed in said core, wherein said fuel assemblies form an upper blanket zone, an upper fissile zone, an internal blanket zone, and a lower fissile zone in said nuclear fuel material zone in an axial direction in this order in said core; and wherein a plurality of isotopes of transuranic nuclides are included in said upper fissile zone and said lower fissile zone; and wherein said fuel assemblies disposed in said core include at least one fuel assembly having a burnup of 0, and a ratio of fissionable plutonium to a total of all said nuclear fuel materials in said lower fissile zone is larger than a ratio of fissionable plutonium to a total of all said nuclear fuel material in said upper fissile zone.

4. The core of a light water reactor according to claim 3, wherein when said fuel assembly of a burnup of 0 is included in said core, an average of enrichment of fissionable plutonium to a total of all nuclear fuel material in said lower fissile zone and an average of enrichment of fissionable plutonium to a total of all nuclear fuel material in said upper fissile zone is within a range from 16% to 20%; and said enrichment of fissionable plutonium to the total of all nuclear fuel material in said lower fissile zone is within a range from 1.05 to 1.6 times said enrichment of fissionable plutonium to the total of all nuclear fuel material in said upper fissile zone.

5. The core of a light water reactor according to claim 3, wherein said lower blanket zone is disposed under said lower fissile zone in said nuclear fuel material zone.

6. The core of a light water reactor according to claim 3, wherein a ratio of plutonium-239 to all said transuranic nuclides included in said nuclear fuel material zone is within either of a range from 40% to 60% and a range from 5% or more to less than 40%.

7. A core of a light water reactor, comprising:

a plurality of fuel assemblies having a nuclear fuel material including nuclear fuel material disposed in said core, wherein said fuel assemblies form an upper blanket zone, an upper fissile zone, an internal blanket zone, and a lower fissile zone in said nuclear fuel material zone in an axial direction in this order in said core;

wherein a plurality of isotopes of transuranic nuclides are included in said upper fissile zone and said lower fissile zone; and wherein said fuel assemblies disposed in said core include at least one fuel assembly having a burnup of 0, a total of a height of said lower fissile zone and a height of said upper fissile zone is within a range from 350 mm to 600 mm, and said height of said upper fissile zone is within a range from 1.1 to 2.1 times said height of said lower fissile zone.

8. A core of a light water reactor, comprising:

a plurality of fuel assemblies having a nuclear fuel material zone including nuclear fuel material disposed in said core, wherein said fuel assemblies form an upper blanket zone, an upper fissile zone, an internal blanket zone, and a lower fissile zone in said nuclear fuel material zone in an axial direction in this order in said core;

wherein a plurality of isotopes of transuranic nuclides are included in said upper fissile zone and said lower fissile zone;

wherein said fuel assemblies disposed in said core include at least one fuel assembly having a burnup of 0, and an average of an enrichment of fissionable plutonium to a total of all nuclear fuel material in said lower fissile zone and an average of an enrichment of fissionable plutonium to a total of all nuclear fuel material in said upper fissile zone is within a range from 16% to 20%; and wherein said enrichment of fissionable plutonium to the total of all nuclear fuel material in said lower fissile zone is within a range from 1.05 to 1.6 times said enrichment of fissionable plutonium to the total of all nuclear fuel material in said upper fissile zone.

9. A fuel assembly, comprising:

a plurality of fuel rods;

a lower fuel support member supporting a lower end portion of each of said plurality of fuel rods;

an upper fuel support member supporting an upper end portion of each of said plurality of fuel rods; and a plurality of neutron absorbing members, wherein said plurality of fuel rods internally form a nuclear fuel material zone having a nuclear fuel material including a plurality of isotopes of transuranic nuclides;

wherein said nuclear fuel material zone includes an upper blanket zone, an upper fissile zone, an internal blanket zone, and a lower fissile zone; said upper blanket zone, said upper fissile zone, said internal blanket zone, and said lower fissile zone are disposed in an axial direction in this order; and said upper fissile zone and said lower fissile zone include said plurality of isotopes; and wherein said fuel assembly has a burnup of 0, a ratio of fissionable plutonium to a total of all of the nuclear fuel materials in said lower fissile zone is larger than a ratio of fissionable plutonium to a total of all of the nuclear fuel materials in said upper fissile zone.

10. A core of a light water reactor, comprising:

a plurality of fuel assemblies having a nuclear fuel material zone including nuclear fuel material that includes a plurality of isotopes of transuranic nuclides disposed in said core;

wherein a plurality of neutron absorbing members are disposed above said nuclear fuel material zone;

wherein said fuel assembly has a plurality of fuel rods internally forming said nuclear fuel material zone and a plenum formed above said nuclear fuel material zone, a lower fuel support member supporting a lower end portion of each of said plurality of fuel rods, and an upper fuel support member supporting an upper end portion of each of said plurality of fuel rods;

wherein each of said neutron absorbing members is disposed below said upper fuel support member and between said plenum of neighboring fuel rods, and is attached to said upper fuel support member; and wherein a total of cross sectional areas of all said neutron absorbing members in said fuel assembly is within a range from 10% to 50% of a cross sectional area of a fuel assembly lattice.

11. The core of a light water reactor according to claim 10, wherein a height of said nuclear fuel material zone is within a range from 20 cm to 250 cm.

12. The core of a light water reactor according to claim 11, wherein an outside diameter of a first portion of said plenum of said fuel rod is smaller than an outside diameter of a second portion of said fuel rod in said nuclear fuel material zone and is within a range of 3 mm or more and a length of said plenums in said axial direction of said core is within a range from 400 mm to 2500 mm.

13. The core of a light water reactor according to claim 11, wherein said plenum include a first zone and a second zone disposed above said first zone, and an outside diameter of a first portion of said fuel rod in said first zone is smaller than an outside diameter of a third portion of said fuel rod in said nuclear fuel material zone, and an outside diameter of a second portion of said fuel rod in said second zone is smaller than said outside diameter of said third portion of said fuel rod in said nuclear fuel material zone and is larger than said outside diameter of said first portion in said first zone, and said neutron absorbing members are disposed between a lower end of said second zone and said upper end of said nuclear fuel material zone.

14. The core of a light water reactor according to claim 11, wherein a ratio of plutonium-239 occupying in all said transuranic nuclides included in said nuclear fuel material zone is within a range from 5% or more to less than 40%.

15. The core of a light water reactor according to claim 10, wherein a length of said plurality of neutron absorbing members in an axial direction of said core are within a range from 20 mm to 700 mm and a distance between an upper end of said nuclear fuel material zone and a lower end of said neutron absorbing member is within a range from 230 mm to 500 mm.

16. The core of a light water reactor according to claim 10, wherein another neutron absorbing member is disposed below said nuclear fuel material zone.

17. The core of a light water reactor according to claim 10, wherein a neutron absorbing material filling zone is formed below said nuclear fuel material zone in said fuel rod.

18. The core of a light water reactor according to claim 17, wherein a length of said neutron absorbing material filling zone in said axial direction of said core is within a range from 10 mm to 150 mm.

19. The core of a light water reactor according to claim 17, wherein an outside diameter of a first portion of said fuel rod in said neutron absorbing material filling zone is larger than an outside diameter of a second portion of said fuel rods in said nuclear fuel material zone and an interval between mutual outside surfaces of said first portions of said neighboring fuel rods in said neutron absorbing material filling zone is within a range of 1.3 mm or more.

20. The core of a light water reactor according to claim 10, wherein said nuclear fuel material zone includes an upper blanket zone, an upper fissile zone, an internal blanket zone, and a lower fissile zone, and said upper blanket zone, said upper fissile zone, said internal blanket zone; said lower fissile zone are disposed in said axial direction of said core in this order; and said upper fissile zone and said lower fissile zone include said plurality of isotopes, and wherein when said fuel assemblies of a burnup of 0 are included, a rate of fissionable plutonium to a total of all nuclear fuel material in said lower fissile zone is larger than a rate of fissionable plutonium to a total of all nuclear fuel material in said upper fissile zone.

21. The core of a light water reactor according to any one of claims 11, 15, 16, 17, 18, 12, 20 and 10, wherein a ratio of plutonium-239 to all said transuranic nuclides included in said nuclear fuel material zone is within a range from 40% to 60%.

22. A fuel assembly, comprising:

a plurality of fuel rods;

a lower fuel support member supporting a lower end portion of each of said plurality of fuel rods;

an upper fuel support member supporting an upper end portion of each of said plurality of fuel rods; and a plurality of neutron absorbing members;

wherein said plurality of fuel rods internally form a nuclear fuel material zone having nuclear fuel material including a plurality of isotopes of transuranic nuclides, wherein a plenums is formed above said nuclear fuel material zone;

wherein said plurality of neutron absorbing members are disposed above said nuclear fuel material zone and below said upper fuel support member, and are attached to said upper fuel support member; and wherein each of said neutron absorbing members is disposed between said plenum of neighboring fuel rods.

23. The fuel assembly according to claim 22, wherein said plurality of fuel rods internally form a nuclear fuel material zone having a height within a range from 20 cm to 250 cm.

24. The fuel assembly according to claim 23, wherein said neutron absorbing members are disposed below said upper fuel support member.

25. The fuel assembly according to claim 24, wherein each of said neutron absorbing members is disposed between said mutual plenums of said neighboring fuel rods.

26. The fuel assembly according to claim 23, wherein said plenum includes a first zone and a second zone disposed above said first zone; an outside diameter of a first portion of said fuel rod in said first zone is smaller than an outside diameter of a third portion of said fuel rod in said nuclear fuel material zone; and an outside diameter of a second portion of said fuel rod in said second zone is smaller than said outside diameter of said third portion of said fuel rod in said nuclear fuel material zone and is larger than said outside diameter of said first portion in said first zone; and wherein said neutron absorbing member is disposed between a lower end of said second zone and said upper end of said nuclear fuel material zone.

27. The fuel assembly according to claim 23 or 22, wherein a length of said neutron absorbing member in an axial direction of said fuel assemblies is within a range from 20 mm to 700 mm and a distance between an upper end of said nuclear fuel material zone and a lower end of said neutron absorbing member is within a range from 230 mm to 500 mm.

28. The fuel assembly according to claim 23 or 22, wherein a neutron absorbing material filling zone is formed below said nuclear fuel material zone in said fuel rod.

29. The fuel assembly according to claim 28, wherein a length of said neutron absorbing material filling zone in an axial direction of said fuel assembly is within a range from 10 mm to 150 mm.

30. The fuel assembly according to claim 28, wherein an outside diameter of a first portion of said fuel rod in said neutron absorbing material filling zone is larger than an outside diameter of a second portion of said fuel rod in said nuclear fuel material zone and an interval between mutual outside surfaces of said first portions of said neighboring fuel rods in said neutron absorbing material filling zone is within a range of 1.3 mm or more.

31. The core of a light water reactor according to claim 3, wherein when said fuel assembly of a burnup of 0 is included in said core, a total of a height of said lower fissile zone and a height of said upper fissile zone is within a range from 350 mm to 600 mm; and said height of said upper fissile zone is within a range from 1.1 to 2.1 times said height of said lower fissile zone.

32. The fuel assembly according to claim 23, 24 or 22, wherein an outside diameter of a first portion of said plenum of said fuel rod is smaller than an outside diameter of a second portion of said fuel rod in said nuclear fuel material zone and is within a range of 3 mm or more and a length of said plenum in an axial direction of said fuel assembly is within a range from 400 mm to 2500 mm.

33. The fuel assembly according to claim 22, wherein said nuclear fuel material zone includes an upper blanket zone, an upper fissile zone, an internal blanket zone, and a lower fissile zone; said upper blanket zone, said upper fissile zone, said internal blanket zone, and said lower fissile zone are disposed in an axial direction in this order; and said upper fissile zone and said lower fissile zone include said plurality of isotopes; and wherein said fuel assembly has a burnup of 0, and a ratio of fissionable plutonium to a total of all nuclear fuel material in said lower fissile zone is larger than a ratio of fissionable plutonium to a total of all nuclear fuel material in said upper fissile zone.

* * * * *